US00RE43605E

(19) United States
(12) Reissued Patent
O'Brien et al.

(10) Patent Number: US RE43,605 E
(45) Date of Reissued Patent: *Aug. 28, 2012

(54) LASER SEGMENTED CUTTING, MULTI-STEP CUTTING, OR BOTH

(75) Inventors: James N. O'Brien, Bend, OR (US); Lian-Cheng Zou, Portland, OR (US); Yunlong Sun, Beaverton, OR (US); Kevin P. Fahey, Portland, OR (US); Michael J. Wolfe, Portland, OR (US); Brian W. Baird, Oregon City, OR (US); Richard S. Harris, Portland, OR (US)

(73) Assignee: Electro Scientific Industries, Inc., Portland, OR (US)

( * ) Notice: This patent is subject to a terminal disclaimer.

(21) Appl. No.: 12/351,562

(22) Filed: Jan. 9, 2009

Related U.S. Patent Documents

Reissue of:
(64) Patent No.: 6,676,878
Issued: Jan. 13, 2004
Appl. No.: 10/165,428
Filed: Jun. 6, 2002

U.S. Applications:
(60) Division of application No. 11/332,815, filed on Jan. 13, 2006, which is a continuation-in-part of application No. 09/803,382, filed on Mar. 9, 2001, now abandoned, said application No. 11/332,815 is a continuation-in-part of application No. 10/017,497, filed on Dec. 14, 2001, now Pat. No. 7,157,038.

(60) Provisional application No. 60/297,218, filed on Jun. 8, 2001, provisional application No. 60/265,556, filed on Jan. 31, 2001, provisional application No. 60/233,913, filed on Sep. 20, 2000.

(51) Int. Cl.
*B23K 26/04* (2006.01)
*C04B 41/91* (2006.01)

(52) U.S. Cl. ..... 264/400; 264/482; 219/121.62; 219/121.67; 219/121.69; 219/121.8; 219/121.81

(58) Field of Classification Search ..... 264/400, 264/157, 158, 163
See application file for complete search history.

(56) References Cited

U.S. PATENT DOCUMENTS 4,146,673 A * 3/1979 Headley ..... 428/335
(Continued)

FOREIGN PATENT DOCUMENTS

EM 0706309 4/1996
(Continued)

OTHER PUBLICATIONS

Oct. 23, 2009 Office action in Chinese Patent Application No. 200510130176.X, which generally corresponds to U.S. Reissue Divisional U.S. Appl. No. 11/332,815.

(Continued)

*Primary Examiner* — Jeffrey Wollschlager
(74) *Attorney, Agent, or Firm* — Stoel Rives LLP

(57) ABSTRACT

UV laser cutting throughput through silicon and like materials is improved by dividing a long cut path (112) into short segments (122), from about 10 μm to 1 mm. The laser output (32) is scanned within a first short segment (122) for a predetermined number of passes before being moved to and scanned within a second short segment (122) for a predetermined number of passes. The bite size, segment size (126), and segment overlap (136) can be manipulated to minimize the amount and type of trench backfill. Real-time monitoring is employed to reduce rescanning portions of the cut path [112] (*112*) where the cut is already completed. Polarization direction of the laser output (32) is also correlated with the cutting direction to further enhance throughput. This technique can be employed to cut a variety of materials with a variety of different lasers and wavelengths. *A multi-step process can optimize the laser processes for each individual layer.*

17 Claims, 22 Drawing Sheets

U.S. PATENT DOCUMENTS

| | | | | |
|---|---|---|---|---|
| 4,169,976 | A | 10/1979 | Cirri | 219/121 LM |
| 4,266,252 | A | 5/1981 | Cox et al. | |
| 4,473,737 | A | 9/1984 | Anthony | 219/121 LL |
| 4,534,804 | A | 8/1985 | Cade | 148/1.5 |
| 4,541,035 | A | 9/1985 | Carlson et al. | 361/414 |
| 4,547,651 | A | 10/1985 | Maruyama | 219/121 |
| 4,589,190 | A | 5/1986 | Anthony | 29/571 |
| 4,610,079 | A | 9/1986 | Abe et al. | 29/583 |
| 4,618,380 | A | 10/1986 | Alcorn et al. | 148/187 |
| 4,835,361 | A | 5/1989 | Strom | 219/121.85 |
| 4,839,497 | A | 6/1989 | Sankar et al. | |
| 4,970,553 | A | 11/1990 | Orlowski et al. | |
| 5,001,591 | A | 3/1991 | Nakashima | 360/126 |
| 5,057,664 | A | 10/1991 | Johnson et al. | 219/121.69 |
| 5,151,389 | A | 9/1992 | Zappella | |
| 5,166,493 | A | 11/1992 | Inagawa et al. | 219/121.71 |
| 5,187,623 | A | 2/1993 | Ibaraki | 360/103 |
| 5,198,637 | A | 3/1993 | Noda et al. | 219/121.69 |
| 5,223,692 | A | 6/1993 | Lozier | |
| 5,300,756 | A * | 4/1994 | Cordingley | 219/121.69 |
| 5,331,497 | A | 7/1994 | Fuchigami | 360/126 |
| 5,359,479 | A | 10/1994 | Karam, II | 360/126 |
| 5,465,186 | A | 11/1995 | Bajorek et al. | 360/113 |
| 5,479,308 | A | 12/1995 | Voegeli et al. | 360/113 |
| 5,543,365 | A | 8/1996 | Wills et al. | 437/226 |
| 5,589,090 | A | 12/1996 | Song | 219/121.62 |
| 5,590,005 | A | 12/1996 | Tachibana | 360/103 |
| 5,593,606 | A | 1/1997 | Owen et al. | 219/121.71 |
| 5,614,114 | A * | 3/1997 | Owen | 219/121.66 |
| 5,627,847 | A * | 5/1997 | Leger | 372/9 |
| 5,643,472 | A * | 7/1997 | Engelsberg et al. | 216/65 |
| 5,699,212 | A | 12/1997 | Erpelding et al. | 360/104 |
| 5,739,048 | A | 4/1998 | Kerth et al. | 437/226 |
| 5,747,858 | A | 5/1998 | Hawkins | |
| 5,751,585 | A | 5/1998 | Cutler et al. | 364/474.03 |
| 5,755,612 | A | 5/1998 | Schaenzer et al. | 451/5 |
| 5,757,590 | A | 5/1998 | Phipps et al. | 360/113 |
| 5,759,428 | A | 6/1998 | Balamane et al. | 219/121.66 |
| 5,779,753 | A | 7/1998 | Vetter et al. | 65/105 |
| 5,796,549 | A | 8/1998 | Sedbrook et al. | 360/103 |
| 5,841,099 | A * | 11/1998 | Owen et al. | 219/121.69 |
| 5,843,363 | A | 12/1998 | Mitwalsky et al. | 264/400 |
| 5,847,960 | A | 12/1998 | Cutler et al. | 364/474.29 |
| 5,864,430 | A | 1/1999 | Dickey et al. | 359/559 |
| 5,868,950 | A | 2/1999 | Noddin | |
| 5,870,421 | A | 2/1999 | Dahm | 372/75 |
| 5,872,684 | A | 2/1999 | Hadfield et al. | 360/103 |
| 5,883,759 | A | 3/1999 | Schulz | 360/104 |
| 5,889,636 | A | 3/1999 | Arya et al. | 360/104 |
| 5,919,329 | A * | 7/1999 | Banks et al. | 156/281 |
| 5,923,995 | A * | 7/1999 | Kao et al. | 438/460 |
| 5,956,382 | A * | 9/1999 | Wiener-Avnear et al. | 378/98.8 |
| 5,963,364 | A | 10/1999 | Leong et al. | 359/352 |
| 5,986,807 | A * | 11/1999 | Fork | 359/569 |
| 5,987,725 | A | 11/1999 | Church et al. | 29/407.05 |
| 5,998,759 | A | 12/1999 | Smart | |
| 6,001,268 | A | 12/1999 | Nguyen et al. | 216/67 |
| 6,025,256 | A | 2/2000 | Swenson et al. | 438/601 |
| 6,027,660 | A | 2/2000 | Hsiao et al. | 216/22 |
| 6,032,997 | A | 3/2000 | Elliott et al. | 294/64.1 |
| 6,037,565 | A | 3/2000 | Hackel et al. | 219/121.73 |
| 6,049,056 | A | 4/2000 | Balamane et al. | 219/121.69 |
| 6,057,180 | A | 5/2000 | Sun et al. | 438/132 |
| 6,060,684 | A | 5/2000 | Moriike | 219/121.72 |
| 6,063,695 | A | 5/2000 | Lin et al. | 438/462 |
| 6,066,562 | A | 5/2000 | Ohshima et al. | |
| 6,069,769 | A | 5/2000 | Dorius et al. | 360/103 |
| 6,130,009 | A | 10/2000 | Smith et al. | 430/1 |
| 6,146,813 | A | 11/2000 | Girard et al. | 430/319 |
| 6,255,621 | B1 | 7/2001 | Lundquist et al. | 219/121.72 |
| 6,288,873 | B1 | 9/2001 | Lundquist et al. | 360/234.6 |
| 6,356,337 | B1 | 3/2002 | Zemel | 355/26 |
| 6,376,797 | B1 | 4/2002 | Piwczyk et al. | 219/121.72 |
| 6,400,534 | B1 | 6/2002 | Klaassen | 360/323 |
| 6,414,263 | B1 | 7/2002 | Uchida et al. | |
| 6,420,245 | B1 | 7/2002 | Manor | 438/460 |
| 6,423,925 | B1 | 7/2002 | Sukhman et al. | 219/121.6 |
| 6,430,465 | B2 | 8/2002 | Cutler | 700/193 |
| 6,433,301 | B1 | 8/2002 | Dunsky et al. | 219/121.67 |
| 6,465,158 | B1 | 10/2002 | Sekiya | |
| 6,541,731 | B2 | 4/2003 | Mead et al. | |
| 6,555,447 | B2 | 4/2003 | Weishauss et al. | 438/460 |
| 6,562,698 | B2 | 5/2003 | Manor | 438/460 |
| 6,580,054 | B1 | 6/2003 | Liu et al. | |
| 6,657,159 | B2 | 12/2003 | McKee et al. | |
| 6,696,008 | B2 | 2/2004 | Brandinger | |
| 6,998,571 | B2 | 2/2006 | Sekiya et al. | |
| 7,052,978 | B2 | 5/2006 | Shaheen et al. | |
| 7,265,034 | B2 | 9/2007 | Lu et al. | |
| 7,989,320 | B2 | 8/2011 | Boyle et al. | |
| 2001/0009250 | A1 | 7/2001 | Herman et al. | 219/121.69 |
| 2001/0034564 | A1 | 10/2001 | Jones | 700/166 |
| 2002/0033558 | A1 | 3/2002 | Fahey et al. | 264/400 |
| 2004/0188699 | A1 | 9/2004 | Kameyama et al. | |
| 2004/0211762 | A1 | 10/2004 | Sekiya | |
| 2005/0045090 | A1 | 3/2005 | Ikegami | |
| 2005/0054179 | A1 | 3/2005 | Nagai | |
| 2005/0260829 | A1 | 11/2005 | Uematsu et al. | |
| 2006/0088984 | A1 | 4/2006 | Li et al. | |
| 2006/0154385 | A1 | 7/2006 | Aggarwal | |
| 2007/0272666 | A1 | 11/2007 | O'Brien et al. | |
| 2007/0275541 | A1 | 11/2007 | Harris et al. | |
| 2009/0242525 | A1 | 10/2009 | O'Brien et al. | |

FOREIGN PATENT DOCUMENTS

| | | |
|---|---|---|
| EP | 0818818 A1 | 1/1998 |
| JP | 57-181787 | 11/1982 |
| JP | 58-9782 | 1/1983 |
| JP | 61-186185 | 8/1986 |
| JP | 3-64043 | 3/1991 |
| JP | 4065154 | 3/1992 |
| JP | 4-309480 | 11/1992 |
| JP | 06-039572 | 2/1994 |
| JP | 06-234090 | 8/1994 |
| JP | 06-277861 | 10/1994 |
| JP | 11000773 | 1/1999 |
| JP | 11-224866 | 8/1999 |
| JP | 115107407 T | 9/1999 |
| JP | 2000164535 | 6/2000 |
| JP | 2000-208798 | 7/2000 |
| JP | 3-180807 | 4/2001 |
| JP | 3180807 | 4/2001 |
| JP | 11-170072 | 6/2006 |
| WO | WO 97/35811 | 10/1997 |
| WO | WO 00/73013 A1 | 12/2000 |
| WO | WO 00/75983 | 12/2000 |
| WO | 01-17001 | 3/2001 |
| WO | WO 01/52004 A1 | 7/2001 |
| WO | WO 02/24396 A1 | 3/2002 |
| WO | WO 02/060636 A1 | 8/2002 |
| WO | WO 03/002289 A1 | 1/2003 |

OTHER PUBLICATIONS

Jul. 14, 2009 Office action by Examiner Koichi Matsumoto for Japanese Patent Application No. 2003-503392, which corresponds to U.S. Appl. No. 6,676,878.

Mar. 23, 2010 first Examination Report in German Patent Application No. 10296913.2-34, which generally corresponds to U.S. Appl. No. 6,676,878.

U.S. Appl. No. 09/327,722, filed Jun. 8, 1999. (Earliest possible public availability is believed to be Nov. 1, 2001) (This document is still not available on-line).

"Method of Preventing Damage to Integrated Circuit Chips during Wafer Dicing," IBM Technical Disclosure Bulletin, May 1992, US, vol. 34, Issue No. 12, pp. 311-312, published May 1, 1992, TDB-ACC-NO: NN9205311.

Lee, Rex A., et al., "Excimer vs ND:YAG Laser Creation of Silicon Vias for 3D Interconnects," IEEE/CHMT International Electronics Manufacturing Symposium (1992), pp. 358-360.

"Creation of an Air Bearing Surface by Excimer Laser Patterning of Ceramic," IBM Technical Disclosure Bulletin, Sep. 1991, US, vol. 34, Issue No. 4B, pp. 59-60; published Sep. 1, 1991, TDB-ACC-NO: NB910959.

Anthony, T.R., "Diodes Formed by Laser Drilling and Diffusion," J. Appl. Phys., vol. 53 (Dec. 1982), pp. 9154-9164.
International Search Report concerning related International Application No. PCT/US02/20826 Jan. 9, 2003.
International Search Report and Written Opinion concerning related International Application No. PCT/US02/17908 Dec. 19, 2002.
International Search Report, Written Opinion, and International Preliminary Examination Report concerning related International Application No. PCT/US01/07661 Mar. 20, 2003.
International Search Report and Written Opinion concerning related International Application No. PCT/US02/00867 Aug. 8, 2002.
Cable, Alan; "New Laser Processes and Wavelengths for Drilling Through-Hole and Blind Vias in a Wide range of Circuit Board Materials," *Proceedings of the Technical Conference IPC Printed Circuits Expo,* (Mar. 3, 1996), pp. S18-5-1 to S18-5-9.
Golden, James; "Green Lasers Score Good Marks in Semiconductor Material Processing," Laser Focus World, vol. 28, No. 6, (Jun. 1, 1992), pp. 75-80.
Written Opinion Concerning corresponding International Application No. PCT/US02/17908.
Written Opinion concerning corresponding International Application No. PCT/US02/00867.
US 6,303,409, 10/2001, Karpman et al. (withdrawn)

* cited by examiner

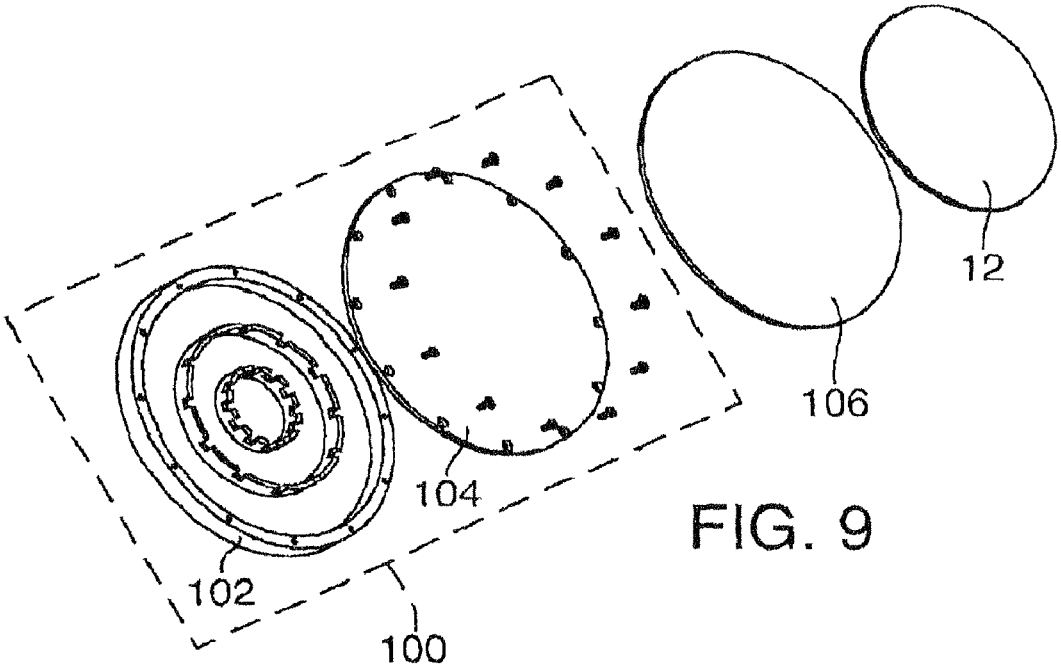
FIG. 9
FIG. 10
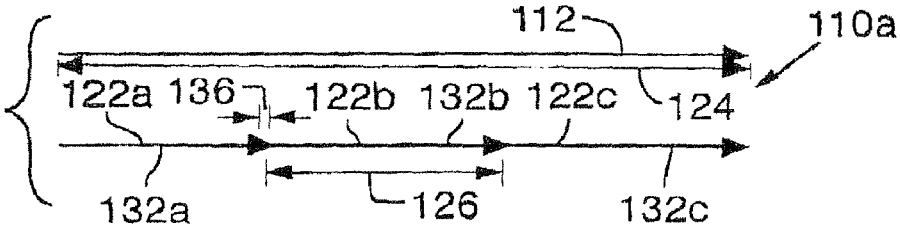
FIG. 11
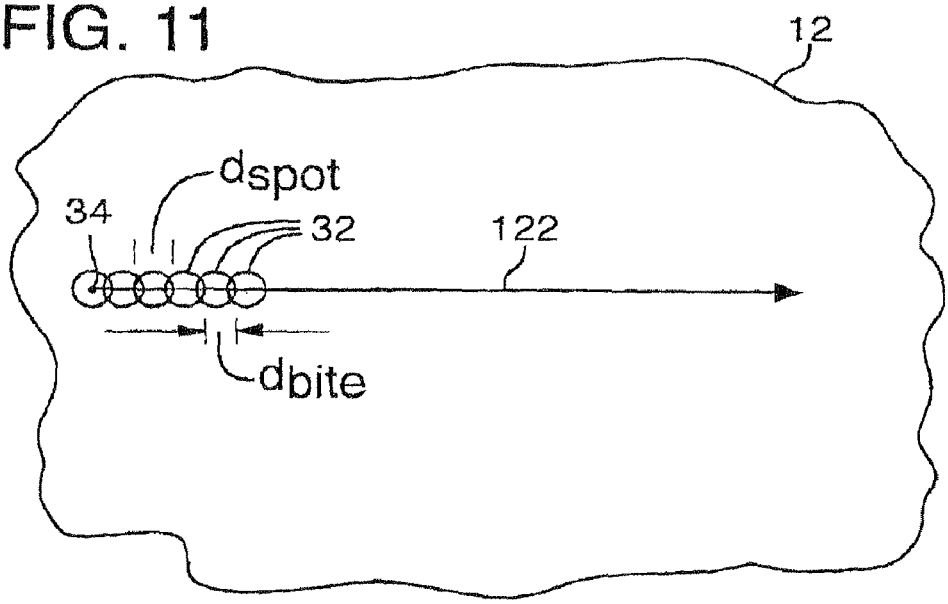

FIG. 18
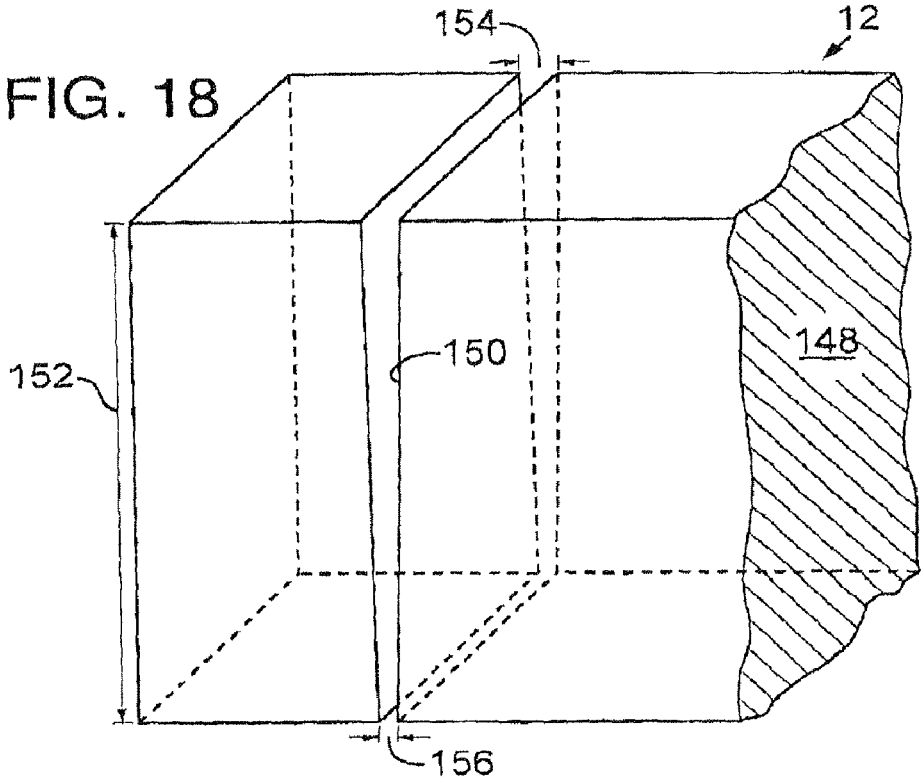
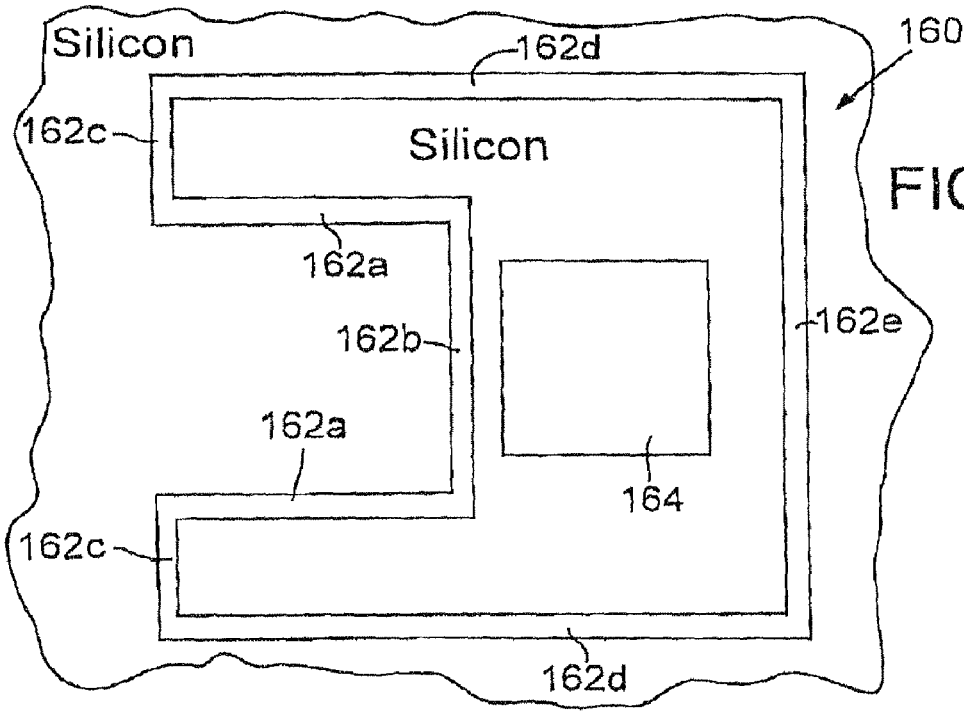
FIG. 19 or or

LASER SEGMENTED CUTTING, MULTI-STEP CUTTING, OR BOTH

Matter enclosed in heavy brackets [ ] appears in the original patent but forms no part of this reissue specification; matter printed in italics indicates the additions made by reissue.

NOTICE

*More than one application for reissue of U.S. Pat. No. 6,676,878 has been filed. The reissue applications are U.S. patent application Ser. Nos. 12/351,562, (the present application), 12/350,767, 12/256,156, and 11/332,815, all of which are divisional applications for reissue of U.S. Pat. No. 6,676,878.*

RELATED APPLICATIONS

*This is an application for reissue of U.S. Pat. No. 6,676,878 and a division of U.S. patent application Ser. No. 11/332,815 filed Jan. 13, 2006, which is an application for reissue of U.S. Pat. No. 6,676,878.*

[This patent application] *U.S. patent application Ser. No. 10/165,428, filed Jun. 6, 2002, on which U.S. Pat. No. 6,676, 878 issued,* derives priority from U.S. Provisional Application No. 60/297,218, filed Jun. 8, 2001, [and] is a CIP of U.S. patent application Ser. No. 10/017,497, filed Dec. 14, 2001, (*now U.S. Pat. No. 7,157,038*), which claims priority from U.S. Provisional Application No. 60/265,556, filed Jan. 31, 2001, *and is a CIP of U.S. patent application Ser. No. 09/803, 382, filed Mar. 9, 2001, (now abandoned), which derives priority from U.S. Provisional Patent Application No. 60/233, 913, filed Sept. 20, 2000.*

FEDERALLY SPONSORED RESEARCH OR DEVELOPMENT

Not Applicable

COPYRIGHT NOTICE

© 2001 Electro Scientific Industries, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

TECHNICAL FIELD

This invention relates to a laser cutting and, in particular, to a method and/or system for advantageous beam positioning and scanning to improve the throughput of laser *material processing and/or* cutting in silicon or other materials *and/or to employing laser output to dice, notch, or drill vias in semiconductor wafers which have a film layer or multilayer which resides on top of the wafer surface.*

BACKGROUND OF THE INVENTION

*Most semiconductor and related products, for example transistors, diodes, light emitting diodes, MEMS devices, planar waveguide structures and integrated circuits, are fabricated in the form of a large number of elements manufactured simultaneously on a large wafer. This wafer is typically composed of Si, GaAs, GaP, InP, Sapphire, or other material. The creation of devices is most often performed using conventional fabrication techniques such as photolithography, oxidation, implantation, deposition, etching, epitaxial growth, and/or spin coating. Upon completion of these device wafers, the individual devices must be singulated, a process which is typically referred to as "dicing." The individual devices are referred to as "die" or "dice." The area on the wafer in between active parts of adjacent die is referred to as the "street" or "dice lane." The streets are limited to a minimum width because of the wafer material which is removed or destroyed during the dicing process. The wafer area which is completely removed by the dicing process is called the "kerf," while the rest of the street must accommodate any damage zone around the cut and any misalignment or deviation from straightness of the cut.*

*Conventionally, dicing is performed by the use of a wafer saw or by the technique of "scribe and break," where the wafer is notched, often by a diamond point, and is then cleaved along this scribe line. Due to issues with scribe and break such as low yield, dicing saws have taken over in recent years as the predominant technique for dicing wafers. Conventional slicing blades typically have a narrow dimension of about 50 to 200 μm along their cutting axes and produce cuts that are wider than the blades. The slicing blades currently need to be this wide to withstand stresses of making straight cuts through the strength and thickness of conventional wafers, for example. The wide cuts made by the mechanical cutting blades often significantly reduce the number of rows and columns of die that can be fit onto each wafer.*

*Skilled persons will also note that dicing blades tend to wear relatively quickly such that the widths of their cuts may vary over time. In some cases, the blades can be inadvertently bent and then such blades produce curved or slanted cuts or increased chipping. The dicing process creates small chips as it creates sharp edges and sharp corners along singulation paths.*

FIG. 1 is a simplified representation of a traditional continuous cutting profile 8. Traditional laser cutting employs sequentially overlapping spots from consecutive laser pulses to continuously scan through an entire cut path. Numerous complete passes are performed until the target is severed along the entire cut path. When the target material is thick, many passes (in some cases over 100 passes) may be necessary to complete the cutting process, particularly with limited laser power.

A method for *dicing wafers and* increasing laser cutting throughput for thick materials is, therefore, desirable.

SUMMARY OF THE INVENTION

An object of the present invention is, therefore, to provide a method and/or system for improving the throughput for laser cutting silicon or other materials.

*As a result, laser sawing is becoming an attractive alternative to these conventional techniques for dicing. Some reasons for the consideration of laser dicing would be that lasers can cut curved die such as Arrayed Waveguide Gratings (AWGs) from a wafer, unlike either of the two conventional techniques. In addition, lasers can often cut without the use of water, which is of great importance for the manufacture of devices which are water sensitive, such as MEMS. Dicing saws, which are today the predominant technique in use, typically require the use of water as a lubricant and/or coolant. Lasers also offer the potential of the smallest street width*

*available, due to a potentially very small kerf width and the possibility of very accurate alignment of the laser to the workpiece (wafer).*

For convenience, the term cutting may be used generically to include trenching (cutting that does not penetrate the full depth of a target workpiece) and throughcutting, which includes slicing (often associated with wafer row separation) or dicing (often associated with part singulation from wafer rows). Slicing and dicing may be used interchangeably in the context of this invention.

*Lasers also can offer the ability to pattern wafers, creating features such as trenches or notches which are made by scanning the laser across the surface but only cutting partially through the wafer (unlike dicing). This technique can be used to make features on die, or can also be used to perform laser scribing for a scribe-and-break process, for example.*

*Lasers also offer great potential for the drilling of vias through or into the substrate material. This is of interest for reasons that may include but are not limited to: allowing ground to be contacted through the backside of the die; allowing die to be stacked atop each other inside one package (so-called "three-dimensional packaging"); or the ability to mount devices in a "flip-chip" BGA fashion, but with the active devices facing up (important for MEMS or front-side cooling of integrated circuits or laser diodes). These vias can range in diameter up from several microns to several hundred microns, and the die thicknesses of interest vary from tens of microns to almost 1000 microns. Few production-worthy solutions exist for the drilling of such high-aspect ratio vias, and those such as plasma etching tend to be cumbersome, expensive, and often slow.*

*While laser processing capability has advanced greatly in the last few years due to advances both in available lasers and in process understanding, there are still some significant issues with the use of lasers for dicing, drilling, or patterning processes. Attempts may have been made to use infrared (IR) lasers to machine alumina, alumina/titanium carbide ($Al_2O_3$/TiC) mixtures (also commonly referred to as AlTiC), silicon, or silicon oxides. IR wavelengths to a limited extent have been shown to machine these materials, and have been used successfully as laser scribing tools for marking die or scribe and break. These lasers, however, tend to damage pure alumina or Si such as by unpredictably cracking the alumina, Si, or oxide layers and by throwing permanent redeposited material (redep), such as melted slag, onto the top surface of the wafer and by creating a "melt lip" where the edge of the cut pulls backward and up.*

*One embodiment of the invention provides such a method or system that facilitates the manufacturing of sliders.*

*Another embodiment of the invention provides such a method or system that eliminates the cutting-formed sharp edges and chips on either the front or back sides of ceramic, glass, or silicon sliders or dies during the manufacturing process.*

*Another embodiment of the invention provides such a method or system that decreases the widths of the cutting lanes or paths between the rows and sliders.*

*U.S. Pat. Nos. 5,593,606 and 5,841,099 of Owen et al. describe techniques and advantages for employing UV laser systems to generate laser output pulses within advantageous parameters to form through-hole or blind vias through at least two different types of layers in multilayer devices. These parameters generally include nonexcimer output pulses having temporal pulse widths of shorter than 100 ns, spot areas with spot diameters of less than 100 μm, and average intensities or irradiances of greater than 100 mW over the spot areas at repetition rates of greater than 200 Hz.*

*Despite the foregoing, lasers have not been employed successfully to dice Si wafers or to pattern oxide or other layers on top of Si wafers. The same is true for other types of semiconductor wafers, and for sapphire or other insulator wafers. In particular, solid-state UV lasers have not been employed successfully to machine sliders and particularly have not been employed successfully to machine brittle, high melting temperature ceramic, glass, or glass-like materials such as alumina or alumina/titanium carbide ($Al_2O_3$/TiC, also known as AlTiC) in the context of sliders. One of the major issues results from the fact that most devices are made of several different materials, usually deposited or grown on top of the wafer in a build-up process. These materials include but are not limited to metals, oxide dielectrics, nitrides, silicides, polymer dielectrics, and other semiconductor layers. Of late, several attempts have been made to dice or scribe Si using IR lasers, and although some success has been achieved for cutting Si, these lasers are unable to cut through $SiO_2$ or other oxide layers on top of the Si wafer.*

FIG. 2A is a graph showing that for conventional long continuous throughcuts, the effective dicing speed decreases very quickly as silicon wafer thickness increases. Thus, as thickness increases, the number of laser passes increases almost exponentially and consequently exponentially decreases the dicing speed. The cutting width may be on the order of only a few tens of microns (μm), and the wafer thickness is typically much greater than the cutting width.

Traditional laser cutting profiles may suffer from trench backfill of laser ejected material. When the wafer thickness is increased, this backfill becomes much more severe and may be largely responsible for the dramatic decrease in dicing speed. Moreover, for some materials under many process conditions, the ejected backfill material may be more difficult to remove on subsequent passes than the original target material. Because trench backfill with laser ejected material has a somewhat random nature, the degree of backfill along any portion of a traditional culling profile may be large or small such that some portions of the cutting path may be cut through (opened) in fewer passes than other portions of the cutting path. Traditional laser cutting techniques ignore these phenomena and continuously scan an entire cut path, including areas that may already be opened, with complete passes of laser output until the target material is severed along the entire cut path.

As an example, a UV laser, having laser output power of only about 4 W at 10 kHz, requires about 150 passes to make a complete cut through a 750 μm-thick silicon wafer using a conventional laser cutting profile. The conventional cutting profiles typically traverse the entire lengths of wafers, which typically have diameters of about 200-305 mm. The resulting cutting rate is too slow for commercial dicing applications of silicon this thick. Although the segmented cutting technique can be employed to cut any laser-receptive material and employed at any laser wavelength, the segmented cutting technique is particularly useful for laser processing at wavelengths where laser power is limited, such as solid-state-generated UV, and particularly where such wavelengths provide the best cutting quality for a given material. For example, even though IR lasers tend to provide much more available output power, IR wavelengths tend to crack or otherwise damage silicon, alumina, AlTiC and other ceramic or semiconductor materials. UV is most preferred for cutting a silicon wafer for example.

U.S. patent application Ser. No. 09/803,382 ('382 application) of Fahey et al., describes a UV laser system and a method for separating rows or singulating sliders or other components. These methods include various combinations of laser and saw cutting directed at one or both sides of a wafer and various techniques for edge modification.

U.S. patent application Ser. No. 10/017,497 ('497 Application) of Baird et al., further describes using ultraviolet laser ablation to directly and rapidly form patterns with feature sizes of less than 50 μm in hard to cut materials, such as silicon. These patterns include: formation of very high-aspect cylindrical openings or blind vias for integrated circuit connections; singulation of processed dies contained on silicon wafers; and microtab cutting to separate microcircuits formed in silicon from parent wafer.

FIG. 2B is a graph showing the results of a recent experiment comparing the number of passes to complete a dicing cut versus the cutting length of the cutting profile in 750 μm-thick silicon. A wedge or "pie slice" was taken from a 750 μm-thick silicon wafer, and cutting profiles of different lengths were executed from edge to edge. The experiment revealed that shorter cutting profiles could be diced with fewer passes.

The present invention, therefore, separates long cuts into a cutting profile containing small segments that minimize the amount and type of trench backfill. For through cutting or trench cutting in thick silicon, for example, these segments are preferably from about 10 μm to 1 mm, more preferably from about 100 μm to 800 μm, and most preferably from about 200 μm to 500 μm. Generally, the laser beam is scanned within a first short segment for a predetermined number of passes before being moved to and scanned within a second short segment for a predetermined number of passes. The beam spot size, bite size, segment size, and segment overlap can be manipulated to minimize the amount and type of trench backfill. A few scans across the entire cut path can be optionally employed in the process, particularly before and/or after the segment cutting steps, to maximize the throughput and/or improve the cut quality.

The present invention also improves throughput and quality by optionally employing real-time monitoring and selective segment scanning to reduce backfill and overprocessing. The monitoring can eliminate rescanning portions of the cut path where the cut is already completed. In addition, polarization of the laser beam can be correlated with the cutting direction to further enhance throughput. These techniques generate less debris, decrease the heat affected zone (HAZ) surrounding the cutting area or kerf, and produce a better cut quality.

Although the present invention is presented herein only by way of example to silicon wafer cutting, skilled persons will appreciate that the segmented cutting techniques described herein may be employed for cutting a variety of target materials with the same or different types of lasers having similar or different wavelengths.

*As discussed in detail in U.S. patent applications 60/265,556 (Baird et al.) and 09/803,382 (Fahey et al.), there are several laser and optic processing parameters which must be optimized to cleanly cut a given material using a laser. These include but are not limited to the wavelength, the repetition rate, the distance of new target material impinged by each sequential laser pulse (the bite size $d_{bite}$), the energy of each laser pulse, the temporal pulse width, the spot size and the spatial energy distribution within the spot. The parameters of choice for cutting a particular material can vary considerably, and the "process windows," the area of parameter space in which a given material can be cleanly ablated, differs for different materials. Even materials which appear to be the same (like various types of $SiO_2$ or SiON) can have very different optical and mechanical and thermal/ablative properties due to factors which include but are not limited to: different dopant, different stoichiometry, different deposition technique, different microstructure (due to the above or due to different underlayer, processing temperature profile, etc.), or different macrostructure (porosity, geometry, thickness). This means that such closely related materials may still have non-matching process parameters and process windows.*

*When cutting through a wafer, the majority of the wafer thickness is usually taken up by the substrate material. The laser, however, must cut through the overlying device layers first before reaching the substrate material. Since in general two or more different materials do not respond in the same fashion to a particular set of laser parameters, it is common that the layers atop a wafer substrate are compromised during the laser cutting of the wafer. This can result in problems ranging from decreased cutting rate (if the laser is not efficient in cutting the overlayers) to the creation of a large damage region in the layers if the laser interacts in a destructive fashion with them.*

*The same is true for the saws to dice wafers where it is well known that the saw can cause cracking, chipping and/or delamination in layers, especially ones that are brittle and/or have low adhesion. As layer stacks get more complicated, and with the introduction of more fragile materials such as oxide-based low K dielectrics, this problem is expected to become worse, and certainly not less of an issue.*

*As such, it is of interest to find a technique by which one could use a laser to dice, pattern, or drill a wafer with layers on it while effectively cutting through the layers and the substrate.*

*An object of the present invention is, therefore, to provide a better method and/or system for dicing, cutting, or drilling of wafers which include layers of various materials on one or both sides of the wafer substrate.*

*One embodiment of the invention provides such a method or system that allows for removal of the layer or layers with one laser process or several laser processes and is then followed by one subsequent laser process or several subsequent laser processes which complete the cutting or drilling by only having to remove or cut through the wafer substrate material. Accordingly, one example of the present invention employs a UV laser to cut ceramic, glass, polymer or metal films which may comprise the layers on the top or bottom surfaces of the wafer substrate, while a different laser, such as a 532 nm or IR laser, or the same laser/optic system run with different process parameters (for example using laser segmented dicing) is used to cut through the substrate material after the layers have been cleared away. A preferred process entails covering the surfaces of the wafer with a sacrificial layer such as photoresist; optionally removing a portion of the sacrificial layer to create uncovered zones over intended cutting areas; laser cutting the layers atop the wafer substrate to a width equal to or greater than that which will occur in the subsequent substrate dicing or drilling step; then dicing or drilling the wafer with a separate processing step or steps using a different laser, wavelength, pulse width, fluence, bite size, or other laser processing parameters. In cutting through the layers, it may be preferable to use overlapping adjacent passes to widen the notch through the layer. This may allow for subsequent passes to be contained completely within the notch opened in the upper layer. It may be useful to use several different parameters for various passes in one notching step to tailor the notch geometry, including sidewall angle.*

*Another embodiment of the invention provides such a method or system that allows for removal of the layer or layers with one laser process or several laser processes and is then followed by one subsequent process or several subsequent processes which complete the cutting or drilling with a*

*non-laser technique which then only has to remove the wafer substrate material. One example of this technique is the removal of all metal, polymer or other soft material from the dice lane using the laser, such that during subsequent dicing with a saw blade, the blade only makes contact with the substrate material. In this way, there will be no blade degradation due to the presence of a softer material on the more brittle substrate material. The benefits of this may include but are not limited to improved lifetime of saw blades, or the reduction of damage to the edges of the cut in the substrate due to a contaminated blade. This technique will be of particular use when dicing wafers with metallization in the dice lanes, such as that due to the presence of test devices, or wafers which have a polymer dielectric material such as some of the low-K materials which are presently on the market.*

*Another embodiment of the invention includes laser processing which is done after the substrate dicing step in order to correct any damage which may have been created during the substrate dicing step. For example, the laser can be used to melt the layers in order to seal the edges and eliminate any cracks or crack initiation sites which may have originated. The laser may also be used to round the corner of the diced edge, as described U.S. patent application Ser. No. 09/803,382 (Fahey et al), to eliminate any sharp edges or chips which may have occurred during dicing.*

*Another embodiment of the invention includes laser processing which is performed after the notching or trenching or removal of the surface layers in order to correct any damage which may have been created during the laser processing steps which cut through the layers. This may be done before or after the dicing of the substrate.*

*Another embodiment of the invention is the use of imaged, shaped output to notch or cut through the layers. This may be beneficial for several reasons, including but not limited to the ability to stop more precisely upon a lower layer or on the substrate material without causing damage; the ability to more precisely control the sidewall angle of the cut through the layer; or the ability to use a larger spot size while achieving uniform irradiance across the spot area.*

*Another embodiment of the invention is making laser cuts from both sides of the wafer in order to cut entirely through the wafer. This technique is useful for reasons which include but are not limited to: the ability to use a more pristine cutting technique from the device side of the wafer, while using a more aggressive technique to cut at higher speed from the backside without compromising the devices; also, it allows the use of two lasers at the same time to cut the same dice lane for increased throughput. In addition, it is well known that laser cutting rate decreases with increasing depth into the wafer. As such, cutting from both sides would allow faster cutting of the wafer, since two half thickness cuts are faster than one cut of the full thickness. Furthermore, this technique would allow for cuts to be made through thicker materials, where half the thickness is below the saturation depth, but the full thickness is too deep to cut due to saturation. The cutting from both sides can be accomplished either by the use of a laser system which has laser beams impinging on the wafer from both sides, or by flipping the wafer in order to expose both sides to the laser irradiance in succession. Another embodiment of the invention is the use of a laser to drill holes or other alignment marks through the wafer in order to align the backside cuts to the frontside devices or cuts. These marks can be cut in from the edge of the wafer or drilled through somewhere in the center area of the wafer. They can also be made in a wafer carrier like a tape frame on which the wafer is mounted.*

*In the creation of semiconductor and related devices, there exists a variety of wafer types and layer types which are used. These wafer types include, but are not limited to Si, GaAs, GaP, InP, Sapphire, SiGe, Silicon on Sapphire, Silicon on Insulator, and various types of ceramic material such as alumina/titanium carbide. Layer types include but are not limited to various metals, oxides, nitrides, polymers, epitaxial or amorphous or polycrystalline semiconductor materials. As such, there is a wide range of combinations of lasers and laser/optic process parameters which must be used for the multi-step laser dicing or drilling of all such devices. While much of this invention description uses Si and $SiO_2$ as the substrate and layer, respectively, in the various examples, those skilled in the art will recognize that there are a number of types of laser which may be useful for specific combinations of layers and substrates. These laser types include but are not limited to: Excimer, $CO_2$, , Nd:YAG, Nd:YLF, Vanadate (or harmonic generated versions of the previous three), Ar-Ion, Cu vapor, and many others. The wavelengths available from these various lasers range from the UV, through the visible spectrum and into IR.*

*Although a preferred laser for patterning or trenching surface layers such as $SiO_2$ is a UV Q-switched, solid-state laser providing imaged, shaped output at a bite size of between about 1 to 7 μm, other UV lasers including excimers can be employed for those materials which require UV wavelengths. In the case of the cutting of materials which require visible or infrared wavelengths, although the preferred laser may be a Q-switched, solid-state laser providing imaged, shaped output, many other lasers such as non-Q-switched or $CO_2$ may be employed.*

Additional objects and advantages of this invention will be apparent from the following detailed description of preferred embodiments thereof, which proceeds with reference to the accompanying drawings.

BRIEF DESCRIPTION OF THE DRAWINGS

FIG. 9 is a representative illustration of an ultraviolet transparent chuck on which semiconductor workpieces are placed for throughcut processing using ultraviolet ablative segmented cutting in accordance with the present invention.

FIG. 10 is a simplified representation of a segmented cutting profile produced in accordance with the present invention.

FIG. 11 is a simplified plan view of an enlarged cutting segment sequentially impinged by overlapping laser spots.

FIG. 18 is a representative illustration of a trench pattern formed by segmented cutting processing of silicon.

FIG. 19 is a representative illustration of patterning of a MEMS device by a segmented cutting process on a semiconductor wafer.

DETAILED DESCRIPTION OF THE PREFERRED EMBODIMENT

Figure 3:
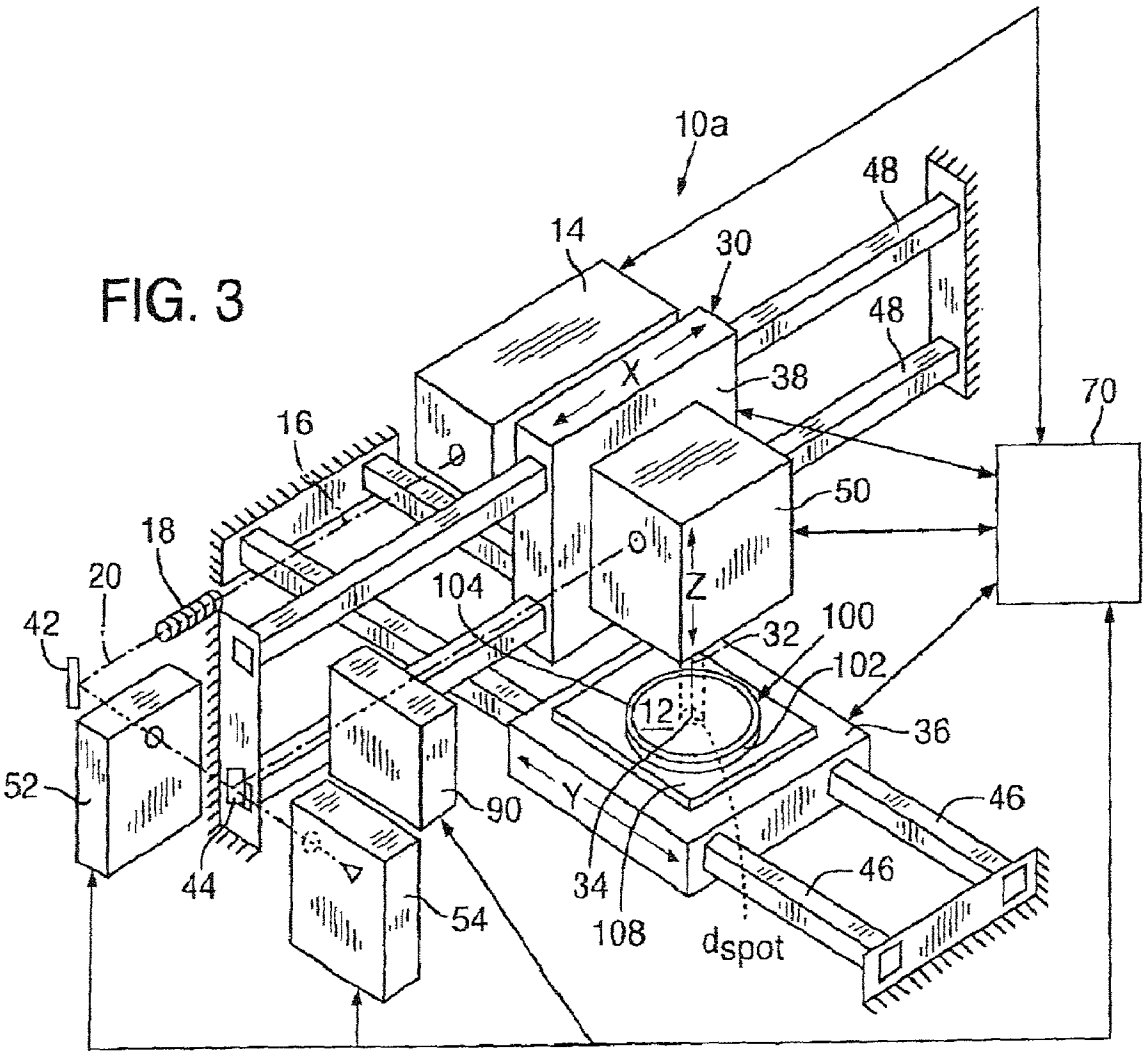
FIG. 3 is a simplified partly pictorial and partly schematic diagram of an exemplary laser system for performing segmented cutting in accordance with the present invention.
Figure 4:
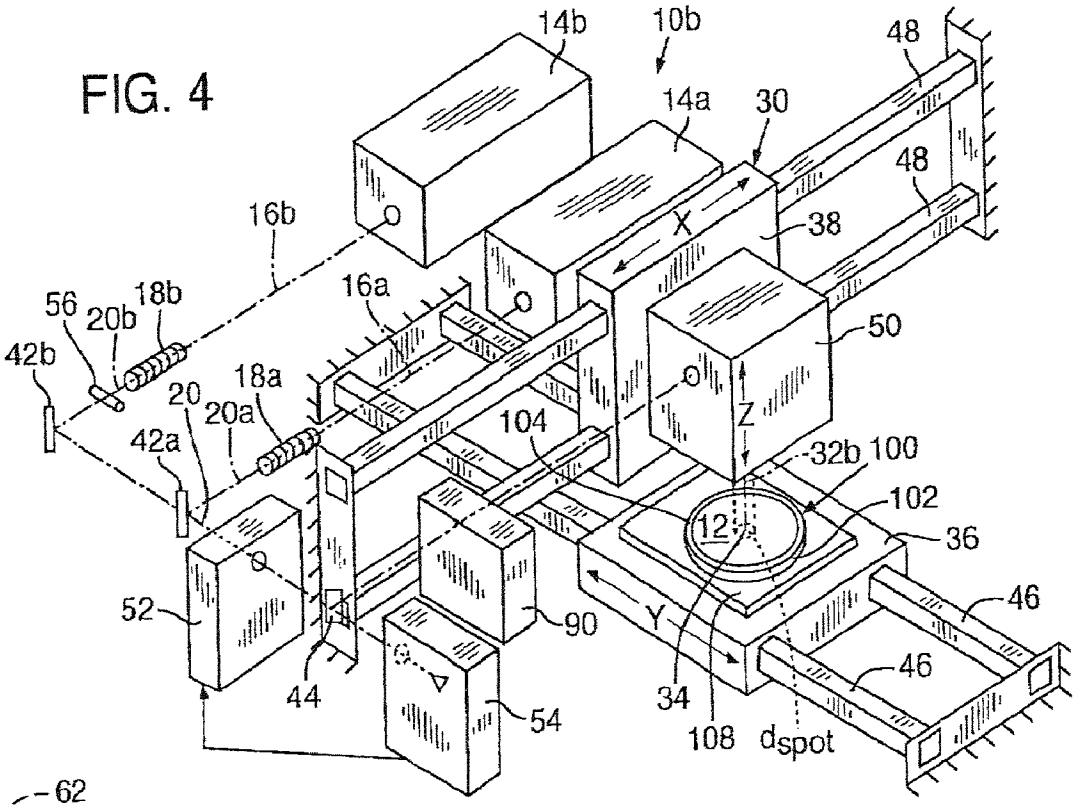
FIG. 4 is a simplified pictorial diagram of an alternative preferred laser system for performing segmented cutting in accordance with the present invention.

FIGS. 3 and 4 illustrate alternative embodiments of respective exemplary laser processing systems 10a and 10b (generically 10) utilizing a compound beam positioning system 30 equipped with a wafer chuck assembly 100 that can be employed for performing segmented cutting, such as trenching, slicing, or dicing semiconductor workpieces 12, in accordance with the present invention. With reference to FIGS. 3 and 4, an exemplary embodiment of a laser system 10 includes a Q-switched, diode-pumped (DP), solid-state (SS) UV laser 14 that preferably includes a solid-state lasant such as Nd:YAG, Nd:YLF, *Nd:YAP*, or Nd:$YVO_4$, *or a YAG crystal doped with holmium or erbium*. Laser 14 preferably provides harmonically generated UV laser output 16 of one or more laser pulses at a wavelength such as 355 nm (frequency tripled Nd:YAG), 266 nm (frequency quadrupled Nd:YAG), or 213 nm (frequency quintupled Nd:YAG) with primarily a $TEM_{00}$ spatial mode profile.

In a preferred embodiment, laser 14 includes a Model 210-V06 (or Model Q301) Q-switched, frequency-tripled Nd:YAG laser, operating at about 355 nm with 5 W at the work surface, and commercially available from Lightwave Electronics of Mountain View, Calif. This laser has been employed in the ESI Model 2700 micromachining system available from Electro Scientific Industries, Inc. of Portland, Oreg. In an alternative embodiment, a Lightwave Electronics Model 210-V09 (or Model Q302) Q-switched, frequency-tripled Nd:YAG laser, operating at about 355 nm may be employed in order to employ high energy per pulse at a high pulse repetition frequency (PRF). Details of another exemplary laser 22 are described in detail in U.S. Pat. No. 5,593,606 of Owen et al. Skilled persons will appreciate that other lasers could be employed and that other wavelengths are available from the other listed lasants. Although laser cavity arrangements, harmonic generation, Q-switch operation, and positioning systems 30 are all well known to persons skilled in the art, certain details of some of these components will be presented within the discussions of the exemplary embodiments.

Although Gaussian may be used to describe the irradiance profile of laser output 16, skilled persons will appreciate that most lasers 14 do not emit perfect Gaussian output 16 having a value of $M^2=1$. For convenience, the term Gaussian is used herein to include profiles where $M^2$ is less than or equal to about 1.5, even though $M^2$ values of less than 1.3 or 1.2 are preferred. A typical optical system produces a Gaussian spot size of about 10 μm, but this may easily be modified to be from about 2-100 μm. Alternatively, an optical system producing a top hat beam profile and or employing a mask, such as described later herein, may be used to create a predetermined spot size. The pulse energy used for cutting silicon using this focused spot size is greater than 200 μJ, and preferably greater than 800 μJ, per pulse at pulse repetition frequencies greater than 5 kHz and preferably above 10 kHz. An exemplary setting provides 9.1 W at 13 kHz. An exemplary laser pulsewidth measured at the full width half-maximum points is less than 80 ns. Alternative and/or complementary exemplary process windows include, but are not limited to, about 3.5-4.5 W UV at the work surface at about 10 kHz through about 20-30 W UV at 20-30 kHz, such as 15 W at 15 kHz.

UV laser output 16 is optionally passed through a variety of well-known expansion and/or collimation optics 18, propagated along an optical path 20, and directed by a beam positioning system 30 to impinge laser system output 32 of one or more pulses on a desired laser target position 34 on workpiece 12 such as a silicon wafer. An exemplary beam positioning system 30 may include a translation stage positioner that may employ at least two transverse stages 36 and 38 that support, for example, X, Y, and/or Z positioning mirrors 42 and 44 and permit quick movement between target positions 34 on the same or different workpieces 12.

Figure 7:
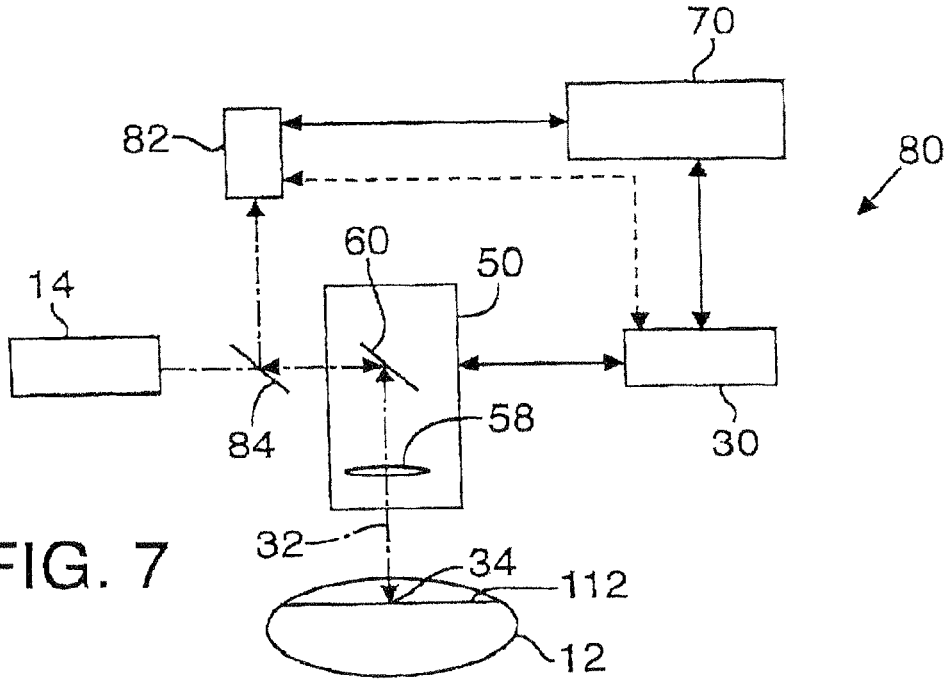
FIG. 7 is a simplified representation of a real time cut status monitor optionally employed by an exemplary laser system for performing segmented cutting in accordance with the present invention.

In an exemplary embodiment, the translation stage positioner is a split-axis system where a Y stage 36, typically moved by linear motors along rails 46, supports and moves workpiece 12, and an X stage 38, typically moved by linear motors along rails 48, supports and moves a fast positioner 50 and associated focusing lens(es) or other optics 58 (FIG. 7). The Z dimension between X stage 38 and Y stage 36 may also be adjustable. The positioning mirrors 42 and 44 align the optical path 20 through any turns between laser 14 and fast positioner 50, which is positioned along the optical path 20. The fast positioner 50 may for example employ high resolution linear motors or a pair of galvanometer mirrors 60 (FIG. 7) that can effect unique or repetitive processing operations based on provided test or design data. The stages 36 and 38 and positioner 50 can be controlled and moved independently or coordinated to move together in response to panelized or unpanelized data. A split axis positioning system 30 is preferred for use in large area of travel applications, such as cutting 8" and especially 12" wafers.

Fast positioner 50 may also include a vision system that can be aligned to one or more fiducials on the surface of the workpiece 12. Beam positioning system 30 can employ conventional vision or beam to work alignment systems that work through objective lens 58 or off axis with a separate camera and that are well known to skilled practitioners. In one embodiment, an HRVX vision box employing Freedom Library software in a positioning system 30 sold by Electro Scientific Industries, Inc. is employed to perform alignment between the laser system 10 and the target positions 34 on the workpiece 12. Other suitable alignment systems are commercially available. The alignment systems preferably employ bright-field, on-axis illumination, particularly for specularly reflecting workpieces like lapped or polished wafers.

For laser cutting, the beam positioning system 30 is preferably aligned to conventional typical saw cutting or other fiducials or a pattern on wafer surface. *These may include existing features on the devices, pole tips or rails of sliders, dedicated alignment targets, vias or alignment marks which have been previously drilled through the wafer.* If the workpieces 12 are already mechanically notched, alignment to the cut edges is preferred to overcome the saw tolerance and alignment errors. Beam positioning system 30 preferably has alignment accuracy of better than about 3-5 μm, such that the center of the laser spot is within about 3-5 μm of a preferred cutting path, particularly for laser beam spot sizes such as 10-15 μm. For smaller spot sizes, the alignment accuracy may preferably be even better. For larger spot sizes, the accuracy can be less precise.

In addition, beam positioning system 30 may also employ non-contact, small-displacement sensors to determine Abbe errors due to the pitch, yaw, or roll of stages 36 and 38 that are not indicated by an on-axis position indicator, such as a linear scale encoder or laser interferometer. The Abbe error correction system can be calibrated against a precise reference standard so the corrections depend only on sensing small changes in the sensor readings and not on absolute accuracy of the sensor readings. Such an Abbe error correction system is described in detail in International Publication No. WO 01/52004 A1 published on Jul. 19, 2001 and U.S. Publication No. 2001-0029674 A1 published on Oct. 18, 2001. The relevant portions of the disclosure of the corresponding U.S. patent application Ser. No. 09/755,950 of Cutler are herein incorporated by reference.

Many variations of positioning systems 30 are well known to skilled practitioners and some embodiments of positioning system 30 are described in detail in U.S. Pat. No. 5,751,585 *and/or U.S. Pat. No. 5,847,960* of Cutler et al. The ESI Model 2700 or 5320 micromachining systems available from Electro Scientific Industries, Inc. of Portland, Oreg. are exemplary implementations of positioning system 30. Other exemplary positioning systems such as a Model series numbers 27xx, 43xx, 44xx, or 53xx, manufactured by Electro Scientific Industries, Inc. in Portland, Oreg., can also be employed. Some of these systems which use an X-Y linear motor for moving the workpiece 12 and an X-Y stage for moving the scan lens are cost effective positioning systems for making long straight cuts. Skilled persons will also appreciate that a system with a single X-Y stage for workpiece positioning with a fixed beam position and/or stationary galvanometer for beam positioning may alternatively be employed. Those skilled in the art will recognize that such a system can be programmed to utilize toolpath files that will dynamically position at high speeds the focused UV laser system output pulses 32 to produce a wide variety of useful patterns, which may be either periodic or non-periodic.

An optional laser power controller 52, such as a half wave plate polarizer, may be positioned along optical path 20. In addition, one or more beam detection devices 54, such as photodiodes, may be downstream of laser power controller 52, such as aligned with a positioning mirror 44 that is adapted to be partly transmissive to the wavelength of laser output 16. Beam detection devices 54 are preferably in communication with beam diagnostic electronics that convey signals to modify the effects of laser power controller 52.

Laser 14 and/or its Q-switch, beam positioning system 30 and/or its stages 36 and 38, fast positioner 50, the vision system, any error correction system, the beam detection devices 54, and/or the laser power controller 52 may be directly or indirectly coordinated and controlled by laser controller 70.

With reference to FIG. 4, laser system 10b employs at least two lasers 14a and 14b that emit respective laser outputs 16a and 16b that are linearly polarized in transverse directions and propagate along respective optical paths 20a and 20b toward respective reflecting devices 42a and 42b. An optional wave-plate 56 may be positioned along optical path 20b. Reflecting device 42a is preferably a polarization sensitive beam combiner and is positioned along both optical paths 20a and 20b to combine laser outputs 16a and 16b to propagate along the common optical path 20.

Lasers 14a and 14b may be the same or different types of lasers and may produce laser outputs 16a and 16b that have the same or different wavelengths. For example, laser output 16a may have a wavelength of about 266 nm, and laser output 16b may have a wavelength of about 355 nm. Skilled persons will appreciate that lasers 14a and 14b may be mounted side by side or one on top of the other and both attached to one of the translation stages 36 or 38, or lasers 14a and 14b can also be mounted on separate independently mobile heads. The firing of lasers 14a and 14b is preferably coordinated by laser controller 70. Laser system 10b is capable of producing very high energy laser output pulses 32b. A particular advantage of the arrangement shown in FIG. 4 is to produce a combined laser output 32 impinging on the work surface having an increased energy per pulse which could be difficult to produce from a conventional single laser head. Such an increased energy per pulse can be particularly advantageous for ablating deep trenches, or slicing or dicing through thick silicon wafers or other workpieces 12.

Figure 5:
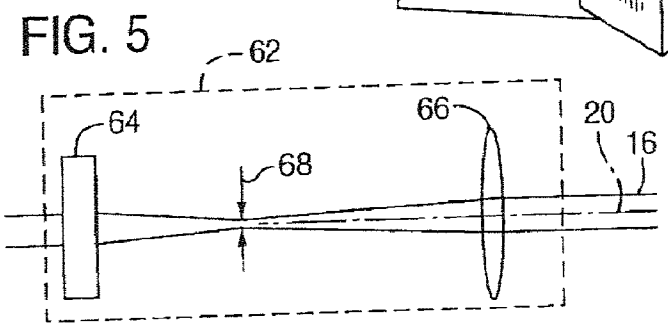
FIG. 5 is a simplified pictorial diagram of an optional imaged optics module that may be used in a laser system for performing segmented cutting in accordance with the present invention.
Figure 5A:
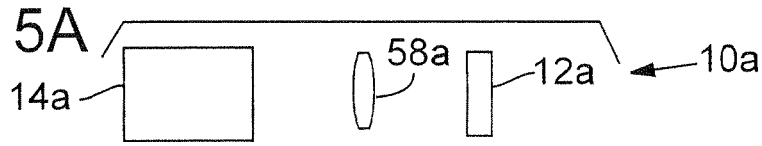
*FIGS. 5A-5F are simplified and partly schematic views of several possible embodiments of a laser processing system suitable for multi-step laser dicing or drilling.*
Figure 5B:
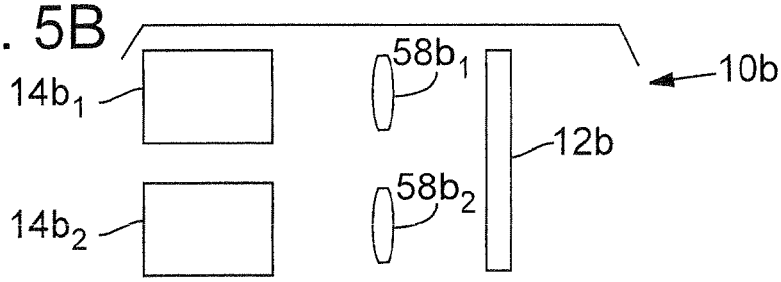
Figure 5C:
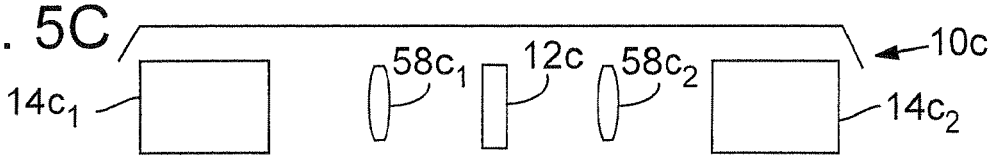
Figure 5D:
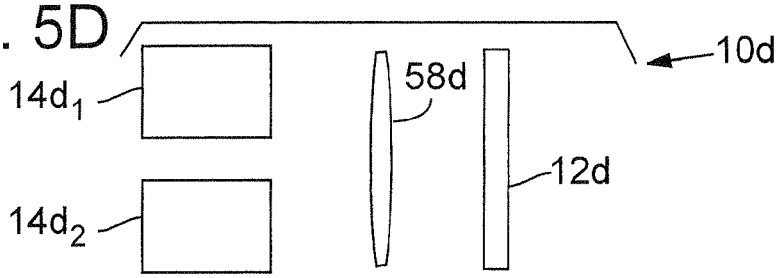
Figure 5E:
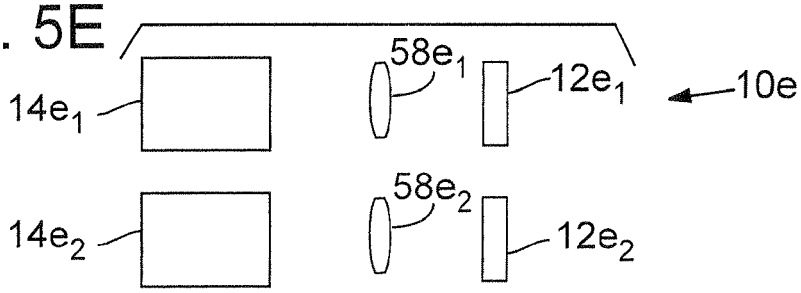
Figure 5F:
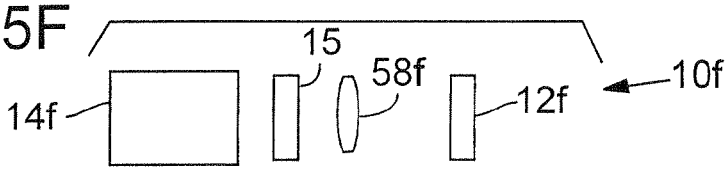

Despite the substantially round profile of laser system output pulse 32, improved beam shape quality may be achieved with an optional imaged optics module 62 whereby unwanted beam artifacts, such as residual astigmatism or elliptical or other shape characteristics, are filtered spatially. With reference to FIG. 5, imaged optics module 62 may include an optical element 64, a lens 66, and an aperture mask 68 placed at or near the beam waist created by the optical element 64 to block any undesirable side lobes and peripheral portions of the beam so that a precisely shaped spot profile is subsequently imaged onto the work surface. In an exemplary embodiment, optical element 64 is a diffractive device or focusing lens, and lens 66 is a collimating lens to add flexibility to the configuration of laser system 10.

Varying the size of the aperture can control the edge sharpness of the spot profile to produce a smaller, sharper-edged intensity profile that should enhance the alignment accuracy. In addition, with this arrangement, the shape of the aperture can be precisely circular or also be changed to rectangular, elliptical, or other noncircular shapes that can be aligned parallel or perpendicular to a cutting direction. The aperture of mask 68 may optionally be flared outwardly at its light exiting side. For UV laser applications, mask 68 in imaged optics module 62 preferably comprises sapphire. Skilled persons will appreciate that aperture mask 68 can be used without optical elements 64 and 66.

In an alternative embodiment, optical element 64 includes one or more beam shaping components that convert laser pulses having a raw Gaussian irradiance profile into shaped (and focused) pulses that have a near-uniform "top hat" profile, or particularly a super-Gaussian irradiance profile, in proximity to an aperture mask 68 downstream of optical element 64. Such beam shaping components may include aspheric optics or diffractive optics. In one embodiment, lens 66 comprises imaging optics useful for controlling beam size and divergence. Skilled persons will appreciate that a single imaging lens component or multiple lens components could be employed. Skilled persons will also appreciate, and it is currently preferred, that shaped laser output can be employed without using an aperture mask 68.

In one embodiment, the beam shaping components include a diffractive optic element (DOE) that can perform complex beam shaping with high efficiency and accuracy. The beam shaping components not only transform the Gaussian irradiance profile to a near-uniform irradiance profile, but they also focus the shaped output to a determinable or specified spot size. Although a single element DOE is preferred, skilled persons will appreciate that the DOE may include multiple separate elements such as the phase plate and transform elements disclosed in U.S. Pat. No. 5,864,430 of Dickey et al., which also discloses techniques for designing DOES for the purpose of beam shaping. The shaping and imaging techniques discussed above are described in detail in International Publication No. WO 00/73013 published on Dec, 7, 2000. The relevant portions of the disclosure of corresponding U.S. patent application Ser. No. 09/580,396 of Dunsky et al., filed May 26, 2000 are herein incorporated by reference. *Alternatively, the shaped laser output can be employed without using an aperture.*

*Employing a clipped or imaged shaped Gaussian beam may facilitate better singulation in a multi-step process. In addition to facilitating greater spot shape control and consistent and depth control (particularly for imaged shaped), beam spots with minimized tails generate redep debris that are more easily cleaned by nonaggressive cleaning techniques than redep debris generated by unmodified Gaussian beam spots. Furthermore, the uniform irradiance profile facilitates the selectivity of a notch cut of a film over an underlying substrate or another underlying film since there is little or no change in the illuminated intensity across the spot, allowing better selectivity between different materials.*

*FIGS. 5A-5F are simplified and partly schematic views of several possible embodiments of a laser processing systems 10a-10f, including respective lasers 14a-14f, lenses 58a-58f, and suitable for multi-step laser dicing or drilling of respective workpieces 12a-12f. With reference to FIGS. 5A-5F, a preferred embodiment of a laser processing system of the present invention includes two lasers with two separate beam delivery paths impinging upon the same wafer. Variants of this embodiment include having the laser beams impinge from opposite sides of the wafer, having the laser beams impinge at adjacent positions with the ability to move the wafer between the two positions, or having the system handle two wafers at the same time, each of which is cut by one laser beam. The system in the last case may be required to have the ability to flip the wafer as it passes from one laser head position to the other. Other variants which may work in some cases include the use of a system which has two lasers which are selectable and create beams which impinge on the wafer through the shared scan head and scan lens, a system with one laser cavity but which has an insertable harmonic generation device 15, or the use of only one laser which has a range of process parameters suitable for cutting the layers and wafer with their own individually optimized process.*

Figure 6:
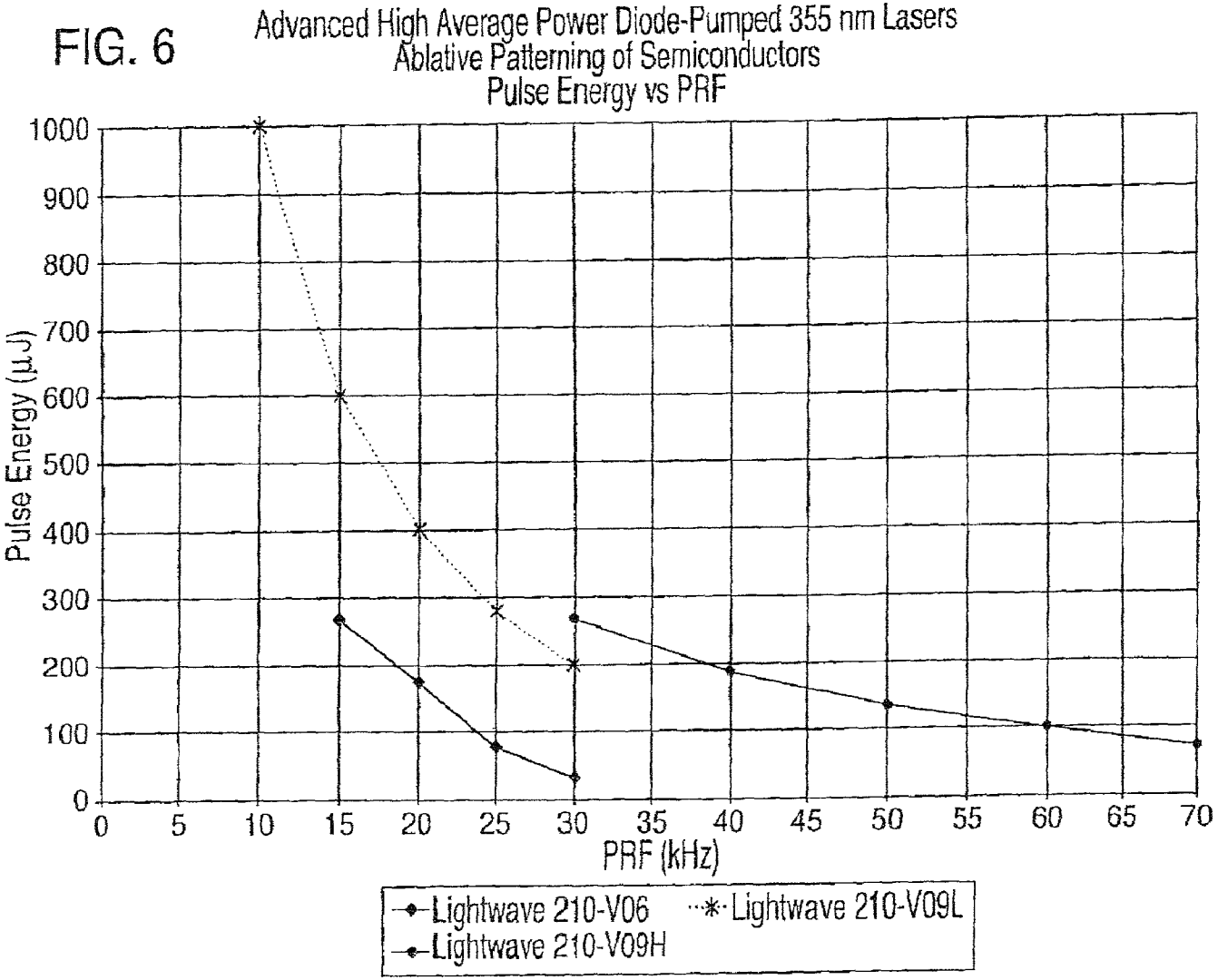
FIG. 6 is a graph displaying the characteristic relationship between pulse energy and pulse repetition frequency of the laser employed during practice of the invention.

For the purpose of providing increased flexibility in the dynamic range of energy per pulse, a fast response amplitude control mechanism, such as an acousto-optic modulator or electro-optic modulator may be employed to modulate the pulse energy of successive pulses. Alternatively, or in combination with the fast response amplitude control mechanism, the pulse repetition frequency may be increased or decreased to effect a change in the pulse energy of successive pulses. FIG. 6 displays the characteristic relationship between pulse energy and pulse repetition frequency (PRF) of a laser 14 employed during practice of the invention. As FIG. 6 indicates, pulse energies of greater than 200 μJ can be obtained from the Model 210-V06. In addition, the characteristic relationship between pulse energy and PRF for alternative lasers, Lightwave Electronics 210-V09L and Lightwave Electronics 210-V09H, are also shown. Those skilled in the art will appreciate that FIG. 6 is illustrative of the principal described and alternate embodiments of laser system 10 will produce different characteristic relationships between pulse energy and pulse repetition frequency.

FIG. 7 depicts a simplified monitoring system 80 that employs one or more sensors 82 optically in communication with the target position 34 on the workpiece 12. In one embodiment, a mirror 84 is positioned along the optical path 20, upstream or downstream of fast positioner 50, and is transmissive to the outgoing beam but reflects any incoming radiation to the sensors 82. Skilled persons will appreciate, however, that mirrors and other optics associated with monitoring system 80 may be aligned completely independently from optical path 20 and a variety of detection techniques can be employed. The sensors 82 of monitoring system 80 may be sensitive to the intensity, albedo, wavelength and/or other properties of light emitted, scattered, or reflected from the target material or support material positioned beneath it. Sensors 82 may, for example, be photodiodes and may include or form part of beam detection devices 54. Typically, sensors 82 detect less feedback when the cut path 112 (FIG. 10) is open. Sensors 82 may, for example, communicate with laser controller 70 and/or beam positioning system 30 to provide the cut-status information continuously or for one or more discrete points along a given segment 122 (FIG. 10). By employing real-time monitoring of the completed and uncompleted portions or areas of the cut path 112, the laser system 10 through a beam positioning system 30 can direct the laser system output 32 only to portions of the cut path 112 that need additional cutting. This monitoring and selective segment processing reduce the amount of time spent along a traditional cut path 112 impinging already-completed portions along the entire path. Thus, cutting throughput is improved.

Figure 8:
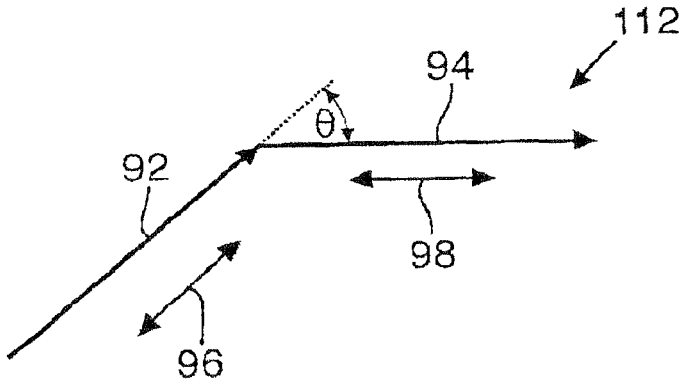
FIG. 8 depicts a cut path having respective first and second transverse directions through which cutting speed is enhanced by an optional polarization tracking system.

FIG. 8 depicts a cut path 112 having respective first and second transverse directions 92 and 94. Laser system 10 optionally employs a polarization tracking system 90 (FIG. 3) that includes a polarization control device, such as a rotatable half wave-plate or a Pockel's cell, to change the polarization direction or orientation of laser system output 32 to track changes in the cutting path direction. The polarization control device may be positioned upstream or downstream of fast positioner. When laser system output 32 is in a trench and moving relative to the target material, the laser system output 32 impinges the target material at a nonnormal angle, resulting in a polarization effect that is not present when impingement is nonmoving and normal to the target material. Applicants have noted that coupling efficiency and therefore throughput are increased when the polarization direction is in a particular orientation with respect to the cutting direction. Therefore, the polarization tracking system 90 may be employed to keep the polarization orientation in an orientation that maximizes throughput. In one embodiment, polarization tracking system 90 is implemented to keep the polarization orientation parallel with the cutting direction or orientation to increase the coupling energy of the laser system output into the target material. In one example, when cutting directions 92 and 94 differ by an angle theta, the half wave-plate is rotated by theta/2 to change a first polarization orientation 96 to a second polarization orientation 98 to match the cutting direction change of theta.

The polarization control device may also be implemented as a variable optical retarder, such as a Pockel's cell. A drive circuit conditions a polarization state control signal, which the drive circuit receives from a processor associated with beam positioning system 30 and/or laser controller 70. In this example, there is a one-to-one correspondence between the magnitude of the polarization state control signal and a beam positioning signal such that the polarization direction of the light beam is maintained generally parallel to its cutting path. U.S. Pat. No, 5,057,664 of Johnson et al. describes a method for correlating the direction of beam polarization with trimming direction. Skilled persons will appreciate that the optimized polarization orientation versus cutting direction may vary with laser systems and materials, such that the preferred polarization orientation may be parallel, vertical, orthogonal, elliptical (with the long axis in any given orientation), or any other orientation with respect to the laser pass or cutting direction.

FIG. 9 is a representative illustration of a chuck assembly 100 on which silicon workpieces 12 are preferably placed for throughcut processing using an ultraviolet segment cutting method. Chuck assembly 100 preferably includes a vacuum chuck base 102, a chuck top 104, and an optional retaining carrier 106 placed over chuck top 104 for the purpose of supporting a silicon workpiece 12 and retaining it after a throughcut application. Base 102 is preferably made from traditional metal material and is preferably bolted to an additional plate 108 (FIG. 3). Plate 108 is adapted to be easily connected to and disengaged from at least one of the stages 36 or 38. The engagement mechanism is preferably mechanical and may include opposing grooves and ridges and may include a locking mechanism. Skilled persons will appreciate that numerous exact alignment and lock and key mechanisms are possible. Skilled persons will also appreciate that the base 102 may alternatively be adapted to be secured directly to the stages 36 or 38.

Chuck top 104 and optional retaining carrier 106 may be fabricated from a material that has low reflectivity (is relatively absorbent or relatively transparent) at the ultraviolet wavelength selected for the particular patterning application to minimize backside damage to silicon workpieces 12 around through trenches from reflective energy coming off the metal chuck top after through processing has been completed. In one embodiment, chuck top 104 or retaining carrier 106 may be fabricated from an ultraviolet absorbing material, such as Al or Cu, in order that laser system 10 may use a tool path file of the pattern of shallow cavities to be drilled into the workpiece 12 to cut the corresponding pattern into the material of chuck top 104 and/or retaining carrier 106. The cavities may, for example, correspond to intended throughcuts and prevent backside damage to the workpiece 12 during throughcut operations. In addition, any debris from the process may settle into the cavities away from the backside of workpiece 12. In one preferred embodiment, the pattern of the shallow cavities is processed to have dimensions slightly larger than those of the corresponding workpieces 12 after processing, thereby enabling processed workpieces 12 to settle into the cavities of the retaining carrier 106. A retaining carrier 106 with cavities or through holes may be very thick to increase the distance between chuck top 104 and the focal plane. Retaining carrier 106 may also be machined to contain shallow cavities into which the processed silicon workpieces 12 settle after through processing operations. In an alternative embodiment, where 355 nm output is employed, a UV-transparent chuck top 104 may be fabricated from ultraviolet-grade or excimer grade fused silica, $MgF_2$, or $CaF_2$. In another embodiment, UV-transparent chuck top 104 may alternatively or additionally be liquid-cooled to assist in maintaining the temperature stability of the silicon workpieces 12. More details concerning exemplary chuck assemblies 100 can be found in the '497 application of Baird et al.

The above-described performance characteristics of UV laser system 10 can be used for high-speed cutting of semiconductors, and particularly silicon. Such cutting operations may include, but are not limited to, formation or trepanning of large diameter vias through or partially through silicon wafers or other silicon workpieces 12; formation of through or partly through trenches of complex geometry for the purpose of singulation of processed die on silicon wafers or silicon workpieces 12; formation of microtab features to separate microcircuits formed in silicon from parent wafers; formation of features on and/or singulation of AWGs and sliders; and formation of features in MEMS. In addition, the present invention facilitates feature formation without significant melt lip formation, without significant slag formation, and without significant peel back of the feature edge.

Applicants have discovered that laser cut rates for silicon, and other like materials, can be significantly improved by segment scanning or cutting instead of traditional methods of full path cutting. The processing throughput can be enhanced by appropriate selection of segment length, segment overlap, and/or overlap of subsequent passes within each segment, as well as by selection of other processing parameters.

Figure 1:
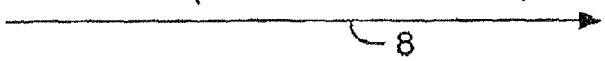
FIG. 1 (PRIOR ART)
FIG. 1 is a simplified representation of a traditional continuous cutting profile.
Figure 2A:
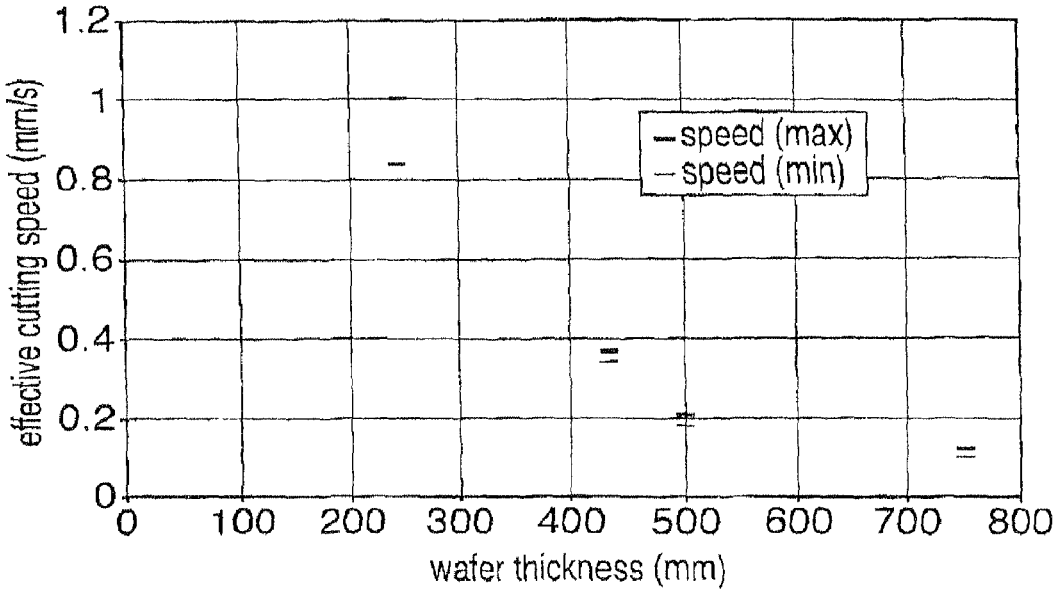
FIG. 2A is a graph showing effective dicing speed versus silicon wafer thickness for traditional continuous cuts.
Figure 2B:
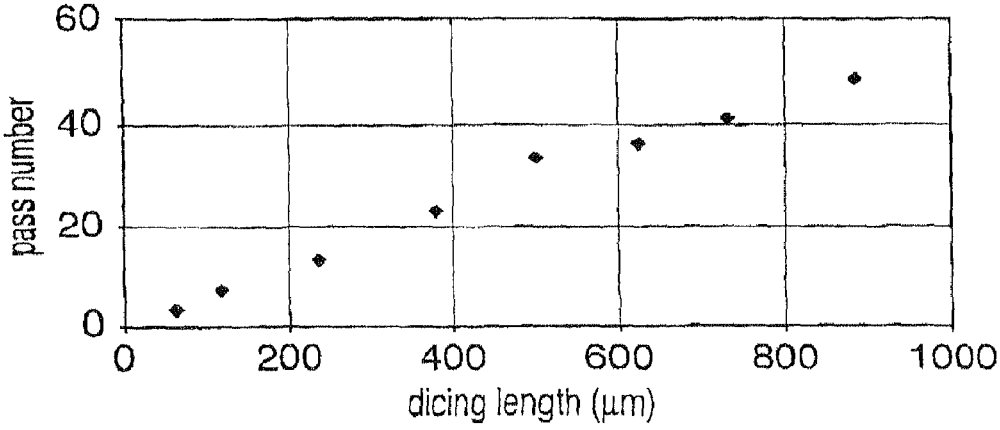
FIG. 2B is a graph showing the number of passes to complete a cut versus the cutting length in silicon.

By segment cutting, the consequences of material backfill in the cut trench may be avoided or minimized. FIG. 2B suggests that trench backfill may be a significant limitation to dicing speed. It is proposed that by making quick short open segments or subsegments, the laser system 10 can provide an avenue for much of the laser ejected material to escape rather than refill the trenches as they are being cut. Hence, reduced trench backfill will decrease the number of passes necessary to cut through a given portion of the cut path 112. FIGS. 10-17 present exemplary segmented cutting profiles 110a-110f (generically profiles 110) employed in the present invention. The techniques presented below generally permit a 750 μm-thick silicon wafer to be cut with only about 4 W UV laser power at 10 kHz in about 26 or fewer passes compared to the 150 passes needed using a conventional laser cutting profile.

FIG. 10 depicts a simplified representation of an exemplary segmented cutting profile 110a of the present invention. With reference to FIG. 10, cutting profile 110a is shown, for convenience, having a path cutting direction (indicated by the direction of the arrow) from left to right along cut path 112 and having generally distinct cutting segments 122a, 122b, and 122c (generally, cutting segments 122) formed in a segment cutting direction (or laser pass direction) that is the same as the path cutting direction by respective groups of passes 132a, 132b, and 132c (generically, laser passes 132) of laser system output 32. In this example, the lengths of the laser passes 132 substantially equal the lengths 126 of the segments 122. Skilled persons will appreciate that cutting profile 110a, and subsequent exemplary cutting profiles 110, may preferably include from two to an infinite number of cutting segments 122, depending on total respective lengths 124 of cutting profiles 110.

FIG. 11 is a simplified plan view of an enlarged cutting segment 122 sequentially impinged by slightly overlapping spots having a spot area of diameter, $d_{spot}$, on workpiece 12. With reference to FIG. 11, although the spot area and $d_{spot}$ generally refer to the area within the outside edge of the laser spot when the laser power falls to $1/e^2$ of the laser peak power, these terms are occasionally used to refer to the spot area or diameter of the hole created by a single pulse or the width of a kerf created in a single pass of pulses. The difference between the $1/e^2$ dimension and the kerf diameter will vary with the laser, the material, and other parameters.

The distance of new target material impinged by each sequential laser pulse is called the bite size $d_{bite}$. A preferred bite size $d_{bite}$ for laser cutting of materials of interest, such as silicon, includes an advantageous bite size range of about 0.5 μm to about $d_{spot}$, and more preferably a range of about 1-50 μm, with a typical range of about 1-5.5 μm, and most typically a bite size of about 1 μm. For some materials, adjusting the bite size results in a condition where the redep debris generated may be easier to remove. The bite size can be adjusted by controlling the speed(s) of the laser beam positioning system 30 and coordinating the movement speed (s) with the repetition rate of the firing of the laser 14.

With reference again to FIGS. 10 and 11, generally a preferred length 126 for cutting segments 122 may be dependent on the characteristics of the material being processed, its thickness, and the response time of the positioning system 30, including its acceleration/deceleration limits, degree of ringing of the mechanical components, and return movement time. For example, if segments are too short, the number of segments for a given cut will be very large, and the amount of time lost to change of direction between passes will be very large. Thus, positioning system characteristics may impact determination of the minimum segment length. Segment length 126 may be a function of bite size, repetition rate, and positioning system performance as well as other possible factors, and each or all of these factors may be optimized based on laser pulse intensity. Skilled persons will appreciate that segments 122a-122c need not have the same lengths 126.

Generally each segment 122 is scanned substantially collinearly with consecutive passes 132 of laser output 32 (skipping over completely processed portions) until it is completely processed, e.g. a throughcut is made along the entire length 126 of the segment 122 or until the target material is trenched to a desired depth before a subsequent segment 122 is processed. If snapstrates are desired, a series of discontinuous throughcuts may be desirable, or no through hole cutting may be desirable and nearly throughcut trenches may be desirable. One to several scans across the entire cut path length can be optionally employed in the process, particularly before and/or after the segment cutting steps, to maximize the throughput and/or improve the cut quality. Typically, a through hole can be made in each segment in from 5-10 laser passes such that some of the debris can escape through the through holes. However, if desired, each segment 122 can be processed with multiple passes to an intermediate depth, and the cutting profile can be reapplied, perhaps even in the opposite direction if desirable. If segments are initially processed only to a status where they each have a through hole in one portion, then it may also be advantageous in some circumstances to implement a traditional cutting profile as soon as all the segments 122 include significant through holes. To distinguish from laser punching, skilled persons will appreciate that the segment length 126 is greater than $d_{spot}$. Furthermore, laser punching each spot to create a through hole before moving along the cut path 112 would take longer, possibly damage the target material, and cause other less favorable results.

In an exemplary embodiment, for cutting thick silicon, each segment 122 has a segment length 126 of about 10 μm to 1 mm, typically from about 100 μm to 800 μm, and most preferably from about 200 μm to 800 μm. With respect to cutting profile 110a, segments 122 are preferably slightly overlapped by an overlap distance 136 that may be as small as the bite size or larger than several spot sizes. However, skilled persons will appreciate that the final pass processing segment 122a and the first pass processing segment 122b may be combined into a double length segment 122 (without overlap). Although it is preferred to maintain the same laser parameters during any given pass 132 along a segment 122, skilled persons will appreciate that it is possible to change laser parameters during any given pass 132 to accommodate specific applications.

Figure 12:
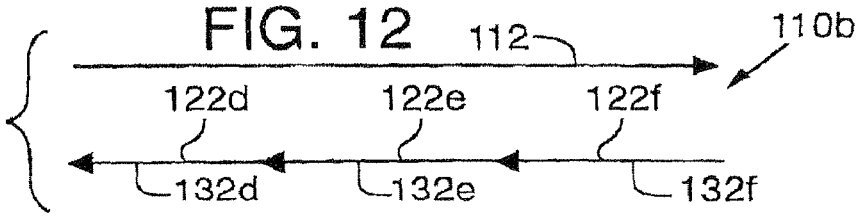
FIG. 12 is a simplified representation of an alternative segmented cutting profile produced in accordance with the present invention.

FIG. 12 depicts a simplified representation of an exemplary segmented cutting profile 110b. With reference to FIG. 12, cutting profile 110b is shown, for convenience, having a path culling direction from left to right and having distinct cutting segments 122d, 122e, and 122f (generally, cutting segments 122) formed from respective laser passes 132d, 132e, and 132f in a segment cutting direction that is opposite the path cutting direction. Thus, segment 122d is processed from right to left and then segment 122e is processed from right to left, etc.

An advantage of cutting profile 110b over cutting profile 110a is that the debris generated while cutting segment 122d is generally scattered in the direction of segment 122e (backwards with respect to the laser pass direction) where there is no preexisting trench to be backfilled by the debris. Any such debris that does land along the subsequent segment 122 to be cut will be immediately processed. In addition, since the path cutting direction is opposite the segment cutting direction, the debris generated will generally not occlude the trench of the previously cut segment 122. Skilled persons will appreciate that other than the difference between path cutting direction and segment cutting direction, most of the discussion concerning FIGS. 10 and 11 is germane to FIG. 12.

Figure 13:
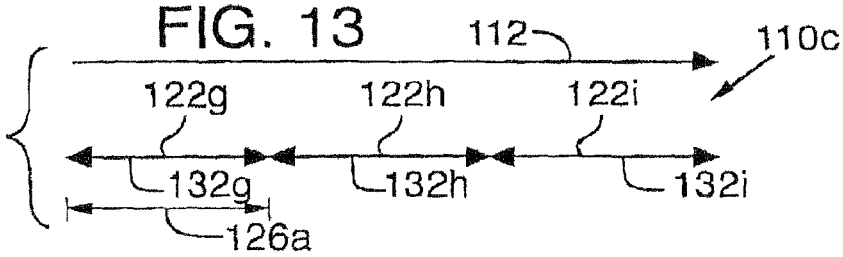
FIG. 13 is a simplified representation of an alternative segmented cutting profile produced in accordance with the present invention.

FIG. 13 depicts a simplified representation of an exemplary segmented cutting profile 110c. With reference to FIG. 13, cutting profile 110c is shown, for convenience, having a path cutting direction from left to right and having distinct cutting segments 122g, 122h, and 122i (generally, cutting segments 122) formed from respective laser passes 132g, 132h, and 132i that each proceed from left to right and from right to left in a back and forth overlapping scanning fashion. In particular, segment 122h is first processed from left to right and then from right to left, etc. until it is completely processed, for example, and then segment 122i is similarly processed. Because the segments 122 are being processed in both directions, the nonprocessing movement returns of the positioning system 30 is eliminated, resulting in a higher usage of the system capability. Because a laser pass 132 may take longer than nonprocessing movement returns of the positioning system 30, segments 122 in FIG. 13 may be shorter than those used in FIGS. 10 and 12 in applications where it is desirable to impinge debris or exposed portions of a trench within a prescribed period of time from the previous impingement. Other than some of the details specified above, most of the discussion concerning FIGS. 10-12 is germane to the example in FIG. 13.

Figure 14:
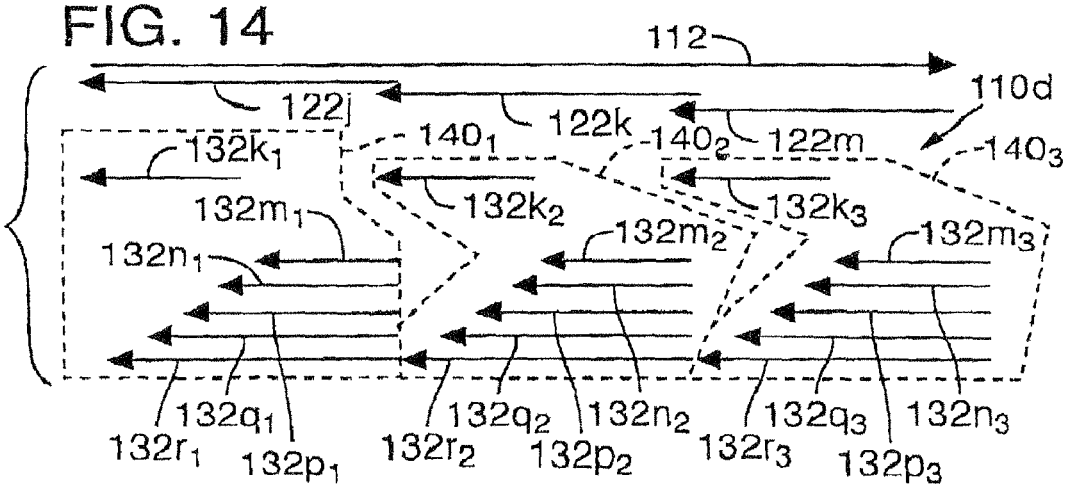
FIG. 14 is a simplified representation of an alternative segmented cutting profile produced in accordance with the present invention.

FIG. 14 depicts a simplified representation of an exemplary segmented cutting profile 110d. With reference to FIG. 14, cutting profile 110d is shown, for convenience, having a path cutting direction from left to right along cut path 112 and having distinct cutting segments 122j, 122k, and 122m (generally, cutting segments 122) formed from right to left. FIG. 14 also depicts multiple, substantially collinear laser pass sets $\mathbf{140}_1$, $\mathbf{140}_2$, and $\mathbf{140}_3$ (generically laser pass sets 140), each comprising an initial pass 132k and multiple gradually lengthening overlapping and substantially collinear passes 132m-132r, preferably processed in alphabetical order. Although cutting passes $\mathbf{132}k_1$-$\mathbf{132}r_3$ are depicted as parallel in FIG. 14 for convenience, cutting passes $\mathbf{132}k_1$-$\mathbf{132}r_3$ are preferably substantially collinear and collinear with the respective segments 122.

Unlike the slight optional overlaps between adjacent segments 122 associated with the examples in FIGS. 10, 12, and 13, the overlap lengths associated with adjacent segments 122 or passes 132 in this and the following examples are typically greater than about 10%, more typically greater than about 25%, and most typically greater than about 50%, and occasionally exceeding 67% or 85%. In one particular example where a 300 μm segment is employed, an overlap length of 200 μm is employed; and in another example where a 500 μm segment length is employed, a 250 μm overlap length is employed.

One reason to employ laser passes 132 that have different end points within a segment 122 is to prevent a "scan end" effect where more material is stacked at the end of segment 122 whenever it is processed by identical overlapping passes 132. Thus, an advantage of lengthening of consecutive passes 132 or consecutive small groups of passes is to spread the scan effect over longer cut lengths so that the cutting speed across an entire segment 122 or the entire cut path 112 becomes more uniform, thereby enhancing throughput and cut quality. The scan effect on quality can also be mitigated by employing full cutting path length scans or passes 132 after the segment cutting process is finished.

Preferably, each pass 132 is employed only once and each laser set 140 is employed only once to process the respective segment 122 to a desired intermediate depth or to a complete through cut before the next segment 122 is processed. Alternatively, laser set $\mathbf{140}_1$ of cutting passes $\mathbf{132}k_1$-$\mathbf{132}r_1$ can be repeated until a throughcut is made along some or all of segment 122j, then subsequent laser sets 140 can be repeated segment by segment until the entire cut path 112 is throughcut. Although only five overlapping passes 132 are shown for each laser pass set 140, skilled persons will appreciate that a substantially greater number of overlapping passes 132 could be employed, particularly with smaller incremental length increases as needed to accommodate the thickness of the target material. Skilled persons will also appreciate that any or all of the passes 132 employed in cutting profile 110d could be processed in both directions instead of a single direction as shown in FIG. 14. Skilled persons will also appreciate that multiple applications of each laser pass set 140 could be employed, that multiple applications of one or more passes 132 in a laser pass set 140 could be employed, that the numbers of each distinct pass 132 within a pass set 140 may differ, and that the number of applications of laser pass sets 140 and laser passes 132 may differ during the processing of a single cut path 112. Any of these variables may be adjusted in real time in response to monitoring information. Other than the details specified above, much of the discussion concerning FIGS. 10-13 is germane to the example in FIG. 14.

Figure 15:
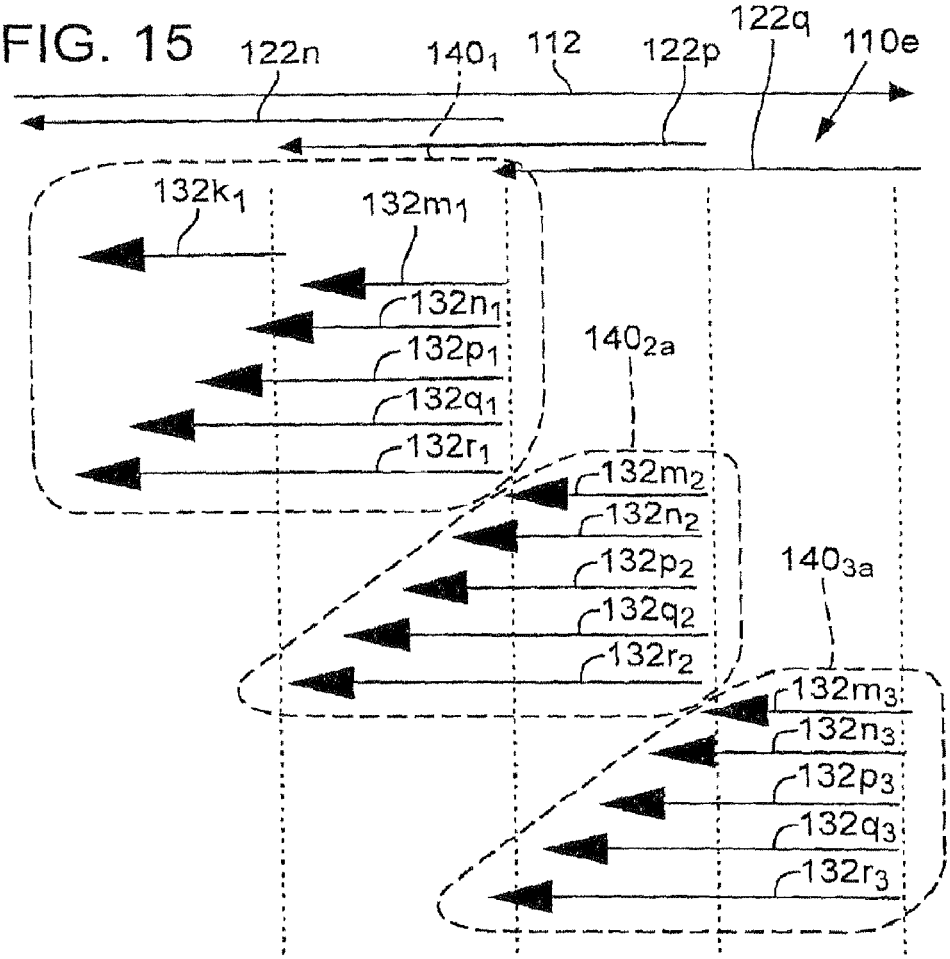
FIG. 15 is a simplified representation of an alternative segmented cutting profile produced in accordance with the present invention.

FIG. 15 depicts a simplified representation of an exemplary segmented cutting profile 110e that is somewhat similar to profile 110d, the cutting segments 122n, 122p, and 122q overlap to a greater degree and the subsequent laser pass sets $\mathbf{140}_{2a}$ and $\mathbf{140}_{2b}$ omit laser passes 132k. With reference to FIG. 15, profile 110e begins with the same laser pass set $\mathbf{140}_1$ that begins profile 110d. However, laser pass sets $\mathbf{140}_{2a}$ and $\mathbf{140}_{2b}$ omit laser passes 132k and their laser passes 132 increasingly overlap (about 86% in the following example) the previously laser pass set 140. In one example of this embodiment, laser pass $\mathbf{132}k_1$, which has a length of 200 μm, is applied 30 times. Then, laser pass $\mathbf{132}m_1$, which has a length of 240 μm (200 μm plus ⅕ of the length of pass $\mathbf{132}k_1$), is applied 6 times (⅕ of 30 passes). Then, laser pass $\mathbf{132}n_1$, which has a length of 280 μm (200 μm plus ⅖ of the length of pass $\mathbf{132}k_1$), is applied 6 times. This sequence is continued until laser pass set $\mathbf{140}_1$ is completed and then performed in connection with laser pass sets $\mathbf{140}_{2a}$ and $\mathbf{140}_{2b}$ with laser passes 132k omitted. In this example, the later portions of each segment 122 may not be throughcut until some of the subsequent segment 122 is processed. An advantage of overlapping the segments 122 to include portions of cut path 112 that are already throughcut is that any debris created by the shorter laser passes 132 that is deposited on the sides of throughcut portions is removed by the subsequent longer laser passes 132. The pass sets 140 in this example can exhibit dicing speeds of greater than or equal to 8.5 mm/minute with a 3.5 W UV laser, operated at 10 kHz, on a 750 μm-thick silicon wafer.

Figure 16:
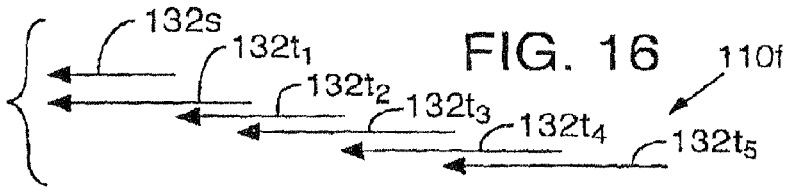
FIG. 16 is a simplified representation of an alternative segmented cutting profile produced in accordance with the present invention.

FIG. 16 depicts a simplified representation of an exemplary segmented cutting profile 110f. With reference to FIG. 16, cutting profile 110f is shown, for convenience, having a path cutting direction from left to right and having distinct laser passes 132$s_1$-132$t_5$ formed from right to left. Although laser passes 132$s_1$-132$t_5$ are depicted as parallel in FIG. 16 for convenience, they are preferably substantially collinear. FIG. 16 depicts an initial laser pass 132s and multiple gradually lengthening overlapping passes 132$s_1$-132$t_5$, preferably processed in numerical subscript order. In an exemplary embodiment, the length of laser pass 132s is about 200 μm or 300 μm and the length of each subsequent laser pass 132t is about 500 μm. This exemplary profile can yield dicing speeds of greater than or equal to 10.4 mm/minute with a 3.5 W UV laser, operated at 10 kHz, on a 750 μm-thick silicon wafer. For shallow trenches, each pass 132 may be applied only once, and for throughcuts in thick target materials, each pass 132 may be applied multiple times before the next sequential pass 132 is undertaken. Preferably, each laser pass 132 is applied multiple times to reach a selected intermediate depth before the next laser pass 132 is processed. In one embodiment, each consecutive laser pass 132 receives a single pass of laser output 32 and then s the entire profile 110f is repeated or the laser passes 132 are processed in reverse order.

Although only five overlapping laser passes 132t are shown, skilled persons will appreciate that a substantially greater number of overlapping laser passes 132 could be employed, particularly with smaller incremental length increases as needed to accommodate the thickness of the target material. Skilled persons will also appreciate that any or all of the laser passes 132 employed in cutting profile 110f could be sequentially processed in both directions instead of a single direction as shown in FIG. 16. Other than the details specified above, much of the discussion concerning FIGS. 10-15 is germane to the example in FIG. 16.

Figure 17:
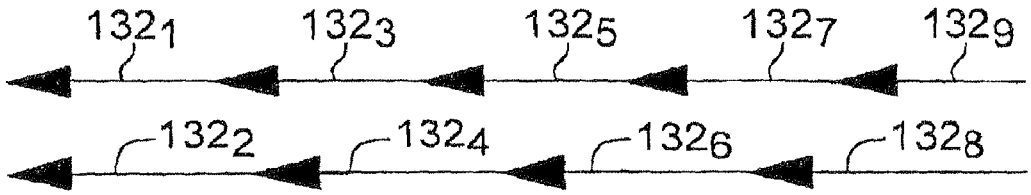
FIG. 17 is a simplified representation of an alternative segmented cutting profile produced in accordance with the present invention.

FIG. 17 depicts a simplified representation of an exemplary segmented cutting profile 110g that is somewhat similar to profile 110f. With reference to FIG. 17, odd subscripted laser passes 132$_1$, 132$_3$, 132$_5$, 132$_7$, and 132$_9$, have an exemplary pass length of 200 μm and even subscripted laser passes 132$_2$, 132$_4$, 132$_6$, and 132$_8$ have an exemplary pass length of 270 μm. A group of one of these laser passes 132 is delivered before the next sequential group is delivered. In one example the odd subscripted laser passes 132 are applied more times or to a greater relative depth (60% of cut depth versus 40% of cut depth, for example) than the even subscripted passes. This cutting profile with the exemplary pass lengths avoids an overlap junction until 5.4 mm along the cut path 112. Skilled persons will appreciate that a variety of cutting profiles and pass lengths can be employed to reduce scan effects and backfill and thereby facilitate enhanced throughput.

FIG. 18 is a representative illustration of ultraviolet ablative patterning of a trench or throughcut 150 in a workpiece 12 such as a wafer having an intrinsic silicon substrate 148 of a height or thickness 152 of 750 μm overlaid with a 0.5 μm-thick passivation layer of $SiO_2$ (not shown). Those skilled in the art will recognize that the thickness of the silicon workpieces and the thickness of the passivation layers will vary.

The trench 150 is preferably patterned by positioning the silicon workpiece 12 at the focal plane of the laser system 10 and directing a string of successively overlapping laser system output pulses 32 at the silicon workpiece 12 as the laser positioning system 30 moves workpiece 12 along the X- and/or Y-axes of the workpiece 12. The Z-height of the laser focus position can be simultaneously moved coincident with each succeeding laser pass 132 to place the laser focus at a sequentially deeper position in the silicon workpiece 12, thereby maintaining the focused spot at a position more coincident with the remaining silicon surface.

For forming a trench or throughcut 150 in silicon, an exemplary energy per pulse range is about 100 ηJ to 1500 μJ, with a typical energy per pulse range of about 200 μJ to 1000 μJ and a more typical energy per pulse range of about 400 μJ to 800 μJ, and most preferably an energy per pulse over about 800 μJ is employed. An exemplary PRF range is about 5 kHz to 100 kHz, with a typical PRF range from about 7 kHz to 50 kHz and a more typical PRF range from about 10 kHz to 30 kHz. Those skilled in the art will recognize that the laser performance as shown in FIG. 6 can achieve energy per pulse output at PRFs within the typical ranges described above. An exemplary focused spot size range is about 1 μm to 25 μm, with a typical focused spot size range from about 3 μm to 20 μm and a more typical focused spot size range from about 8 μm to 15 μm. An exemplary bite size range is about 0.1 μm to 10 μm, with a typical bite size range from about 0.3 μm to 5 μm and a more typical bite size range from about 0.5 μm to 3 μm. The bite size can be adjusted by controlling the speed of either or both of the stages of the laser beam positioning system 30 and coordinating the movement speed(s) with the repetition rate and firing of the laser. An exemplary segment size is about 200 μm to 800 μm. An exemplary combination employing a V06 laser on a 2700 micromachining system used a segment length of 300 μm and a segment overlap of 200 μm provided a very fast dicing speed. Skilled persons will appreciate that for different applications with different lasers for processing different materials, the preferred laser, segment, pass, and other parameters can be extremely different.

In one example, a trench or throughcut 150 can be made through 750 μm-thick intrinsic silicon overlaid with a 2.0 μm passivation layer of $SiO_2$ using an output pulse energy from the laser 14 of about 360 μJ and using a bite size of 1 μm with a stage velocity of 10 mm/s in fewer than 25 passes over the length of a cut path 112 over an 8"-diameter workpiece 12 with laser pulses having a focused spot size ($1/e^2$) diameter of 12 μm at the work surface. A trench 150 produced employing parameters described above may, for example, have a top surface opening width (diameter) ($d_t$) 154 of about 20 μm and an exit width (diameter) ($d_b$) 156 of about 13 μm, thereby producing an aspect ratio for this trench of about 30:1 and an opening taper angle of 0.4°. In some applications, it may be desirable to create an initial though hole before scanning a segment.

Persons skilled in the art will further appreciate that the selected segmented profile and segment length and the values of energy per pulse, focused spot size, and number of pulses employed to efficiently produce high quality trenches or throughcuts 150 in silicon may vary according to the material and thickness 152 of the silicon workpiece 12, relative thickness and composition of overlayers, of which $Sio_2$ is only one example, and the wavelength employed. For example, for production of throughcuts 150 in silicon only 50 μm thick, fewer than ten passes may be employed to produce the desired throughcut.

Those skilled in the art will recognize that various patterns of varying geometry, including, but not limited to, squares, rectangles, ellipses, spirals, and/or combinations thereof, may be produced through programming of a tool path file used by laser system 10 and positioning system 30 to position silicon workpiece 12 along X and Y-axes during processing. For laser cutting, the beam positioning system 30 is preferably aligned to conventional typical saw cutting or other fiducials or a pattern on the wafer surface. If the wafers are already mechanically notched, alignment to the cut edges is preferred to overcome the saw tolerance and alignment errors. The various segmented cutting profiles may be preprogrammed into the tool path file or other positioning system command files.

Laser system 10 can be employed to produce one or more groups of small through holes, such as by laser punching using the laser parameters set forth above. These through holes can be positioned on the top side near the periphery of workpieces 12, circuits or dies, or within scribing, slicing, or dicing streets or their intersections such that the back or bottom side of workpiece 12 can be precisely aligned to with respect to features on the top side. Such alignment facilitates backside processing such as laser scribing or sawing to enhance processing speed or quality. Techniques for front and/or backside wafer slicing or dicing are discussed in more detail in U.S. patent application Ser. No. 09/803,382 ('382 application) of Fahey et al., entitled "UV Laser Cutting or Shape Modification of Brittle, High Melting Temperature Target Materials such as Ceramics or Glasses," which is incorporated herein by reference. This information was published on Mar. 21, 2002 under U.S. Patent Publication No. US-2001-0033558 and published on Mar. 28, 2002 under International Patent Publication No. WO 02/24396, which correspond to the '382 application.

Figure 21:
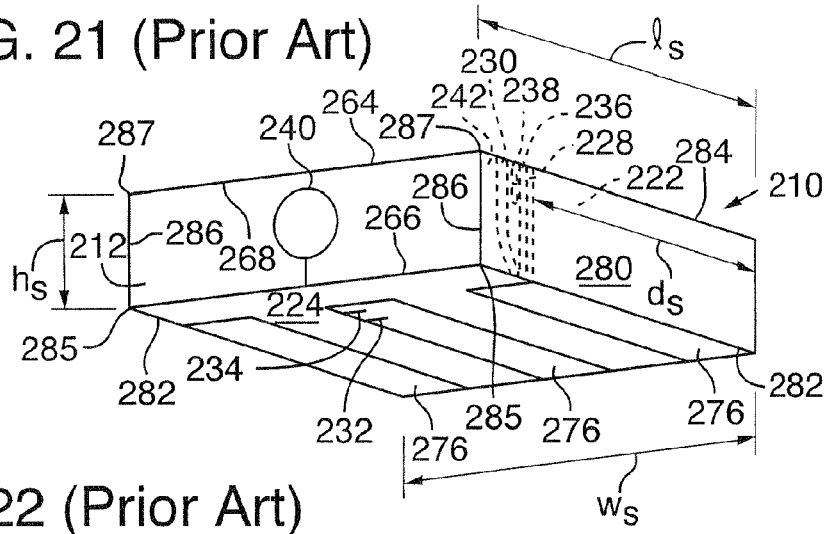
FIG. 21 (Prior Art)
*FIG. 21 is a deposited end perspective view of a prior art slider including a magnetic recording head.*
Figure 22:
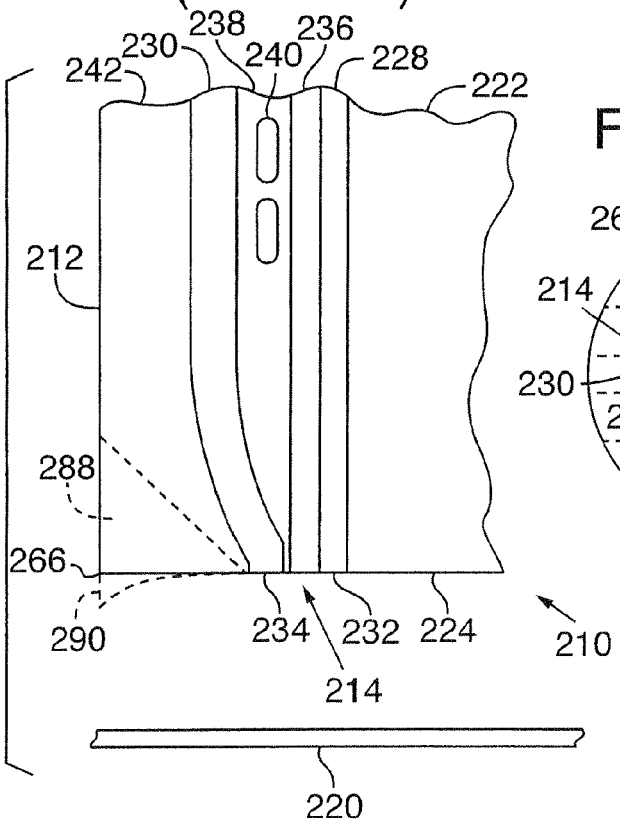
FIG. 22 (Prior Art)
*FIG. 22 is an enlarged cross-sectional view of a trailing end of a slider with its head oriented toward a magnetic recording disk.*

*Sliders move from track to track of direct access storage devices (DASD), such as disk drives including rotatable magnetic recording disks, to read or record desired information on the tracks. FIG. 21 is a deposited end perspective view of a trailing edge 212 of a prior art slider 210, and FIG. 22 is a cross-sectional view of trailing edge 212 of slider 210 with its magnetic head 214 oriented toward a magnetic recording disk 220. The figures accompanying this description are generally not drawn to scale or in proportion. For example, in FIGS. 21 and 22, the components of slider 210 are not drawn to scale or in proportion. A conventional "pico" slider 210 may have a slider height, $h_s$, of about 300 microns (μm), a slider width, $w_s$, of about 1000 μm, and a slider depth or length, $l_s$, of about 1250 μm.*

*With reference to FIGS. 21 and 22, a typical slider 210 includes a non-magnetic substrate 22 typically made of a ceramic material. Substrate 222 typically has a substrate depth, $d_s$, of about 300 μm deep and forms a majority of the body of slider 210. Substrate 222 generally, therefore, defines an air-bearing surface (ABS) 224 having an aerodynamic configuration suitable for lifting slider 210 a desired distance above the surface of disk 220 as it rotates. Transducer or magnetic head 214 has first and second spaced-apart magnetic pole pieces 228 and 230 which are located in proximity to trailing edge 212 of slider 210. Magnetic pole pieces 228 and 230 include first and second pole tips 232 and 234 that are aligned with the air-bearing surface 224. A non-magnetic gap layer 236 is located between the first and second pole pieces 228 and 230. Additionally, an insulating layer 238 is positioned between the non-magnetic layer 236 and the second magnetic pole piece 230. The insulating layer 238 is typically made of a polymeric material such as hard-baked photoresist, and a coil 240 is located within insulating layer 238. Finally, an overcoat layer 242, typically comprising 20-50 microns of a vacuum-deposited alumina ($Al_2O_3$), covers magnetic head 214 and forms trailing edge 212 of slider 210.*

Figure 23:
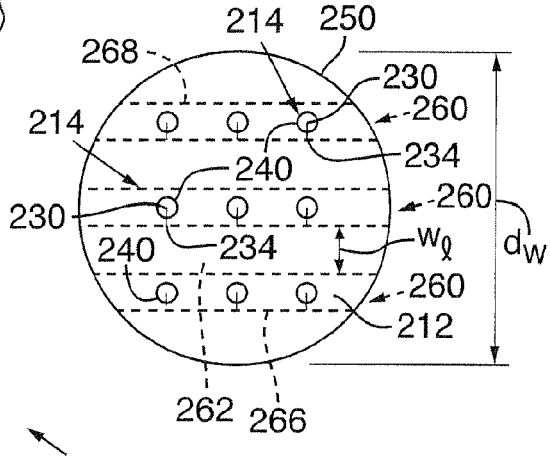
FIG. 23 (Prior Art)
*FIG. 23 is a plan view of a wafer having a plurality of thin-film magnetic heads, such as the magnetic head shown in FIG. 22, deposited thereon.*
Figure 24:
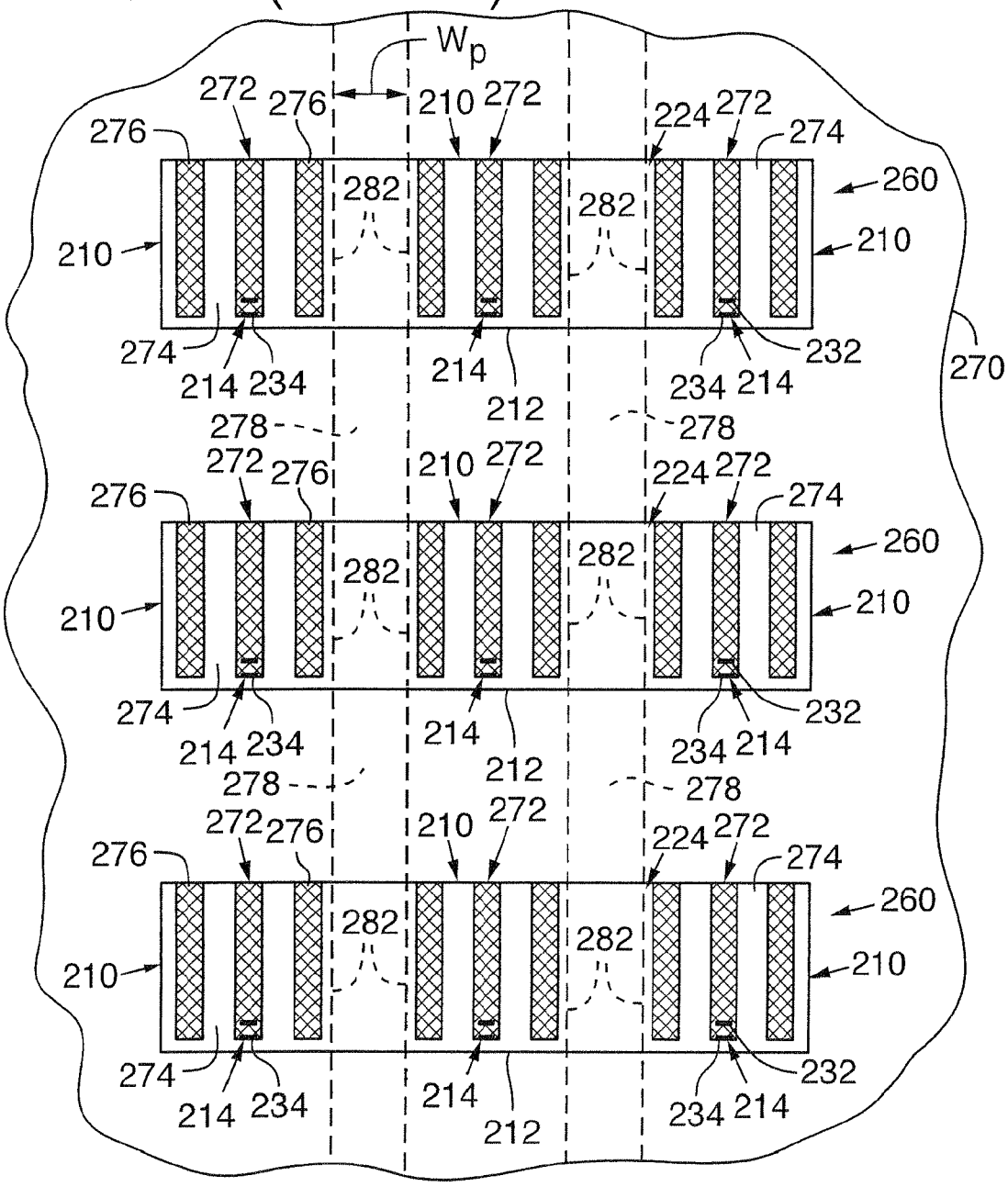
FIG. 24 (Prior Art)
*FIG. 24 is a plan view of a carrier supporting diced into rows of sliders, the air-bearing surface of the sliders being patterned with a photoresist mask.*
Figure 25:
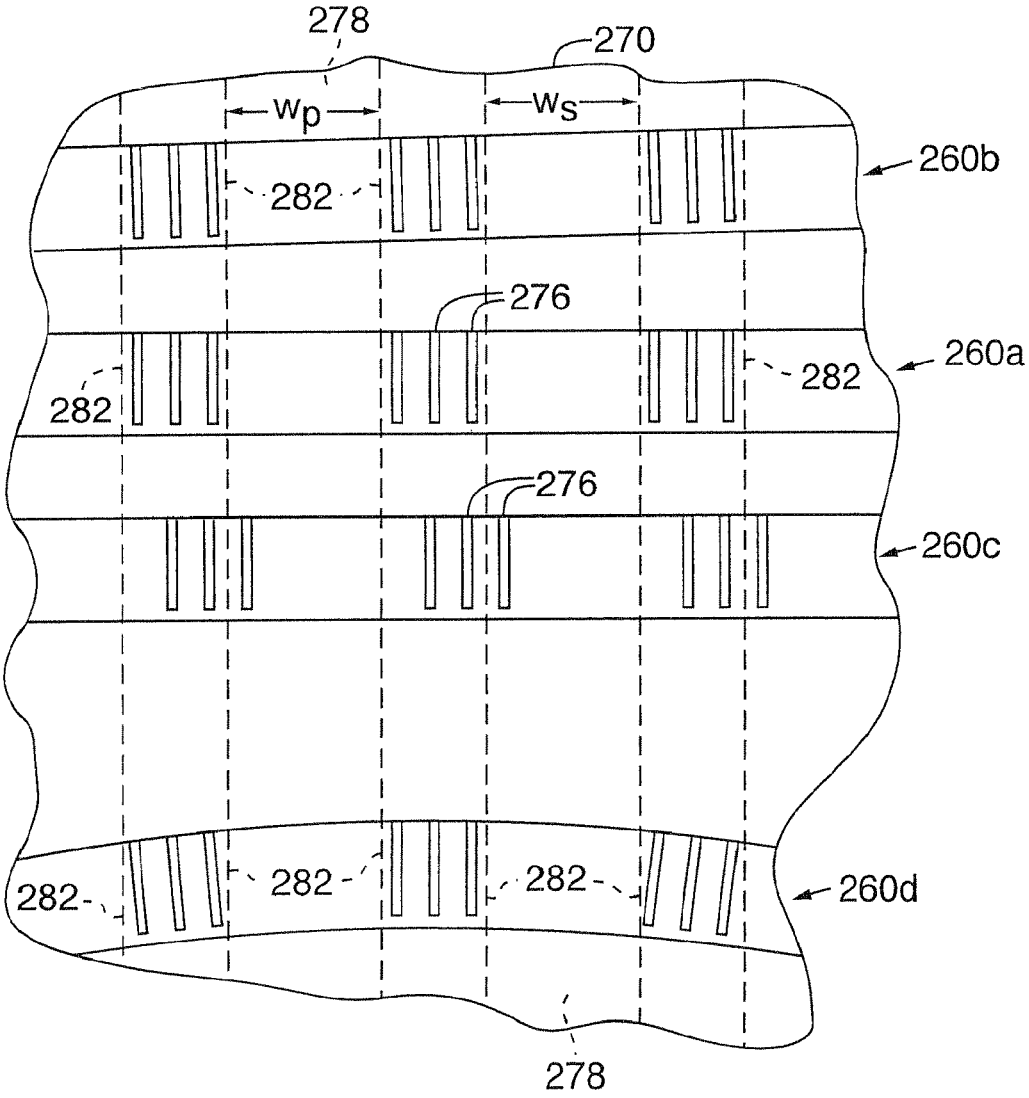
FIG. 25 (PRIOR ART)
*FIG. 25 is a simplified plan view of a carrier supporting a number of slider rows, some of which exhibit row defects including misalignment, prior to dicing into individual sliders.*

*FIGS. 23-25 illustrate various steps or stages of a method for manufacturing typical sliders 210. FIG. 23 shows a deposited end view of a ceramic wafer 250 supporting a plurality of sliders 210. The various layers of each slider 210 are built up layer by layer upon the wafer 250 to form the previously described slider features by deposition processes known to the semiconductor industry. An exemplary technique for generating the layers of a slider having a thin-film magnetic head is described in U.S. Pat. No. 4,652,954.*

*Wafer 250 is then typically cut into sections and then sliced into rows 260 along straight slicing lanes 262 by a mechanical cutting blade to form coarse air-bearing surfaces 224 and generally parallel nonair-bearing surfaces 264. The mechanical cutting process creates sharp edges 266 and 268 (FIGS. 21 and 22) with small chips along slicing lanes 262. Conventional slicing blades typically have a narrow dimension of about 200-300 μm along their cutting axis and produce cuts that are wider than the blades. The slicing blades currently need to be this wide to withstand stresses of making straight cuts through the strength and thickness of conventional slider wafers 250, for example. Thus, the lane width, $w_1$, between rows 260 of sliders 210 is greater than cut width to accommodate cut width variations due to blade wear and misalignments. Hence, the row pitch equals $w_1$ plus $h_s$, and the maximum number of rows equals the usable wafer diameter, $d_w$, divided by the row pitch. A conventional row pitch is, for example, 600 μm.*

*Course air-bearing surfaces 224 formed in the wafer slicing process are polished using advanced but cumbersome and time-consuming lapping techniques and slurries. Rows 260 are mounted on a fixture or carrier 270 after ABS polishing so that multiple rows 260 can simultaneously be processed through subsequent steps. The mounting procedure must employ an adhesive between nonair-bearing surfaces 264 and carrier 270 that is selected for sufficient mechanical strength to withstand the stresses of a later step of mechanically dicing the rows 260 into individual sliders 210. Unfortunately, these adhesives make it difficult to debond sliders 210 from carrier 270 at a later time.*

*FIG. 24 illustrates rows 260 of sliders 210 mounted on carrier 270 and oriented so that the air-bearing surfaces 224 of magnetic heads 214 are facing upwards. With reference to FIG. 24, polished air-bearing surfaces 224 are covered by photoresist pattern masks 272 that correspond with a desired air-bearing surface configuration having aerodynamic characteristics suitable for causing heads 214 to fly a desired level above disks 220. Photoresist masks are formed by first coating the entire surface with photoresist. Then, a masking tool having a predetermined pattern is aligned relative to the pole tips 232 and 234 or other fiducials, and light is directed through the masking tool so that selected portions of the photoresist on the polished ABSs 224 are exposed. Alignment of the masking tool is achieved by using a stepper with row-bar alignment or a well-aligned contact/projected aligner. After exposure, the photoresist is developed such that the desired air-bearing surface configurations are left covered with the photoresist masks 272, while the remainder of the photoresist is removed.*

*Once rows 260 of sliders 210 have been masked with the desired pattern of photoresist, the polished ABSs are etched by etching techniques such as ion milling or reactive ion etching which are expensive and slow. Such etching techniques etch away the exposed regions 274 of surfaces 224 to a desired depth to form raised covered regions or rails 276 underlying masks 272. The photoresist mask 272 is finally stripped away to reveal the desired patterns on the air-bearing sides of sliders 210.*

*With reference again to FIG. 24, rows 220 are diced by mechanical dicing blade along straight dicing singulation or paths 278 to create edges 282. The dicing blades for this cutting operation have a narrow dimension of about 75-150 μm along their cutting axis and produce cuts of about 150 μm wide. Thus, the path width, $w_p$, between rows 260 of sliders 210 is slightly greater. Hence, the slider pitch equals $w_p$ plus $w_s$, and the maximum number of sliders 210 per row 260 equals the row length (or usable wafer diameter) divided by the slider pitch. A conventional slider pitch is, for example, 1150 μm for a 100 μm wide dicing path. The dicing process creates small chips as it creates sharp edges 282, 284, and 286 and sharp corners 285 and 287 (FIG. 21) along singulation paths 278.*

*FIG. 25 also shows carrier 270 supporting a number of rows 260a, 260b, 260c, and 260d (generically rows 260) prior to dicing into individual sliders 210 with sides 280. Although row 260a depicts a typical row 260, rows 260b, 260c, and 260d demonstrate common slider manufacturing problems. Row 260b is relatively straight but is fixed to carrier 270 such that it is askew to row 260a. Row 260c is also relatively straight and relatively parallel to row 260a, but the pole tips 232 and 234 and/or the rails 276 of row 260c are offset with respect to those in row 260a. Row 260d exhibits row bow that may be primarily caused by stresses resulting from the mechanical slicing of wafer 250 into rows 260.*

*Because the dicing blade must cut along straight singulation paths 278, the sides 280 of sliders 210 in any column must be aligned within about one-half of the remainder of the path width minus the cut width. In view of the foregoing, rows 260b, 260c, and 260d can create a problem for the mechanical dicing operation and may reduce yield of sliders 210 with acceptable magnetic or aerodynamic properties. If the slant of row 260b is significant, the edges 282 of sliders in row 260b are askew with respect to rails 276, and the sliders 210 in row 260b will be defective. Similarly, many of sliders 210 in bowed row 260d, especially those at the ends for the case depicted, will be defective depending on the significance and position of the curves. With respect to row 260c, if the ABS features are sufficiently offset with respect to the other rows 260, then all sliders in row 260c will be defective since the edges of the sliders will be in improper positions or the dice paths will cut into ABS features.*

*The above-described process for manufacturing sliders 10 has several other drawbacks. In particular, sharp edges 266, 268, 282, 284, and 286, sharp corners 285 and 287, and chips formed during the dicing process make sliders 210 more susceptible to damage. For example, external shocks, such as by dropping a disk drive on the floor, can cause the sharp corners of the slider 210 to cut into the disk media, can cause cracks to propagate, or can cause particles to break loose at chipped which can then interfere with the ability of head 214 to make proper contact with disk 220. Polishing steps, which are time-consuming and employ expensive reagents, do not generally eliminate these chips or sharp edges.*

*In addition, the wide cuts made by the mechanical cutting blades significantly reduce the number of rows 260 and sliders 210 that can be fit onto each wafer 250. Skilled persons will also note that dicing blades tend to wear relatively quickly such that the width of their cuts may vary over time. In some cases, the blades can be inadvertently bent and then they produce curved or slanted cuts or increased chipping.*

*U.S. Pat. Nos. 5,872,684 of Hadfield et al. ('684 Patent) describes a method for etching a portion 288 of overcoat layer 242 wherein the etched portion 288 extends between the second pole tip 234 and trailing end 212 of slider 210. Etched portion 288 is sloped with respect to air-bearing surface 224 of slider 210 and is arranged and configured for preventing the overcoat layer from protruding past the air-bearing surface upon expansion of overcoat layer 242 during operation of magnetic head 214. Otherwise, overcoat layer 214 could form a protruding portion 290 due to localized heating when coil 240 is subjected to write currents and could interfere with slider/disk contact. Photolithography masking and etching techniques, like those described above, are used to etch away the potential protrusion regions of alumina overcoat layer 242. The '684 Patent does not address the dicing-generated chips or other dicing-related reliability problems.*

*Accordingly, one embodiment of the present invention employs a UV laser to cut ceramics, glasses, or silicon which may comprise the body of sliders 210, and particularly separate rows 260 or sliders 210 or round edges. A preferred process entails covering the surfaces of wafers 250, rows 260, or sliders 210 with a sacrificial layer such as photoresist, removing a portion of the sacrificial layer to create uncovered zones along existing edges or over intended edges; laser cutting wafers 250 into rows 260 or rows 260 into sliders 250; laser rounding edges 266, 268, 282, 284, and/or 286, and/or corners 285 and/or 287; cleaning debris form the uncovered zones such as by ion milling; and removing the sacrificial layer. Another process sequence includes an initial notching of the air-bearing surface 224 to form kerfs between rows 260 or sliders 210; laser processing to round the edges of the corners formed during the notching; and a final cutting to separate the rows or singulate the sliders.*

Figure 26:
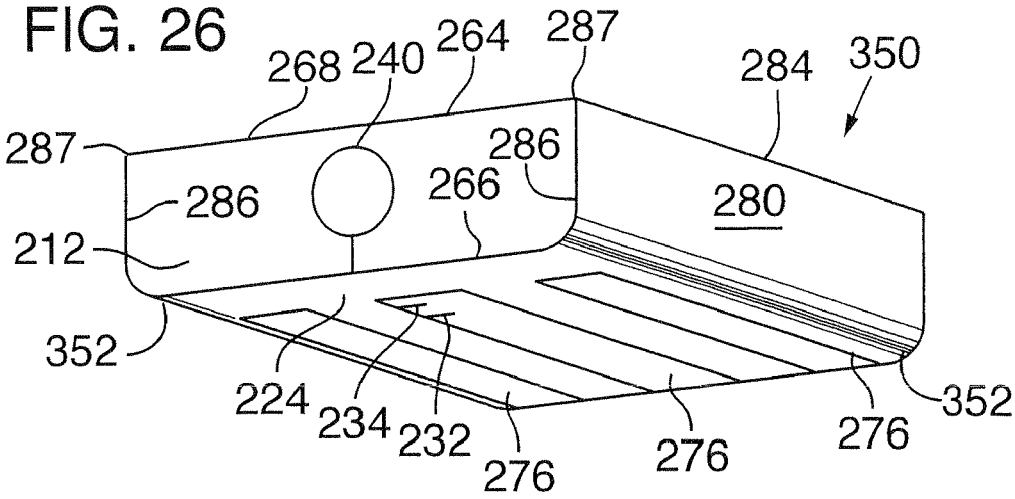
*FIG. 26 is a deposited end perspective view of a slider processed in accordance with one embodiment of the invention.*
Figure 27:
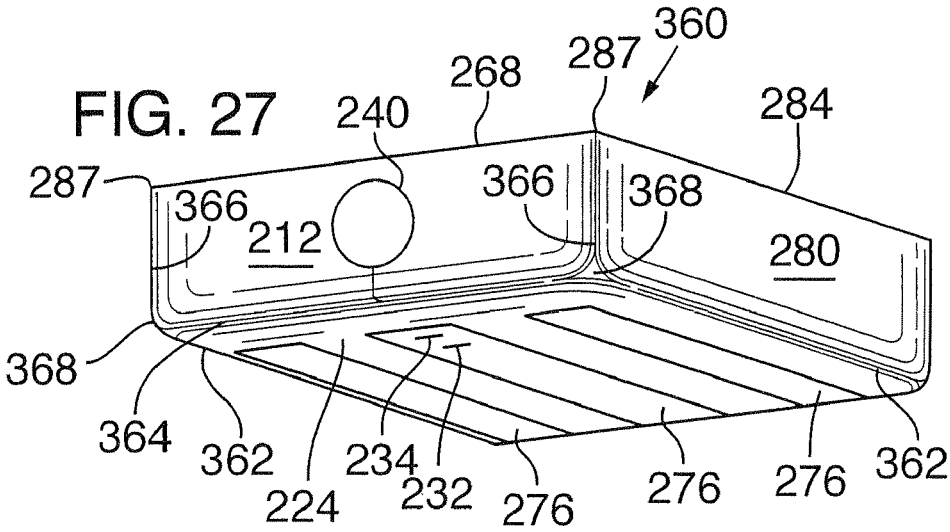
*FIG. 27 is a deposited end perspective view of a slider processed in accordance with another embodiment of the invention.*

*FIGS. 26 and 27 are exemplary deposited end perspective views of alternative slider embodiments after processing in accordance with the invention as described herein. With reference to FIGS. 26 and 27, processed slider 350 exhibits rounded edges 352 where edges 282 have been processed by laser system output 330, and processed slider 360 exhibits rounded edges 362, 364, and 366 where edges 282, 266, and 286 have been processed by laser system output. Processed slider 360 also exhibits rounded corners 368 even when corners 285 have not been separately and intentionally processed by laser system output. Separately and intentionally processing corners 285 provides, however, a greater radius of curvature. Skilled persons will appreciate that upper edges 268 and/or 284 and/or upper corners 287 can also be rounded by laser system output if desirable. Sliders 350 and 360 are less susceptible to external shocks or chip generation than sliders 210, and sliders 350 and 360 can also ride closer to and make proper contact with disk 220.*

Figure 27A:
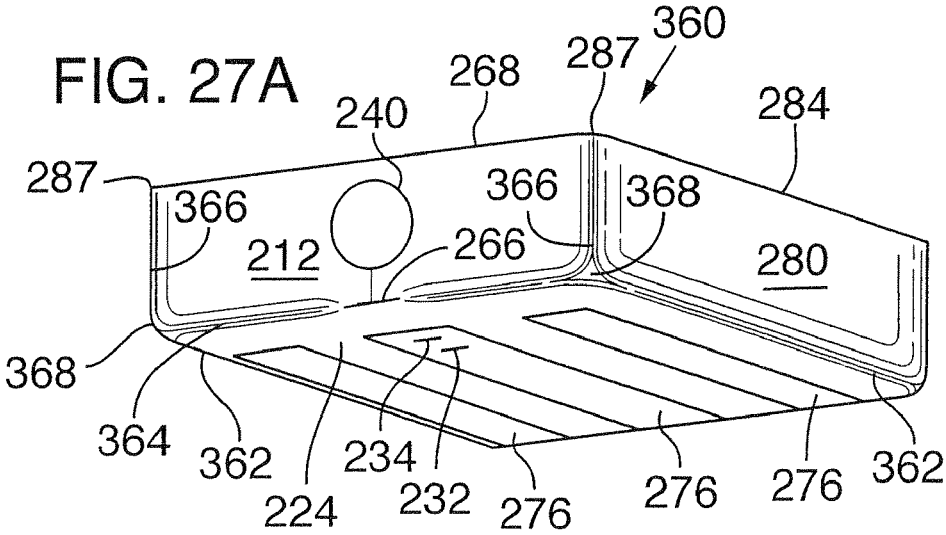
*FIG. 27A is a deposited and perspective view of a slider processed in accordance with yet another embodiment of the invention.*

*FIG. 27A shows a variation of FIG. 27. With reference to FIG. 27A, a selected portion of edge 266 in proximity tip 369 is not rounded. In general, selected portions of any edge can be left unrounded whenever it is beneficial to do so. The positioning system 314 can simply be instructed to pass over such portions.*

*FIGS. 28a-28h (collectively FIG. 28) show simplified side sectional views of a generic workpiece as it undergoes process steps of an exemplary laser rounding process. In one embodiment, a mechanical cutting blade separates rows 60 or sliders 10 along lanes 62 or paths 78 to form surfaces 24 or sides 80, respectively. The respective edges 66 and/or 82 can then be rounded with laser system output. An advantage of this technique is that it suits the established infrastructure in the industry. Another advantage of mechanically cutting lanes 262 or paths 278 first is that there is no debris surrounding the cut so mechanical cutting provides the laser rounding operation with a flat surface that facilitates rounding the edges to a preferred radius of curvature.*

Figure 28A:
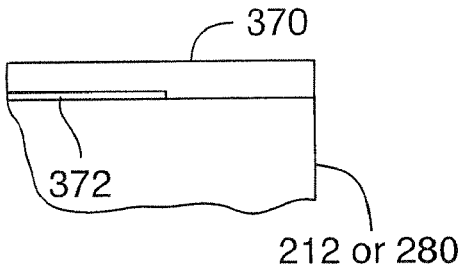
*FIGS. 28a-28h are simplified side sectional views of a generic workpiece as it undergoes process steps of an exemplary laser rounding process.*

*With reference to FIG. 28a, an optional sacrificial protection layer 370 may be applied to patterned ABS 224 or all of*

*the workpiece surfaces prior to laser rounding to protect ABS surface 224 and important ABS features 372, including rails 276 and pole tips 232 and 234, from redep and/or to facilitate cleaning of nonpermanent redep. A preferred sacrificial layer 370 comprises a conventional lithographic photoresist or a laser ablatable resist. Unfortunately, conventional materials used for sacrificial layer 370 have a tendency to burn when impinged by laser output suitable for laser rounding.*

Figure 28B:
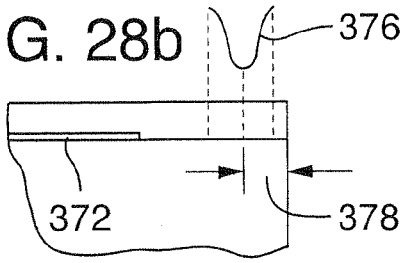
Figure 28C:
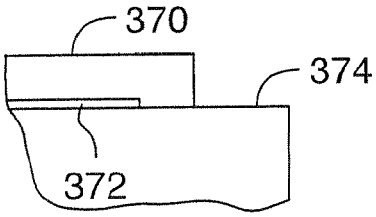

*With reference to FIGS. 28b and 28c, it is preferable, therefore, to remove about a 10-25 μm wide area of sacrificial layer 370 from covering the ABS 224 in proximity to edges 266 or 282 to create a small uncovered zone 374. Uncovered zone 374 is preferably wider than the spot area of output but narrow enough so that all ABS features 372 remain covered. These strips of sacrificial layer 370 can be removed by conventional lithographic techniques, or by direct ablation or expose and etch solid-state UV laser techniques disclosed in U.S. Pat. No. 6,025,256 of Swenson et al. An example of parameters for resist-processing laser output 376 includes a beam positioning offset 378 of 10-20 μm from edge 266 or 282, a 7 μm bite size, at 14 kHz at 30 μJ at 266 nm. If direct laser ablation is performed, the laser output parameters, particularly the power density, are adapted to be insufficient to adversely affect ABS 24. In a preferred embodiment, the same laser system that is used to round edges 266 or 282 is used to remove the strip of sacrificial layer 370, but the laser output is generated at a higher repetition rate or the laser spot may be defocused to reduce the power density. FIG. 28c shows uncovered zone 374 after a strip of sacrificial layer 370 has been removed.*

Figure 28D:
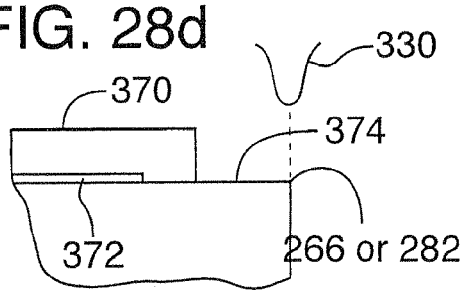
Figure 28E:
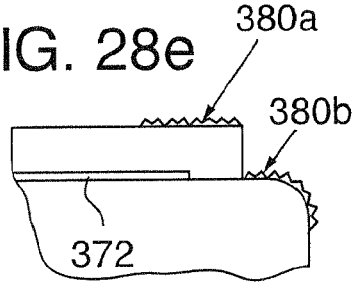
Figure 28F:
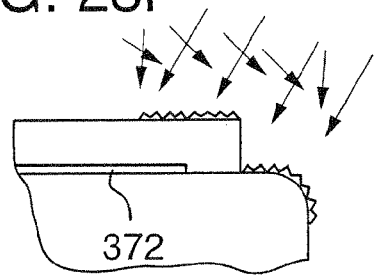

*With reference to FIG. 28d, laser output is applied to ABS 224 in uncovered zone 374. Laser output is preferably positioned perpendicular to the ABS 224, with the spot centered at edges 266 or 282 (or corners 287), as shown; however, skilled persons will appreciate that other impingement angles and offsets from edges 266 or 282 can be employed. Although a single laser pass is preferable, multiple passes of laser output can be employed. FIG. 28e shows redep 380a on the surface of sacrificial layer 370 and redep 380b on the surface of rounded edge 362 or 164, collectively redep 380, that may result from application of laser output.*

Figure 28G:
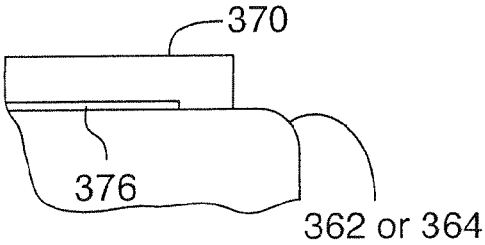
Figure 28H:
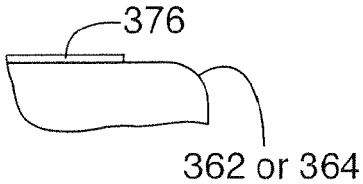

*After the laser rounding operation shown in FIG. 28d, a cleaning operation shown in FIG. 128f can be used to remove any laser-generated debris 380 that may have accumulated in the uncovered zone 374. A major advantage of employing a sacrificial layer is that it permits the use of more aggressive cleaning techniques, such as ion milling or reactive ion etching (RIE), to remove redep 380b without risk of damage to ABS features 372. These aggressive cleaning techniques may also remove a surface portion of sacrificial layer 370 and any redep 380a thereon. Without sacrificial layer 370, less aggressive cleaning techniques, such as solvent or surfactant applications with or without ultrasound or mechanical scrubbing, are preferred. FIG. 28g shows slider 210 after cleaning. Finally, sacrificial layer 370 is stripped off the entire ABS 224, removing any remaining laser-generated debris 380a with it. FIG. 28h shows an uncovered slider 350 or 360 with its sharp edge removed.*

Figure 29A:
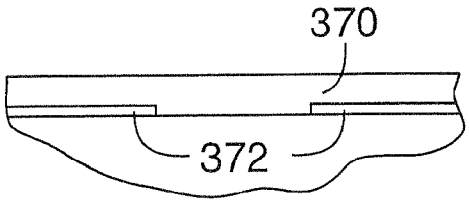
*FIGS. 29a-29f are simplified side sectional views of a generic workpiece as it undergoes process steps of an exemplary laser cutting process.*

*FIGS. 29a-29f (collectively FIG. 29) show simplified side sectional views of a generic workpiece as it undergoes process steps of an exemplary laser cutting process (row slicing or slider dicing). With reference to FIG. 29a, an optional sacrificial protection layer 370 may be applied to patterned ABS 224 or all of the workpiece surfaces, as previously described, prior to laser cutting. With respect to the overall process of manufacturing sliders 210, in one example, sacrificial layer 370 is applied directly after ABS 224 has been patterned and before the photoresist mask 272 has been removed. Alternatively, the rounding and/or severing processes can be performed using mask 272 before or after patterning. It can also alternatively be applied after mask 272 has been removed or after sliders 210 have been singulated. Instead of, or in addition to, covering the surface with sacrificial layer 370, laser cutting may be performed from the back side of wafer 250 so that laser-generated debris 380 becomes irrelevant. Back side alignment can be accomplished with laser or other markings or through holes made from ABS 224 side of wafer 250, and/or edge alignment and/or calibration with a camera view of ABS features 372 or deposited face of trailing end 212.*

Figure 29B:
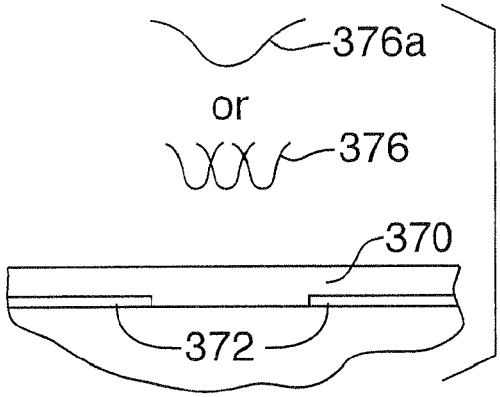
Figure 29C:
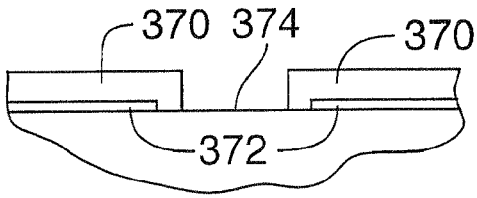

*With reference to FIGS. 29b and 29c, preferably a 10-50 μm wide area of sacrificial layer 370 covering ABS 224 in proximity to intended edges 266 and 268 or 282 is removed to create an uncovered zone 374. These strips of sacrificial layer 370 can be removed as previously described. If appropriate for a specific layout of rows 260 or sliders 210, a larger spot size 376a or multiple adjacent or overlapping trim lines 340 of laser output 376 can be employed for ablative removal of a strip of sacrificial layer 370. FIG. 29c shows uncovered zone 374 after the strip of sacrificial layer 370 has been removed.*

Figure 29D:
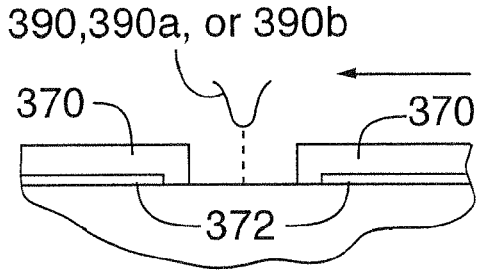

*With reference to FIG. 29d, laser output 390 is applied to ABS 224 in uncovered zone 374. Laser output 390 is preferably positioned perpendicular to the ABS 224, with the spot centered between intended edges 266 and 268 or 282 (or on corners 285), as shown; however, skilled persons will appreciate that other impingement angles and offsets from intended edges 266 and 268 or 282 can be employed. Multiple passes of laser output 390 are typically employed for both row slicing and slider dicing; however, slider dicing can be achieved in a single pass. Laser output 390 used for laser cutting may employ a higher peak power density than laser output used for laser rounding.*

*Although using common parameters for slicing through both the alumina and the AlTiC is advantageous for simplification, it may be desirable for throughput, for example, to employ different parameters for alumina slicing output 390a to slice through the alumina than for AlTiC slicing output 390b to slice through AlTiC. In particular, it may be desirable to use 266 nm or 355 nm to cut the alumina and 355 nm or 532 nm to cut the AlTiC. In one embodiment, row slicing through the alumina on multiple rows is performed with output 390a and then slicing through the AlTiC is performed in the notches with output 390b to finish the cuts. Alternatively, a row 260 may be sliced completely through with outputs 390a and 390b before a second row 260 is sliced. Each of the two different laser outputs 390 maybe applied in a single or in multiple passes. Switching the parameters of output 390 can be achieved with a single laser employing a switchable wavelength, repetition rate, or focus depth, or can be achieved through a multi laser head system, with different laser heads responsible for the different laser outputs 390. With respect to slider dicing, each traverse cut 396 (FIG. 31) traverses regions of slider 210 that are completely alumina and regions that are completely AlTiC. Accordingly, output 390a can be applied in one or more passes along the alumina portions of cuts 396 and then output 390b can be applied in one or more passes along the AlTiC portions of cuts 396. Alternatively, each cut 396 can be made completely one at a time, switching between alumina processing output 390a and AlTiC processing output 390b for each pass.*

Figure 29E:
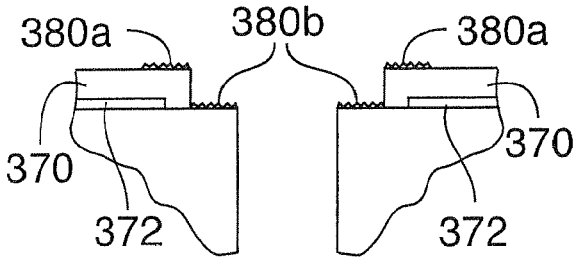
Figure 29F:
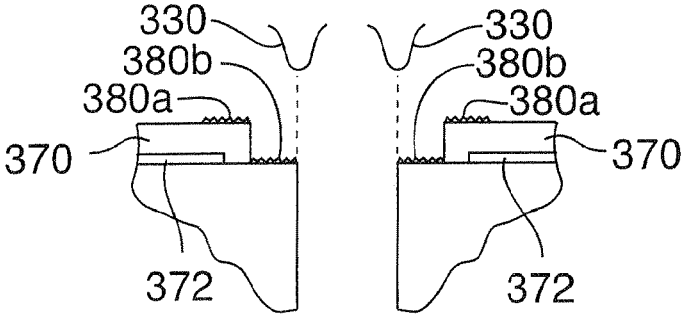

*FIG. 29e shows separated edges 266, 268, or 282 with redep 380a on the surface of sacrificial layers 370 and redep 380b on the surface of edges 266, 268 or 282. FIG. 29f shows the beginning of the laser rounding process, described in*

*connection with FIG. 28, that is applied to both edges 266 or 282. The debris 380 can optionally be cleaned off before the laser rounding process is performed to provide a flatter surface to facilitate rounding the edges to a preferred radius of curvature of about 20-25 μm. Although laser cutting without the additional laser rounding step will provide benefits over mechanical cutting, performing a laser rounding step in addition to laser cutting is preferred.*

Figure 30:
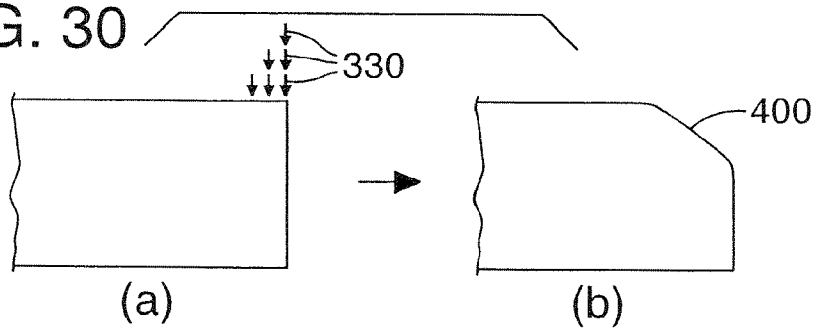
*FIG. 30 is a simplified side section view of a generic workpiece undergoing a number of lines or rows of laser passes whose positions vary with distance from an edge.*

*Applying one or more additional laser processing passes along the newly formed edges can change the radius of curvature along the edges. Furthermore, a more gradual slope can be obtained by employing one or a small number of passes slightly interior of an edge and gradually increasing the number of passes as the beam is positioned more closely to the edge. FIG. 30 shows a symbolic representation of forming such a gradually sloped edge 400 with the number of arrows in each column representing the number of passes. It is noted that an increased radius of curvature can also be achieved by performing one or multiple passes directly centered at the edge. Generally, the slope or angle of the edge or sidewall can be controlled by controlling the spacing of the lines of laser spots as well as the distances from the edge and number of passes. More passes at or near the edge results in a steeper angle, and passes further from the edge can be used to produce a shallower slope.*

*Although laser sacrificial layer strip removal, laser cutting, and laser rounding may entail multiple laser process steps at different parameters, an all laser process has many advantages and employs repositioning along only a single axis for each linear operation.*

Laser cutting destroys significantly less material (kerfs of less than 50 μm wide and preferably less than 25 μm wide and typically about 10 μm wide) than does mechanical cutting (slicing lanes of about 300 μm wide and dicing paths of about 150 μm wide) so that devices on wafers can be manufactured much closer together, allowing many more devices to be produced on each wafer. Thus, the laser cutting process minimizes the pitch between rows and the pitch between devices. *In an example, the pitch between rows 260 can be 350 μm and the pitch between slider can be 1025 μm, realizing about a 33% increase in the number of rows 260 and a gain of about one slider 210 for every thirteen sliders 210 per row 260.*

Elimination of the mechanical cutting can also simplify manufacture of devices on workpieces 12. In particular, mechanical cutting can impart significant mechanical stress to devices such that they come off their carriers. To avoid losing rows, device manufacturers may employ strong adhesives or epoxies between the rows and the carrier. An all laser process significantly reduces the mechanical strength requirements of the adhesive used for fixturing the rows onto a carrier. Laser *rounding and* cutting, therefore, permits the elimination of strong adhesives or epoxies used to affix the rows to the carrier and the harsh chemicals needed to remove them. Instead, the adhesives can be selected for ease of debonding, such as the reduction of debond time and less exposure to potentially corrosive chemicals, and for amenability to UV laser processing, greatly reducing risk of damage to the devices, and thereby enhancing yield.

Laser row slicing reduces row bow because laser slicing does not exert as much mechanical stress as mechanical slicing. However, if row bow or other of the row defects are apparent, the rows can be laser diced (and re-sliced) to compensate for these defects without concern for the critical device to device alignment needed between rows for mechanical dicing. For convenience, the term (through) cutting may be used generically to include slicing (often associated with wafer row separation) or dicing (often associated with part singulation from wafer rows), and slicing and dicing may be used interchangeably in the context of this invention.

Because positioning system 30 can align to through holes or fiducials, laser system 10 can process each row and/or each device independently. With respect to slanted rows, the laser spot can perform traverse cuts across the slanted rows at appropriate positions with respect to outer edges of the devices with stage and/or beam translations between each cut to effect a rectangular or curvilinear wave patterns as desired. Thus, laser dicing can compensate for row fixturing defects and perhaps save entire rows of devices that would be ruined by mechanical dicing.

Figure 31:
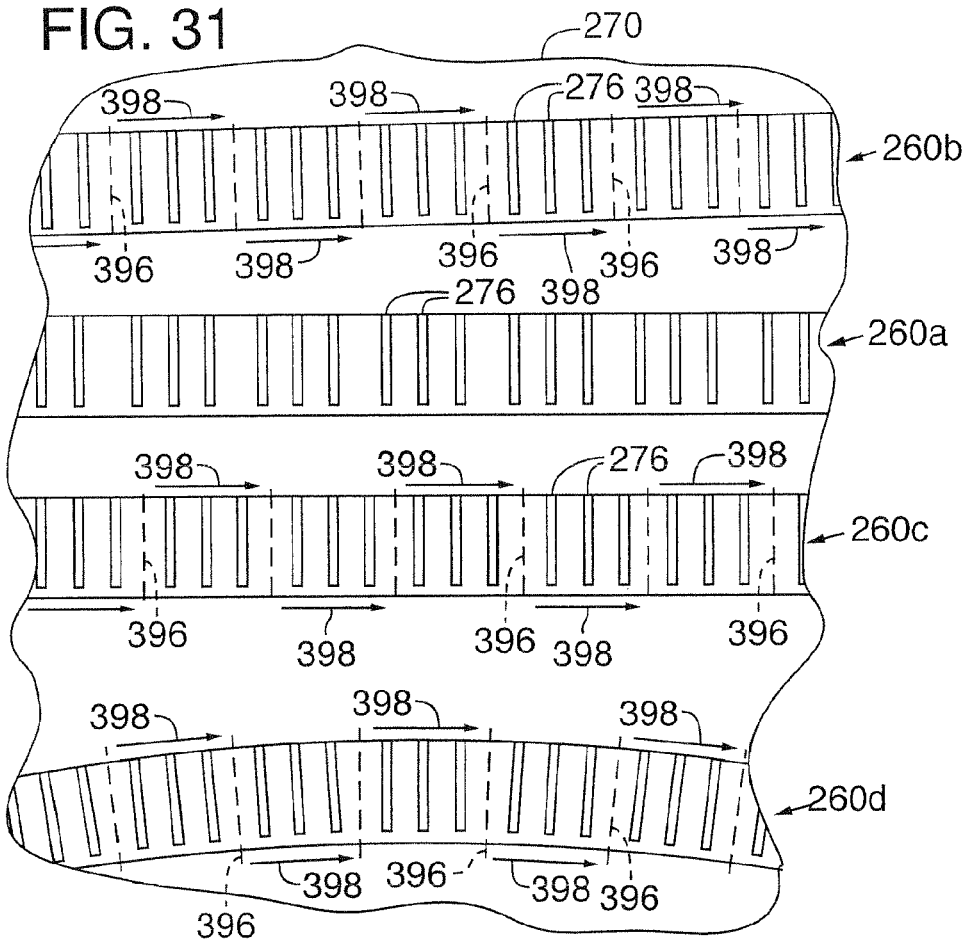
*FIG. 31 is a plan view of a portion of a row carrier supporting bowed and angled slider rows that can be diced by laser row defect compensation.*
Figure 31:
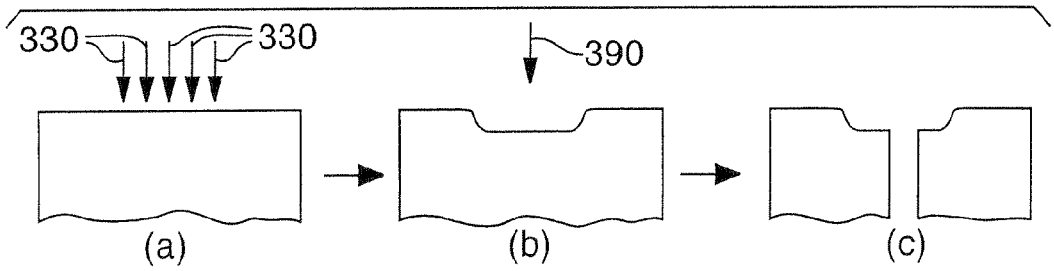

*FIG. 31 demonstrates an exemplary laser process for row defect compensation using transverse cuts 396 and stage and/or beam translations 398 to generally make cuts 396 at angles such that the surfaces of sliders 210 are substantially perpendicular to each other. Numerous other cutting patterns are possible such as making all cuts in a first column before making all cuts in second column. Sliders 210 in rows 260a, 260b, and 260c can be singulated in a similar fashion regardless of angle or offset. With respect to row 260d, the rectangular wave cut and translate pattern can be curved to align with the row bow.*

Figure 32:
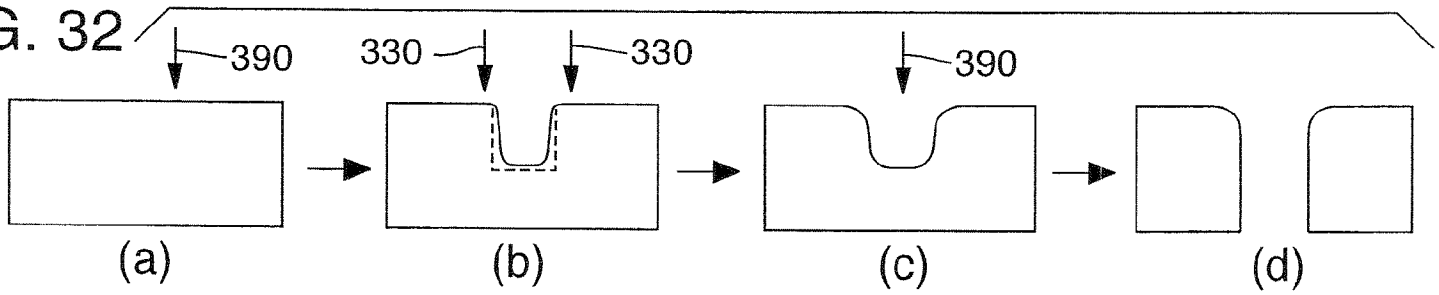
*FIG. 32 shows a flow diagram of notching, rounding, and separating process with simplified side sectional views of a generic workpiece as it undergoes process steps.*

*FIG. 32 shows a flow diagram of a simplified cutting and rounding process with simplified side sectional views of a generic workpiece such as wafer 250 as it undergoes process steps. In this alternative embodiment, a mechanical cutting blade or laser output 390 notches rows 260 or sliders 210 along lanes 262 or paths 278 to a depth, preferably above an adhesive layer if a combination of laser and mechanical notching or cutting is to be employed. Alternatively, for preslice notching, laser output 390a may be employed to notch all the way through the alumina material. FIG. 32b shows the result of laser notching with a solid line and shows the result of mechanical notching with a broken line. Laser output then rounds the desired edges and/or corners, and finally the mechanical cutting blade or laser output 390 finishes the separation of rows 260 or singulation of sliders 350 or 360. The width of the kerf or diameter used for the cutting process can be less than or equal to the width of the kerf or diameter used for the notching process. A sacrificial layer 370 and the related steps associated with it may be employed prior to a notching process. Skilled persons will appreciate that edges on the bottom side can optionally be done by this notching technique, preferably such that top and bottom alignment is conserved. Such notching would greatly facilitate subsequent laser separation of the rows 260 or sliders 210, 350, or 360. One advantage of this technique is that there are fewer pieces to align since the parts are still referenced to each other, i.e., the rounding is completed before the pieces are separated. Another advantage is that the preliminary notch does not expose the adhesive layer where mechanical cutting is to be employed, since the adhesives needed to withstand mechanical cutting are particularly volatile in response to laser radiation.*

Figure 33:
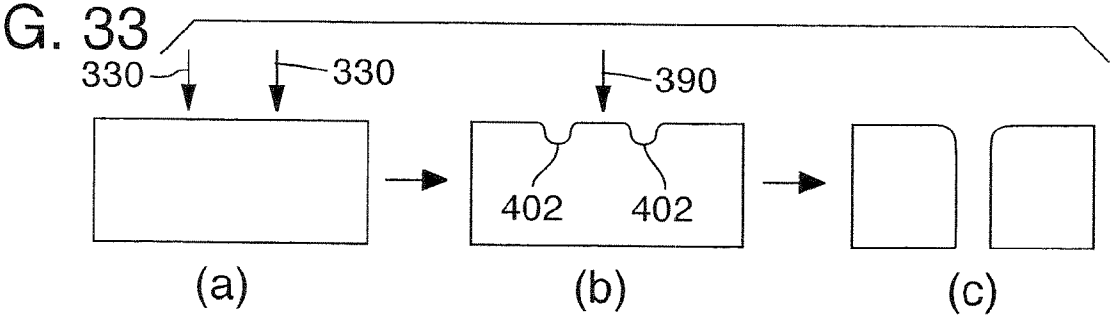
*FIG. 33 shows a flow diagram of a rounding and separating process.*

*FIG. 33 shows a flow diagram of an alternative cutting and rounding process with simplified side sectional views of a generic workpiece as it undergoes process steps. With reference to FIG. 33, rounding laser output 330 is applied along two parallel trim lines. The trim lines are spaced such that the edges 282 of the dice lane 278 align with the centers of the trenches 402 produced by the laser outputs 330. In FIG. 33b, a dice blade or laser cuts the workpiece surface between the trenches 402 to produced rounded separate parts shown in FIG. 33c.*

Figure 34:
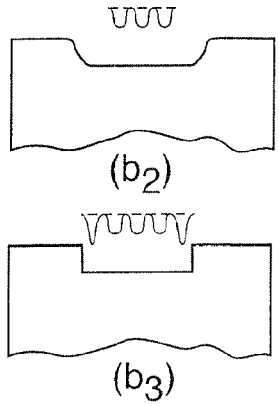
*FIG. 34 shows a flow diagram of an alternative rounding and separating process.*

*FIG. 34 shows an alternative rounding, notching, and separating process. In FIG. 34a, multiple adjacent passes of*

*laser output 330 or 390 create an extra wide notch (FIG. 34b) with rounded edges. Then output 390 or a cutting blade is applied to separate the rows 260 or sliders 210. This process creates a shelfed edge shown in FIG. 34c. The edges of the lower shelves can be rounded with processes previously discussed. It may be useful to use several different parameters for various passes in one notching step to tailor the notch geometry, including sidewall angle (FIG. 34b$_2$ or 34b$_3$)).*

*With reference to FIGS. 29 and 31-34, it may be desirable to notch through one side of the workpiece, preferably about one half the thickness of the workpiece, and then finish the row or slider separation from the opposite side, preferably by flipping the workpiece and using alignment techniques previously discussed. This embodiment may provide significant throughput advantages particularly for high-aspect ratio kerfs. The rounding process can be performed before or after notching or after row or slider separation.*

Figure 35:
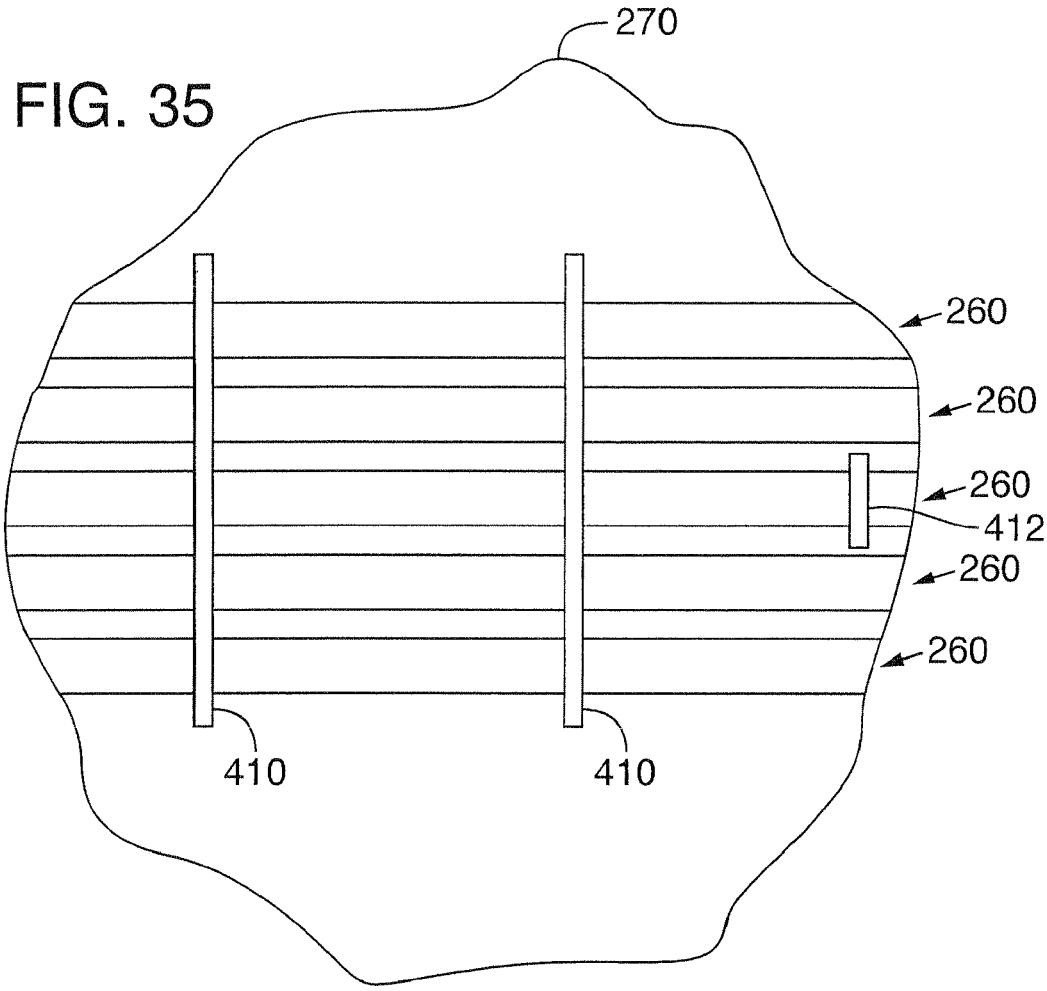
*FIG. 35 shows examples of excimer mask lines used for resist removal, edge rounding, slicing, or dicing.*

*FIG. 35 demonstrates that an excimer laser at an appropriate UV wavelength can be used with appropriate-sized line-making masks 410 or 412 (about the width of preferred Gaussian spot sizes) for the above-described laser dicing or rounding operations without employing the preferred bite size technique. The line-making masks 410 or 412 can have a length the size of an entire column or as little as the desired edge. For example, the surfaces of wafers 250, rows 260, or sliders 210 can be covered with sacrificial layer 370; the portions of the sacrificial layer 370 can be removed to create uncovered zones; wafers 250 and/or rows 260 can be diced and edges 266, 268, 282, 284, and/or 286, and/or corners 285 and/or 287 can be rounded with a UV excimer through a line mask of an appropriate shape and size; the entire surface can be aggressively cleaned to remove debris from the uncovered zones; and the sacrificial layer can be removed.*

Another application of the segment cutting method is to produce MEMS (microelectronic machine system) devices 160. FIG. 19 is a representative illustration of ultraviolet laser cutting of a MEMS device 160. In one preferred embodiment, the MEMS device 160 is cut using the method described above to create trenches 162a, 162b, 162c, 162d, and 162e (generically trenches 162) in silicon and to create a depression 164 by employing a pattern of adjacent trenches 162. Skilled persons will appreciate that through computer control of the X and/or Y axes of the laser positioning system 30, the directed laser system output pulses 32 can be directed to the work surface such that overlapped pulses create a pattern which expresses any complex curvilinear geometry. Skilled persons will appreciate that the segmented cutting techniques and other processing techniques disclosed herein can be used to cut arcs and other curves for nonMEMS applications as well.

Figure 20:
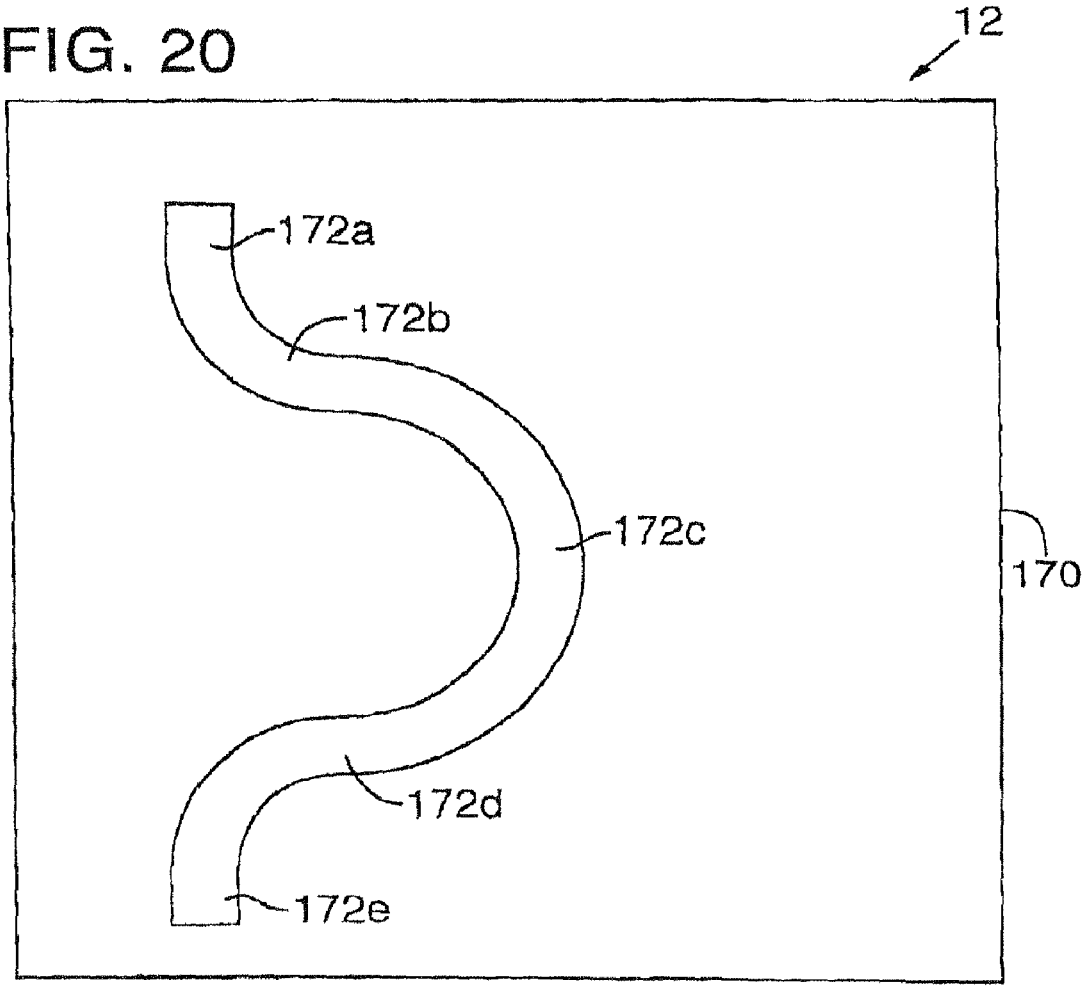
FIG. 20 is a representative illustration of an AWG device fabricated by a segmented cutting process on a semiconductor wafer.

Another application of the segmented cutting method is to process optical integrated circuits, such as an arrayed waveguide gratings (AWG) device 170 produced on semiconductor wafer workpieces 12. FIG. 20 is a representative illustration of ultraviolet ablative patterning of an AWG device 170. In one preferred embodiment, the AWG device 170 is patterned using the method described above to create curvilinear trenches 172, with portions 172a, 172b, 172c, 172d, and 172e in silicon, for example. Although trench 172 is shown to be symmetric, skilled persons will appreciate that through computer control of the X and/or Y axes of the beam positioning system 30, the laser system output pulses 32 can be directed to the work surface such that overlapped pulses 32 create a pattern which expresses any complex curvilinear profile or geometry. Skilled persons will appreciate that segments 122 are not required to be linear and can be arcs such that each portion 172 can be processed with one or more nonlinear segments 122. This capability may be used to produce complex curvilinear geometric patterns in silicon useful for efficient production of a variety of AWG devices 170. Skilled persons will also appreciate that the segmented cutting techniques could be employed to produce large diameter through hole or blind vias.

The '382 application of Fahey et al. describes techniques for forming rounded edges along cuts, as well as for laser slicing and dicing ceramic wafers. Many of these techniques, as well as the alignment techniques disclosed therein, can be advantageously incorporated into the present invention to cut silicon wafers and further improve the quality of and processing speed for cutting ceramic or other brittle, high melting temperature materials, such as glasses. U.S. patent application Ser. No. 09/803,382 is herein incorporated by reference.

It is contemplated that performing the cuts in a reactive gas atmosphere, such as an oxygen-rich atmosphere, will generate debris that is easier to cut. In an oxygen rich environment, for example, it is proposed that the hot ejected silicon will more likely form $SiO_2$ in an exothermic reaction that may keep any resulting $SiO_2$ backfill redep at a higher temperature for a longer time making it less likely to stick strongly on the silicon and/or making it easier to clean from a trench with a quick subsequent laser pass 132. To the extent that redep (or exposed trench material) cooling or resolidification is a factor, this recharacterization time interval may to some extent influence the maximum preferred length 126 of segments 122 such that the laser spot can process length 126 and return to impinge again any redep (or warmed exposed trench material) at the initial laser pass 132a and subsequent laser passes 132 before the redep (or exposed trench material) cools or sticks strongly.

Skilled persons will also appreciate that purge gases, such as nitrogen, argon, helium, and dry air, may be usefully employed to assist in the removal of waste fumes from the workpiece 12 and more preferably to blow potential backfill through any existing throughcut portions along cut path 112. Such purge gases can be delivered to the close vicinity of the work surface using delivery nozzles attached to laser system 10.

If desirable, silicon workpieces 12 processed in accordance with the present invention may be cleaned using ultrasonic baths in liquids including but not limited to water, acetone, methanol, and ethanol to improve the surface quality of affected areas. Those skilled in the art will also recognize that cleaning of processed silicon workpieces 12 in hydrofluoric acid can be beneficial in removing unwanted oxide layers.

Although the present invention is presented herein only by way of example to silicon wafer cutting, skilled persons will appreciate that the segmented cutting techniques described herein may be employed for cutting a variety of target materials including, but not limited to, other semiconductors, GaAs, SiC, SiN, indium phosphide, glasses, ceramics, AlTiC, and metals with the same or different types of lasers including, but not limited to, solid-state lasers, such as YAG or YLF, and $CO_2$ lasers, of similar or different UV, visible, or IR wavelengths.

U.S. Prov. Pat. Appl. No. 60/301,701, filed Jun. 28, 2001, entitled Multi-Step Laser Processing for the Cutting or Drilling of Wafers with Surface Device Layers of Fahey et al., which is herein incorporated by reference describes multi-step techniques for cutting wafers and the device layers they support with different severing processes, such as different laser parameters. This multi-step process involves the optimization of laser processes for each individual layer, such that the processing of any one layer or the substrate material does not negatively affect the other layers. A preferred process entails the use of UV lasers for cutting layers that are transparent in the IR or visible range, allowing for a different laser to be used for cutting the wafer than is used for cutting the layers. This process permits significantly less damage to the layer than would occur if only one laser, such as an IR laser, were used to cut through the entire layer and wafer structure. Furthermore, this laser processing of the layers allows for the optimization of other cutting processes, such as the use of a wafer saw, in order to reduce or eliminate the damage to the layers on the wafer. One example employs a UV laser 10 to cut layers that include ceramic, glass, polymer or metal films on the top or bottom surfaces of the wafer substrate, while a different laser, such as a 532 nm laser or IR laser, or the same laser or optical system run with different process parameters is used to cut through the substrate material after the surface layers have been cleared away. Each of the laser processes may employ the same or different segmented cutting techniques that cooperate with the other laser parameters chosen to facilitate high quality and throughput. Alternatively, surface layers may be processed by conventional full scan processing while the thicker substrate layer may be processed by a segmented technique.

One embodiment entails covering the surfaces of the wafer with a sacrificial layer such as photoresist; optionally removing a portion of the sacrificial layer to create uncovered zones over intended cutting areas; laser cutting the layers atop the wafer substrate to a width equal or greater than that which will occur in the subsequent substrate cutting step; then cutting the wafer with a separate processing step or steps using a different laser, wavelength, pulse width, fluence, bite size, and/or other laser processing parameters.

Another embodiment allows for removal of the surface layer or layers with one laser process or several laser processes and then employs a subsequent process or several subsequent processes that complete the cutting with a non-laser technique that only has to remove the wafer substrate material. One example of such technique is the removal of all metal, polymer or other soft material from the cutting lane using the laser, such that during subsequent cutting with a saw blade, the blade only makes contact with the substrate material. This technique will be of particular use when cutting wafers with metallization in the dice lanes, such as that due to the presence of test devices, or wafers which have a polymer dielectric material such as some of the low-K materials that are presently on the market.

*FIGS. 36a-36f (collectively FIG. 36) show simplified side sectional views of a generic workpiece as it undergoes process steps of an exemplary laser dicing or drilling process. In one embodiment, separate processing steps are used in succession to cut through the layers 470, 472 in order from the top layer 470 down to the substrate 522 (FIGS. 36a, 36b, 36c, and 36e). Depending upon preference and upon the layer materials, it may be of interest to choose the FIGS. 36c-36d process, in which lower layers 472 are opened to successively smaller cut widths in order to not have the successive processes affect the overlayer. The typical best case would be the process of FIGS. 36e-36f, where all layers are cleared open to the same width. Finally (FIGS. 36d, 36f), the substrate 522 is cut in the position where the layers have been cleared off by the earlier processes. In this figure, the cuts shown are cross sections of a cut which may either be a dicing cut or a drilled via. If necessary, further process steps may occur where the laser is used to clean up the edges of the cuts made in the earlier steps. While the layer cuts and cleanup steps will be done with a laser, the step which involves cutting through the substrate may be done with a laser or with another technique such as mechanical sawing.*

Figure 36A:
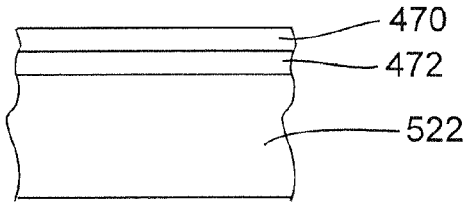
*FIGS. 36a-36f are simplified side sectional views of a wafer with multiple layers as it undergoes process steps of a generic multi-step dicing or drilling process.*
Figure 36B:
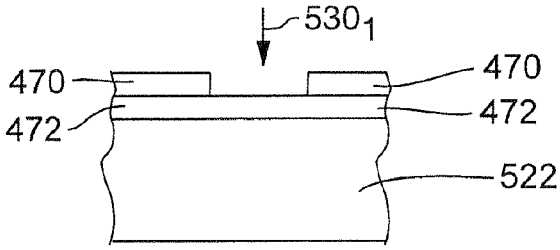
Figure 36C:
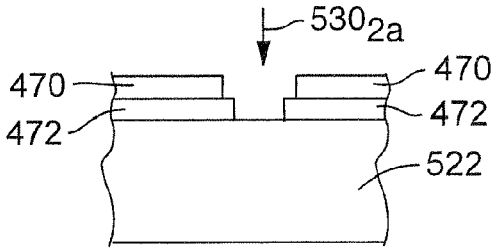
Figure 36D:
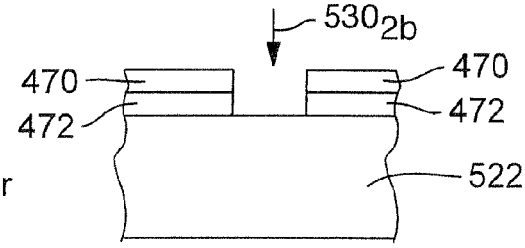
Figure 36E:
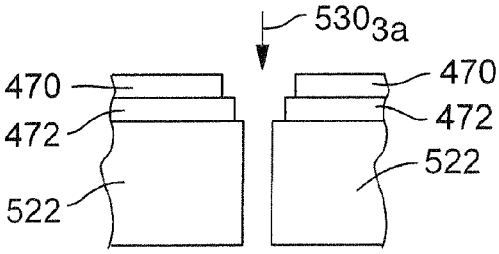
Figure 36F:
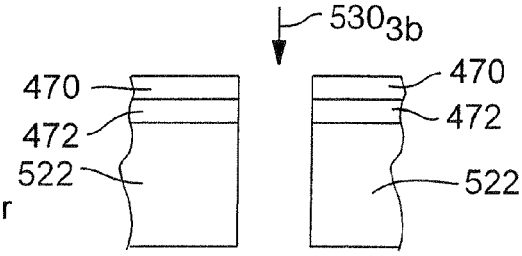
Figure 37:
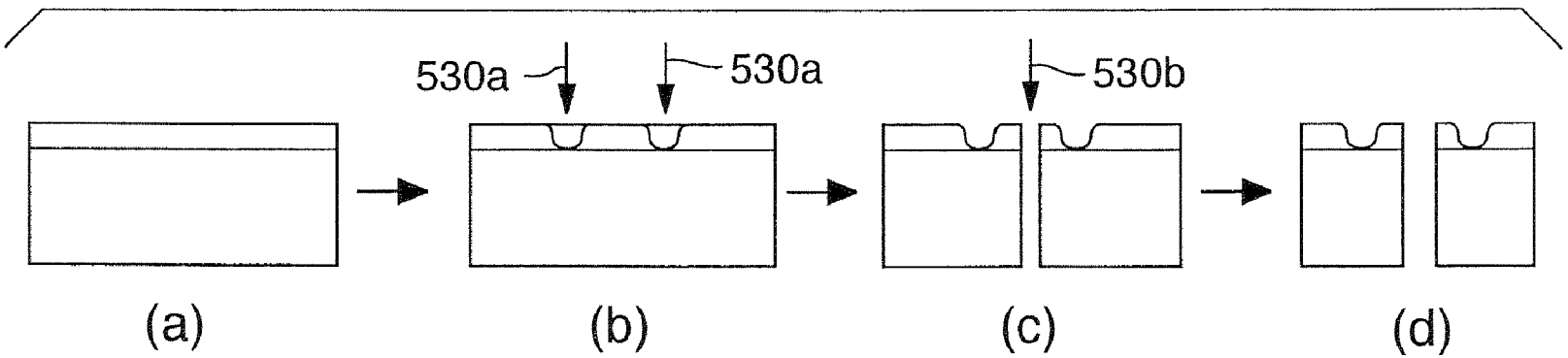
*FIG. 37 is a simplified side sectional view of a wafer with layers as it undergoes laser geometry modification prior to subsequent cutting or drilling processes.*

*With reference to FIG. 36a, the top layer 470 could either be a device layer, or could be an optional sacrificial protection layer to protect important features, such as solder bumps on die or features on die (laser diodes, optical waveguides or MEMS components, etc.) from redep and/or to facilitate cleaning of nonpermanent redep. A preferred sacrificial layer comprises a conventional lithographic photoresist or a laser ablatable resist. Unfortunately, conventional materials used for sacrificial layer have a tendency to burn when impinged by laser output suitable for dicing or removal of many types of device layer. As shown in FIG. 36c, it is therefore preferable to remove about a 10-25 μm wider area of the sacrificial layer in proximity to the edges of the notches to be made in the underlying layers to create a small uncovered zone. These strips of sacrificial layer can be removed by conventional lithographic techniques, or by direct ablation or expose and etch solid-state UV laser techniques disclosed in U.S. Pat. No. 6,025,256 of Swenson et al. An example of parameters for resist-processing laser output includes a beam positioning offset 178 of 10-20 μm from edge 266 or 282, a 7 μm bite size, at 14 kHz at 30 μJ at 266 nm. If direct laser ablation is performed, the laser output parameters, particularly the power density, are adapted to be insufficient to adversely affect the underlying device layers or substrate material. In a preferred embodiment, the same laser system that is used to round edges 266 or 282 is used to remove the strip of sacrificial layer, but the laser output 522 is generated at a higher repetition rate or the laser spot may be defocused to reduce the power density.*

*One skilled in the art will realize that an excimer laser at an appropriate UV wavelength can be used with appropriate-sized line-making masks (about the width of preferred Gaussian spot sizes) for the above-described laser dicing operations for those layers which require UV ablation. The line-making masks can have a length the size of an entire column or as little as the desired edge of each die. For example, in FIG. 36, a UV excimer through a line mask of an appropriate shape and size could be used to perform the ablation steps in FIG. 36b, 36c, 36e, 36d, or 36f if that laser is appropriate for cutting the material of interest in that particular process step. In addition, it could be used for the removal of any sacrificial layer atop the wafer. Skilled persons will appreciate that if the semiconductor industry moves toward making die on different types of wafers, like InP, SOS, SOI, etc., the rounding and cutting processes disclosed herein can be applied to devices manufactured with or on such wafers. Silicon carbide and titanium carbide, or other insulating (non-semiconductor) substrates, may also be similarly processed.*

*Another embodiment of the invention provides such a method or system that modifies the geometry of the layer or layers by one or several laser processes 530 such that the subsequent cutting or drilling of the substrate does not cause damage in the active area of the devices. For example (FIG. 8), a process sequence may include an initial notching of layer or layers on either side of the cut without removing all the material from the dice lane area such that the outermost edges formed by the laser trenches are unaffected by the subsequent substrate dicing process. As discussed above, this laser notching would be performed using parameters specifically optimized for cutting the layers cleanly without inducing damage that would occur if substrate dicing parameters were used. Use of this geometry modification would include, but is not limited to, the formation of trenches or other shapes outside the dicing kerf which would act as crack stops or mechanisms for arresting delamination which may be induced by the wafer substrate dicing step. These notches may*

*extend only to the bottom of the layers or may extend further into the substrate material depending on the damage mode which is anticipated during the dicing process. For example, if the layers are delaminating during the subsequent cutting process, the notches need only go below the interface of interest. If the substrate material is being damaged during the subsequent cutting process, it may be of interest to make the notches penetrate more deeply into the substrate material.*

It will be obvious to those having skill in the art that many changes may be made to the details of the above-described embodiment of this invention without departing from the underlying principles thereof. The scope of the present invention should, therefore, be determined only by the following claims.

What is claimed is:

[1. A method of increasing throughput in a laser cutting process, comprising:

directing a first pass of first laser pulses to impinge along a first segment of a cutting path having a cutting path length greater than 100 μm, each first laser pulse having a first spot area on a workpiece, the first segment having a first segment length that is longer than the first spot area and shorter than the cutting path length;

directing a second pass of second laser pulses to impinge along a second segment of the cutting path, each second laser pulse having a second spot area on the workpiece, the second segment having a second segment length that is longer than the second spot area and shorter than the cutting path length, the second segment overlapping the first segment by an overlap length greater than at least the first or second spot areas; and after directing at least the first and second passes of laser pulses, directing a third pass of third laser pulses to impinge along a third segment of the cutting path, each third laser pulse having a third spot area on the workpiece, the third segment having a third segment length that is longer than the third spot area and shorter than the cutting path length, the third segment including a subsequent portion of the cutting path other than the first or second segments, wherein the subsequent portion of the cutting path has a nonoverlap length greater than the first, second, or third spot areas.]

[2. The method of claim 1 in which major portions of the first and second segments overlap.]

[3. The method of claim 1 in which the second segment includes the first segment.]

[4. The method of claim 3 in which the first and second segments are processed in a same direction.]

[5. The method of claim 3 in which the first and second segments are processed in opposite directions.]

[6. The method of claim 1 in which the first and second segments are processed in a same direction.]

[7. The method of claim 1 in which the first and second segments are processed in opposite directions.]

[8. The method of claim 1 in which additional sets of first and/or second laser pulses are applied to the first and/or second segments to form a through trench within the first and/or second segments prior to applying the third laser pulses.]

[9. The method of claim 1 further comprising:

forming a through trench in the first and/or second segments prior to applying the third laser pulses.]

[10. The method of claim 1 further comprising:

forming a through trench in the first and/or second segments with multiple passes of laser pulses prior to applying the third laser pulses; and forming a through trench within the third segment.]

[11. The method of claim 10 further comprising:

forming a through trench along the entire cutting path length.]

[12. The method of claim 11 in which the cutting path length is greater than 1 mm and the first, second, and third segment lengths are between about 10 μm and about 500 μm.]

[13. The method of claim 1 in which the cutting path length is greater than 1 mm and the first, second, and third segment lengths are between about 10 μm and about 500 μm.]

[14. The method of claim 13 in which the cutting path length is greater than 10 mm and the first, second, and third segment lengths are between about 200 μm and about 500 μm.]

[15. The method of claim 13 in which the first, second, and third laser pulses are characterized by a UV wavelength, a pulse repetition frequency of greater than 5 kHz, pulse energies of greater than 200 μJ, and a bite size of about 0.5 to about 50 μm.]

[16. The method of claim 1 in which the first, second, and third laser pulses are characterized by a UV wavelength, a pulse repetition frequency of greater than 5 kHz, pulse energies of greater than 200 μJ, and a bite size of about 0.5 to about 50 μm.]

[17. The method of claim 16 in which the workpiece has a thickness greater than 50 μm.]

[18. The method of claim 17 in which the workpiece has a thickness greater than 500 μm.]

[19. The method of claim 12 in which the workpiece has a thickness greater than 50 μm.]

[20. The method of claim 12 in which the workpiece has a thickness greater than 500 μm, the cutting path length is greater than 100 mm, and the throughout along the entire length of the cutting path is made with fewer than 25 passes of laser pulses over any position along the cutting path.]

[21. The method of claim 13 in which the workpiece has a thickness greater than 200 μm, further comprising:

cutting through the entire thickness along the cutting path at a cutting speed of greater than 10 mm per minute.]

[22. The method of claim 21 in which a major portion of the thickness of the workpiece comprises a semiconductor material, a glass material, a ceramic material, or a metallic material.]

[23. The method of claim 21 in which a major portion of the thickness of the workpiece comprises Si, GaAs, SiC, SiN, indium phosphide, or AlTiC.]

[24. The method of claim 22 in which the laser pulses are generated from a solid-state laser or a $CO_2$ laser.]

[25. The method of claim 1 in which the laser pulses are generated from a solid-state laser or a $CO_2$ laser.]

[26. The method of claim 2 in which the overlap length of the first and second portions or the first or second segment lengths are sufficiently short such that the second laser pulses impinge along the overlap length before a major portion of any debris generated by the first laser pulses cools along the overlap length to ambient temperature.]

[27. The method of claim 1 in which the third segment excludes the first or second segments.]

[28. The method of claim 1 in which the first laser pulses impinge along the cutting path in a first cutting direction and the first laser pulses have a first polarization orientation that is parallel to the first cutting direction, in which the third laser pulses impinge along the cutting path in a third cutting direction and the third laser pulses have a third polarization orientation that is parallel to the third cutting direction, and in which the first and third cutting directions are transverse.]

[29. The method of claim 28 further comprising:

employing a polarization control device to change from the first polarization orientation to the third polarization orientation.]

[30. The method of claim 10 further comprising:

monitoring throughout status with a throughout monitor to determine throughout positions where throughcuts have been affected along the cutting path; and reducing impingement of the throughcut positions during the passes of first, second, third, or subsequent laser pulses in response to information provided by the throughout monitor.]

[31. The method of claim 1 in which the laser pulses within the first pass have generally similar parameters.]

[32. The method of claim 1 in which the laser pulses of the first, second, and third passes have generally similar parameters.]

[33. The method of claim 1 in which the laser pulses of at least two of the first, second, and third passes have at least one generally different parameter.]

[34. The method of claim 1 in which at least two of the laser pulses in at least one of the first, second, or third passes have at least one generally different parameter.]

[35. The method of claim 1 in which multiple passes of laser pulses are applied to the first segment to form a throughout within the first segment.]

[36. The method of claim 35 in which the throughcut is formed in the first segment before the pass of second laser pulses is applied to the second segment.]

[37. The method of claim 36 in which multiple passes of laser pulses are applied to the second segment to form a throughout within the second segment.]

[38. The method of claim 37 in which the throughout is formed in the second segment before the pass of third laser pulses is applied to the third segment.]

[39. The method of claim 38 in which multiple passes of laser pulses are applied to subsequent segments to sequentially form throughcuts within the respective subsequent segments to form a full length throughcut along the cutting path length.]

[40. The method of claim 1 in which only minor portions of the first and second segments overlap.]

[41. The method of claim 1 in which the first laser pulses impinge along the cutting path in a first cutting direction and the first laser pulses have a first polarization orientation that is oriented to the first cutting direction to enhance throughput or cut quality, in which the third laser pulses impinge along the cutting path in a third cutting direction and the third laser pulses have a third polarization orientation that is oriented to the third cutting direction to enhance throughput or cut quality, and in which the first and third cutting directions are transverse and the first and third polarization orientations are transverse.]

[42. The method of claim 1 in which at least one of the segments is an arc.]

[43. The method of claim 1 in which a purge gas is employed to facilitate blowing potential backfill debris through throughcuts along the cutting path.]

[44. The method of claim 1 in which an elongated laser pass that includes at least three first, second, and third segments is applied to the cutting path.]

[45. The method of claim 1 in which each spot area along a segment is in proximity to or partly overlaps the spot area of a preceding laser pulse.]

[46. A method of increasing throughput for forming a cut along a cutting path having a cutting path length on a workpiece, comprising:

selecting a segment length that is shorter than the cutting path length;

directing a first pass of first laser pulses having first spot areas to impinge the workpiece along a first segment of about the segment length along the cutting path;

directing a second pass of second laser pulses having second spot areas to impinge the workpiece along a second segment of about the segment length along the cutting path, the second segment overlapping the first segment by an overlap length greater than at least the first or second spot areas; and after directing at least the first and second passes of laser pulses, directing a third pass of third laser pulses having third spot areas to impinge along a third segment of about the segment length along the cutting path, the third segment including a portion of the cutting path that extends beyond the first or second segments, wherein the portion of the cutting path has a portion length greater than the first, second, or third spot areas.]

[47. The method of claim 46 in which impingement of laser pulses along the cutting path generates debris and in which the overlap length or the segment length is sufficiently short such that the second pass of second laser pulses impinge along the overlap length before a major portion of any debris generated by the first laser pulses cools to ambient temperature along the overlap length.]

[48. A method of increasing throughput in a laser cutting process, comprising:

directing a first pass of first laser pulses to impinge along a first segment of a cutting path having a cutting path length, each first laser pulse having a first spot area on a workpiece, the first segment having a first segment length that is longer than the first spot area and shorter than the cutting path length;

directing second passes of second laser pulses to impinge along a second segment of the cutting path, the second segment including an overlap length that overlaps at least a portion of the first segment until a throughcut is made within the overlap length, each second laser pulse having a second spot area on a workpiece, the second segment having a second segment length that is longer than the second spot area and shorter than the cutting path length, the overlap length being greater than at least the first or second spot areas; and after directing at least the first and second passes of laser pulses, directing third passes of third laser pulses to impinge along a third segment of the cutting path until a throughcut is made within the third segment, each third laser pulse having a third spot area on a workpiece, the third segment having a third segment length that is longer than the third spot area and shorter than the cutting path length, the third segment including a portion of the cutting path that extends beyond the first or second segments, wherein the portion of the cutting path has a portion length greater than the first, second, or third spot areas.]

[49. The method of claim 1 in which the overlap length of the first and second portions or the first or second segment lengths are in a range appropriate so as to exploit with second laser pulses persistence of a selected transient effect arising from the interaction of first pulses with the workpiece along the overlap length.]

[50. The method of claim 46 in which the overlap length of the first and second portions or the first or second segment lengths are in a range appropriate so as to exploit with second laser pulses persistence of a selected transient effect arising from the interaction of first pulses with the workpiece along the overlap length.]

[51. The method of claim 48 in which the overlap length of the first and second portions or the first or second segment lengths are in a range appropriate so as to exploit with second laser pulses persistence of a selected transient effect arising from the interaction of first pulses with the workpiece along the overlap length.]

*52. A method for laser processing, comprising:*

*directing to a workpiece a primary group of passes of primary laser pulses to impinge locations along a primary segment of a cutting path that is continuous and has a cutting path length, each primary laser pulse having a primary spot area that defines a primary spatial major axis on the workpiece and impinging a location along the primary segment, the primary segment having a primary segment length that is longer than the primary spatial major axis and shorter than the cutting path length, and at least some of the locations along the primary segment length being impinged multiple times by the primary laser pulses of the primary group of passes;*

*directing to the workpiece a secondary group of passes of secondary laser pulses to impinge locations along a secondary segment of the cutting path, each secondary laser pulse having a secondary spot area that defines a secondary spatial major axis on the workpiece and impinging a location along the secondary segment, the secondary segment having a secondary segment length that is longer than the secondary spatial major axis and shorter than the cutting path length, and at least some of the locations along the secondary segment length being impinged multiple times by the secondary laser pulses of the secondary group of passes, the secondary segment overlapping the primary segment by an overlap length greater than at least the primary or secondary spatial major axes; and*

*after directing to the workpiece at least the primary and secondary groups of passes of respective primary and secondary laser pulses, directing to the workpiece a tertiary group of passes of tertiary laser pulses to impinge locations along a tertiary segment of the cutting path, each tertiary laser pulse having a tertiary spot area that defines a tertiary spatial major axis on the workpiece and impinging a location along the tertiary segment, the tertiary segment having a tertiary segment length that is longer than the tertiary spatial major axis and shorter than the cutting path length, and at least some of the locations along the tertiary segment length being impinged multiple times by the tertiary laser pulses of the tertiary group of passes, the tertiary segment including a subsequent portion of the cutting path other than the primary or secondary segments, wherein:*

*the subsequent portion of the cutting path has a nonoverlap length greater than any one of the primary, secondary, and tertiary spatial major axes;*

*the workpiece comprises a wafer substrate supporting an electronic device, the wafer substrate including a ceramic or glass target material;*

*at least one of the primary, secondary, and tertiary groups of passes of respective primary, secondary, and tertiary laser pulses comprises a first laser pulse of first Gaussian laser output having a substantially Gaussian irradiance profile characterized by a center of a peak irradiance amount and a peripheral region of a peripheral irradiance amount that is less than the peak irradiance amount;*

*a major portion of the first Gaussian laser output propagates through an aperture configured to convert the major portion of the first Gaussian laser output into a first apertured output having an irradiance profile characterized by an apertured peripheral irradiance amount that is reduced relative to the peak irradiance amount;*

*the first apertured output is directed to impinge a first target location in the respective primary, secondary, or tertiary segment with a first spot area defining a first respective primary, secondary, or tertiary spot area on the ceramic or glass target material, the first apertured output causing depthwise removal of an amount of target material at the first target location on the surface;*

*the at least one of the primary, secondary, and tertiary groups of passes of respective primary, secondary, and tertiary laser pulses comprises a second laser output pulse of second Gaussian laser output having a substantially Gaussian irradiance profile characterized by a center of a peak irradiance amount and a peripheral region of a peripheral irradiance amount that is less than the peak irradiance amount;*

*a major portion of the second Gaussian laser output propagates through an aperture configured to convert the major portion of the second Gaussian laser output into a second apertured output having an irradiance profile characterized by an apertured peripheral irradiance amount that is reduced relative to the peak irradiance amount; and*

*the second apertured output is directed to impinge a second target location in the respective primary, secondary, or tertiary segment with a second spot area defining a second respective primary, secondary, or tertiary spot area that partly overlaps the first spot area by a region of spot overlap on the target material, the second apertured output causing depthwise removal of an amount of target material at the second location and generating debris that contacts the workpiece, the region of spot overlap specifying a region of spot nonoverlap of the second and first spot areas that corresponds to a bite size of the second apertured output, the bite size being set, in cooperation with the configuration of the aperture converting the major portion of the second Gaussian laser output into the second apertured output, to facilitate laser spot irradiance profile and target material depthwise removal control of the second apertured output and thereby cause the generation of debris in a form of cleanable, nonpermanent redeposited material contacting the workpiece.*

*53. The method of claim 52, further comprising removing the nonpermanent redeposited material contacting the workpiece by a nonaggressive cleaning technique that entails mechanical scrubbing, solvent bathing, or ultrasonic vibrating.*

*54. The method of claim 52, further comprising:*

*directing each of the first and second Gaussian laser outputs to propagate along an optical path through a beam-shaping component that imparts greater uniformity to the major portion of the Gaussian laser output before it propagates through the aperture.*

*55. The method of claim 54, in which the major portions of the first and second Gaussian laser outputs to which uniformity is imparted become respective first and second shaped outputs having shaped irradiance profiles, and further comprising:*

*directing the first and second shaped outputs through one or more imaging lens components to form for the first and second apertured outputs imaged, shaped irradiance profiles.*

*56. The method of claim 55, in which the first and second apertured outputs formed with imaged, shaped irradiance profiles have respective first and second energy densities over the respective first and second spot areas, and the first and second energy densities are greater than a fluence below which the second apertured output generates debris in a form of permanent redeposited material contacting the workpiece.*

*57. The method of claim 52, further comprising removing the nonpermanent redeposited material contacting the workpiece by mechanical scrubbing, solvent bathing, ultrasonic vibrating, ion milling, or reaction ion etching.*

*58. The method of claim 52, in which the first and second apertured outputs comprise energy densities of greater than about 500 MW/cm$^2$ per pulse.*

*59. The method of claim 52, in which the region of spot nonoverlap of the second and first spot areas comprises a bite size of 1-7 μm.*

*60. The method of claim 52, in which the workpiece includes an air-bearing surface of an electronic device, the air-bearing surface has an edge, and the first and second apertured outputs are applied in proximity to the edge of the air-bearing surface to round the edge.*

*61. The method of claim 52, in which each of the first and second spot areas has a spatial major axis of about 5-15 μm.*

*62. The method of claim 52, further comprising delivering the first and second Gaussian laser outputs at repetition rates of greater than about 5 kHz.*

*63. The method of claim 52, in which the surface of target material comprises AlTiC or vacuum-deposited alumina.*

*64. The method of claim 52, in which the surface of target material comprises silicon, silicon carbide, or titanium carbide.*

*65. The method of claim 52, in which the target material forms a layer of a laser diode, an optical waveguide, or a MEMS component.*

*66. The method of claim 52, in which the beam-shaping component comprises a diffractive optical element.*

*67. The method of claim 52, in which the beam-shaping component comprises aspheric optics.*

*68. The method of claim 52, in which the first and second apertured outputs have a UV wavelength.*

* * * * *